US012458717B2

(12) United States Patent
Simmons et al.

(10) Patent No.: US 12,458,717 B2
(45) Date of Patent: Nov. 4, 2025

(54) HYGIENIZATION GENERATOR FOR INTEGRATED AQUEOUS OZONE AND ALKALINE WATER PRODUCTION

(71) Applicant: BioSure North America LLC, Fair Oaks Ranch, TX (US)

(72) Inventors: Darren Simmons, Fair Oaks Ranch (TW); Gavin Hsu, New Taipei (TW); Maxwell Hsu, New Taipei (TW); Ivor J. J. Longo, Atlanta, GA (US); H. Brock Kolls, Alpharetta, GA (US)

(73) Assignee: BioSure North America LLC, Fair Oaks Ranch, TX (US)

( * ) Notice: Subject to any disclaimer, the term of this patent is extended or adjusted under 35 U.S.C. 154(b) by 0 days.

(21) Appl. No.: 19/052,935

(22) Filed: Feb. 13, 2025

(65) Prior Publication Data

US 2025/0332307 A1    Oct. 30, 2025

Related U.S. Application Data

(63) Continuation-in-part of application No. 18/888,218, filed on Sep. 18, 2024, now Pat. No. 12,303,609, and (Continued)

(51) Int. Cl.
*A61L 2/18* (2006.01)
*A61L 2/10* (2006.01)
*A61L 101/02* (2006.01)

(52) U.S. Cl.
CPC .............. *A61L 2/183* (2013.01); *A61L 2/10* (2013.01); *A61L 2101/02* (2020.08);
(Continued)

(58) Field of Classification Search
CPC .................................. A61L 2/183; A61L 2/10
See application file for complete search history.

(56) References Cited

FOREIGN PATENT DOCUMENTS

JP         H1147773 A  *  2/1999
JP      2002045665 A  *  2/2002

OTHER PUBLICATIONS

English translation for JP-2002045665-A (Year: 2002).*
English translation of JP H1147773 A (Year: 1999).*

* cited by examiner

*Primary Examiner* — Sean E Conley
(74) *Attorney, Agent, or Firm* — H. Brock Kolls

(57) ABSTRACT

The present invention relates to a hygienization generator system and method for producing customized disinfection solutions by combining aqueous ozone and alkaline water. The system includes an aqueous ozone generator with an ion exchange material and electrolysis unit, an alkaline water generator capable of producing water with adjustable pH levels, and a mixer to form a homogeneous solution. A control system dynamically adjusts ozone concentration and PH levels based on user inputs or preconfigured settings, with real-time feedback provided by integrated sensors. The system features a user interface for parameter selection, remote monitoring capabilities, and optional microfoaming technology to enhance solution efficacy. Applications include surface sanitization, produce washing, dental water line disinfection, and biofilm removal in industrial piping. The portable configuration supports on-site use with modular dispensing options. This invention overcomes prior shortcomings, offering precise, eco-friendly, and versatile disinfection solutions.

20 Claims, 22 Drawing Sheets

Related U.S. Application Data a continuation-in-part of application No. 18/888,222, filed on Sep. 18, 2024, now Pat. No. 12,226,538, and a continuation-in-part of application No. 18/782,055, filed on Jul. 24, 2024, now Pat. No. 12,274,805, and a continuation-in-part of application No. 18/966,217, filed on Dec. 3, 2024, and a continuation-in-part of application No. 18/919,605, filed on Oct. 18, 2024, and a continuation-in-part of application No. 18/646,394, filed on Apr. 25, 2024.

(52) U.S. Cl.
CPC ........ *A61L 2202/11* (2013.01); *A61L 2202/14* (2013.01); *A61L 2202/15* (2013.01); *A61L 2202/16* (2013.01)

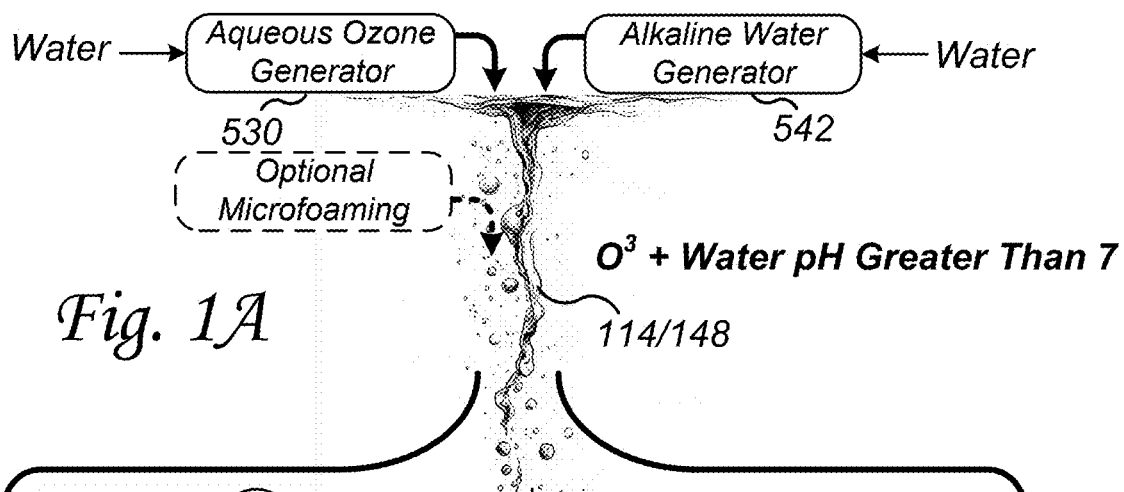
Fig. 1A
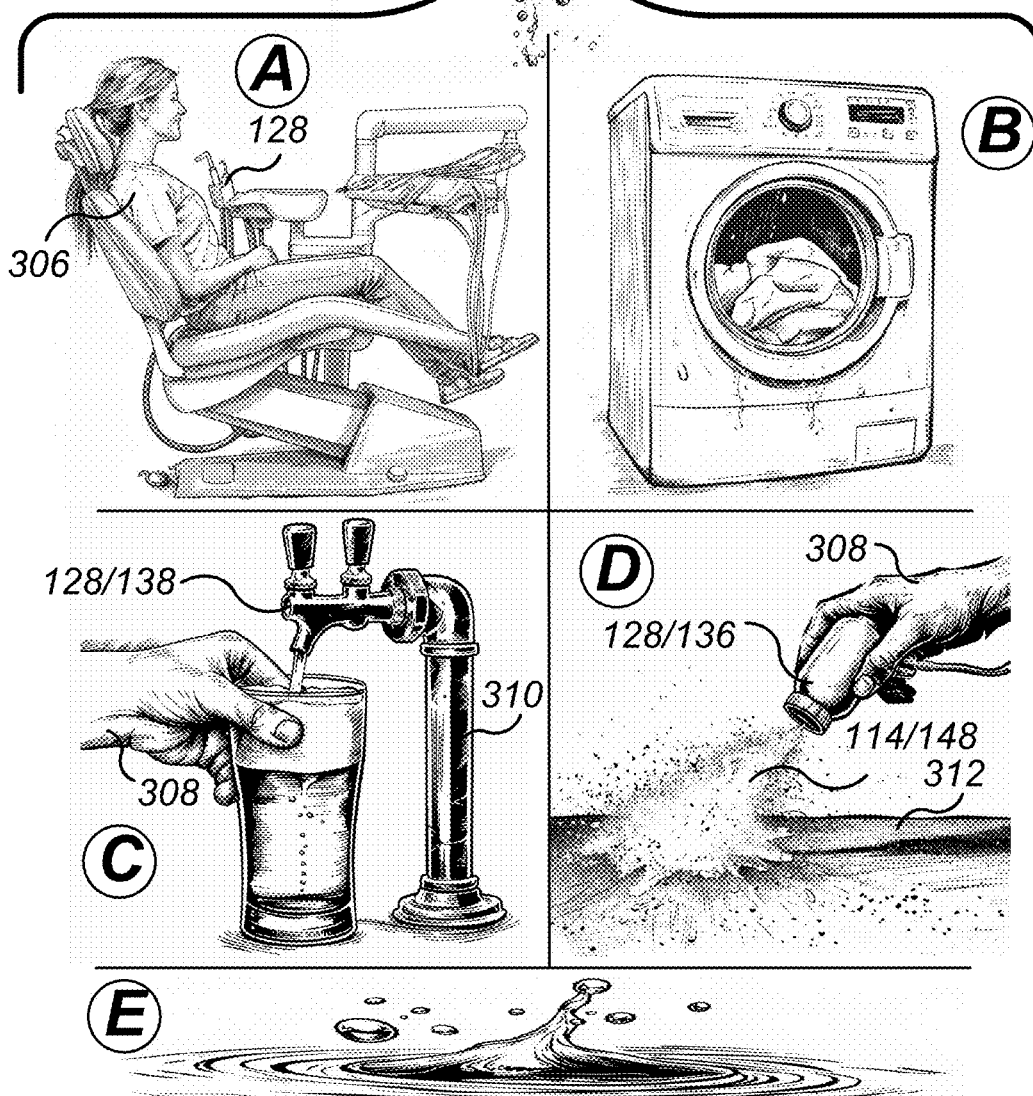
Mist–Spray–Immersion-Rinse-Wash-CIP-Other Hygienization Applications

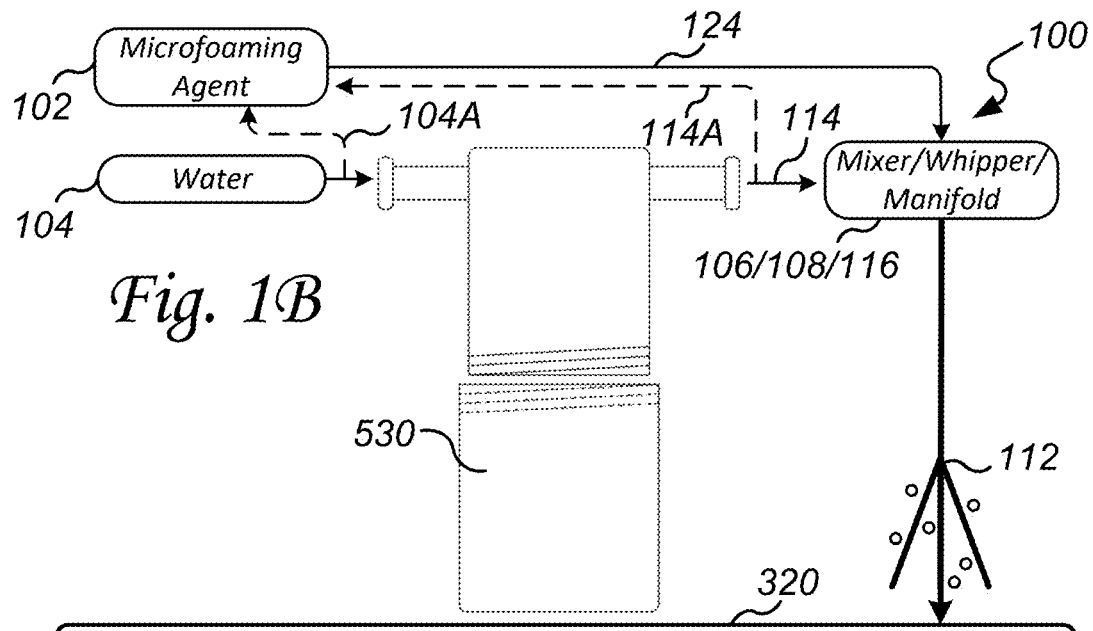
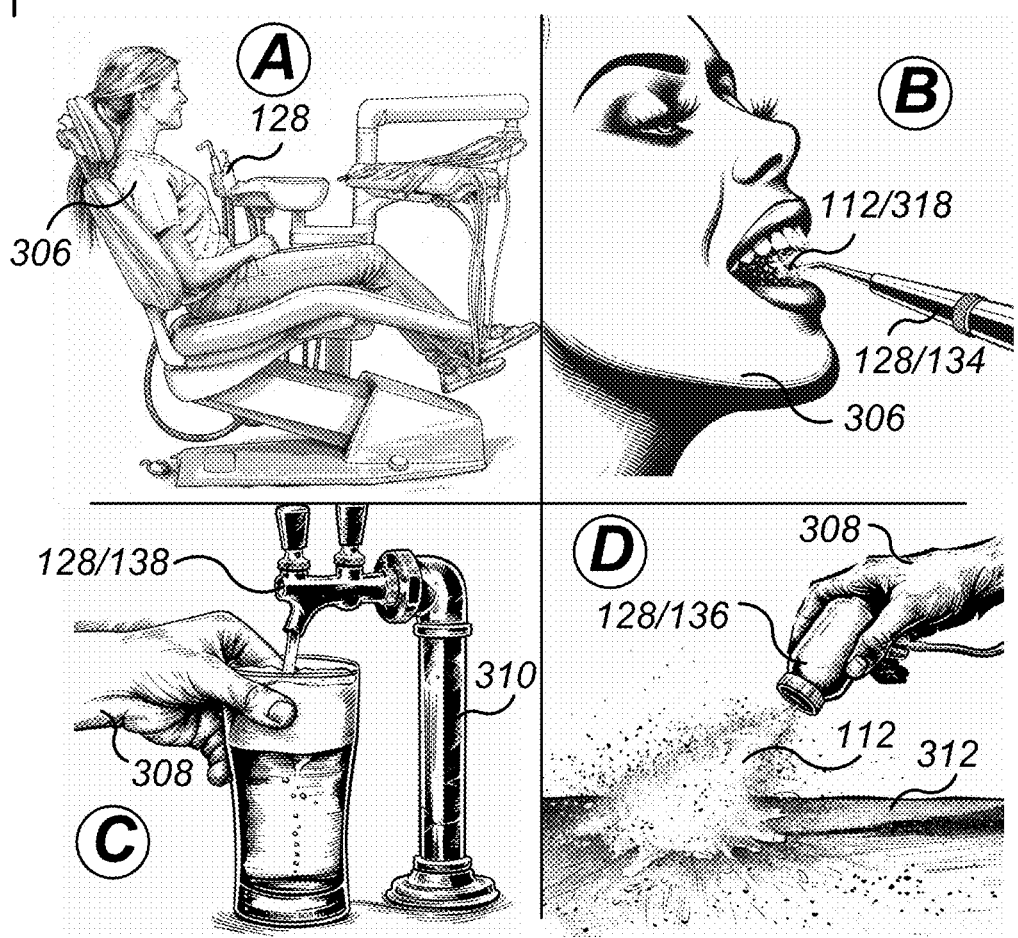
Fig. 1B

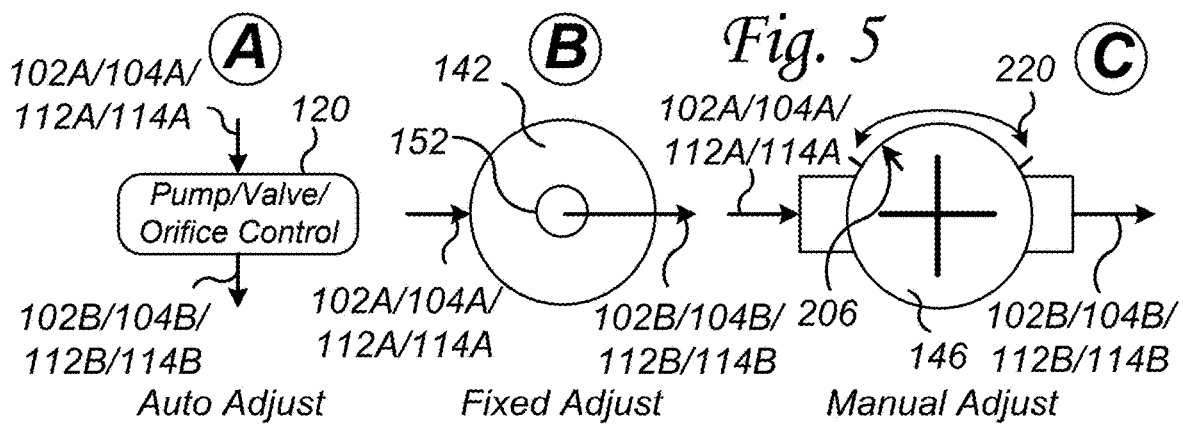
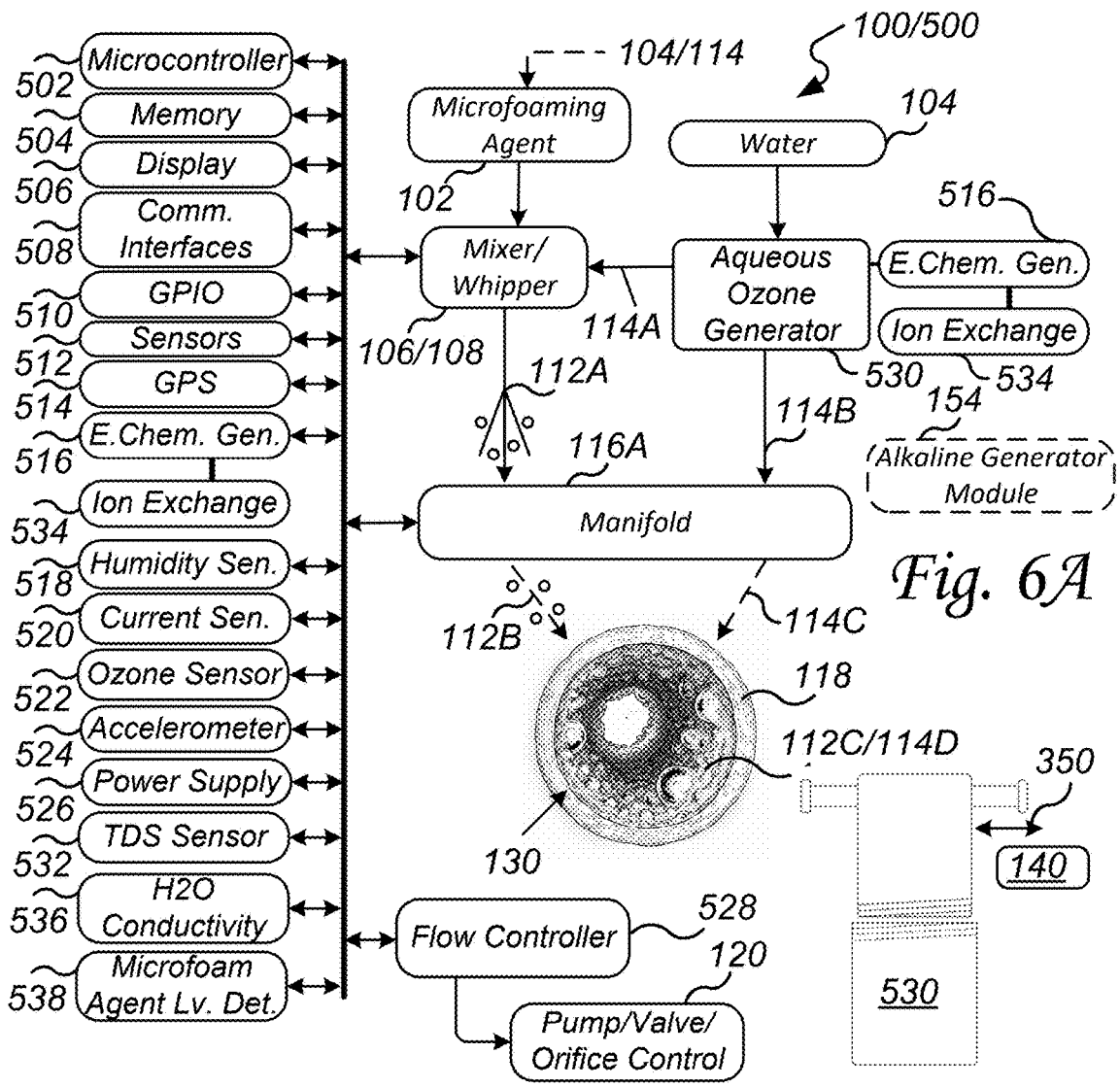

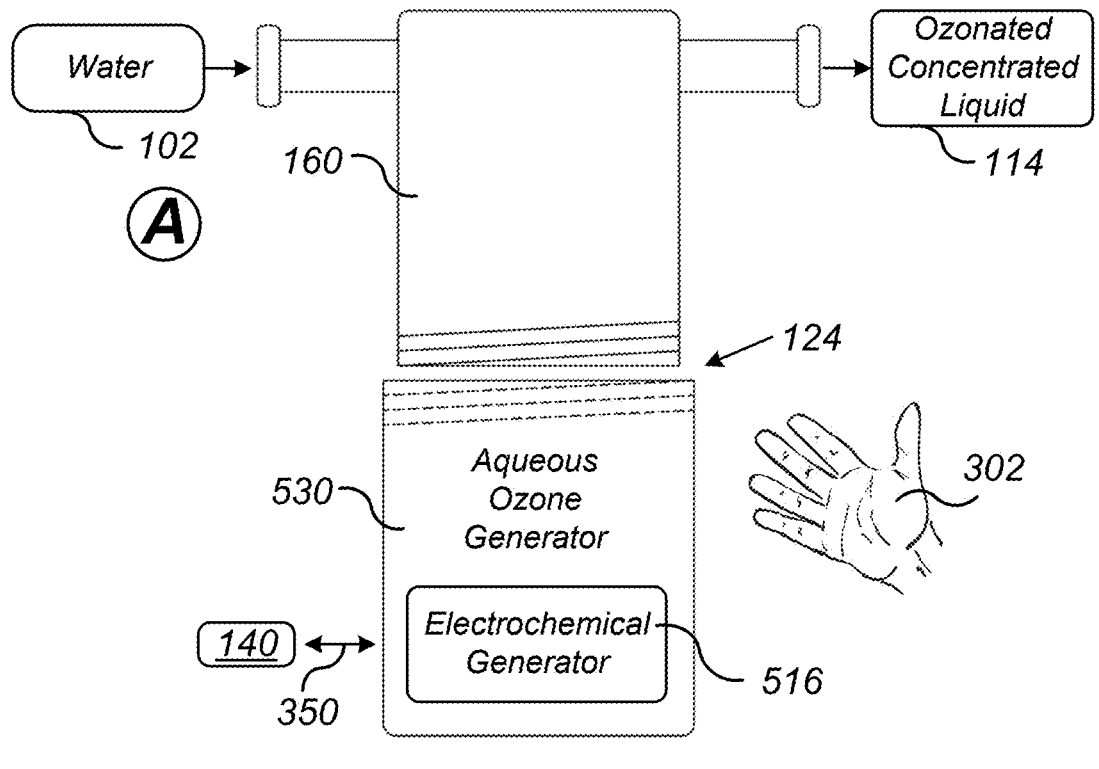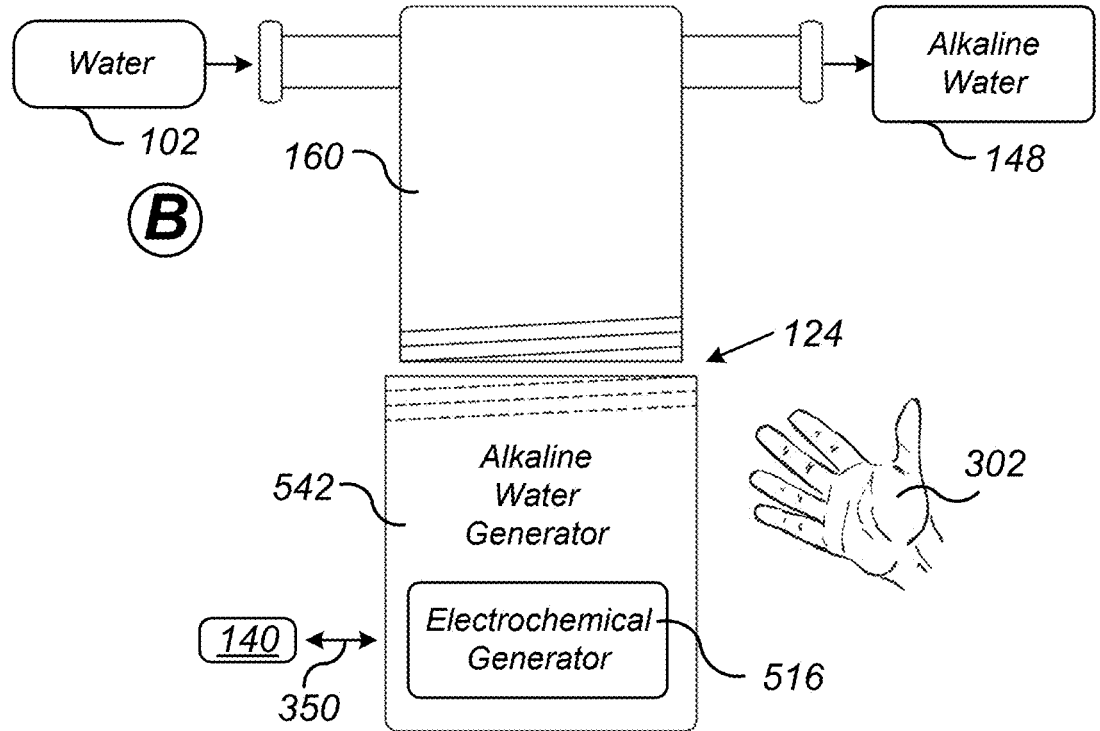
Fig. 6C

HYGIENIZATION GENERATOR FOR INTEGRATED AQUEOUS OZONE AND ALKALINE WATER PRODUCTION

CROSS-REFERENCE TO RELATED APPLICATIONS

This application contains subject matter which is related to the subject matter of the following co-pending applications. The below-listed applications are hereby incorporated herein by reference in their entirety:

This U.S. non-provisional application is a continuation in part of the following:

U.S. non-provisional application Ser. No. 18/888,218, inventor Gavin Hsu et al., entitled "AQUA-OZONE HYGIENIZATION", filed Sep. 18, 2024, now U.S. Pat. No. 12,303,609; and U.S. non-provisional application Ser. No. 18/888,222, inventor Gavin Hsu et al., entitled "AQUA-OZONE HYGIENIZATION", filed Sep. 18, 2024, now U.S. Pat. No. 12,226,538;

U.S. non-provisional application Ser. No. 18/782,055, inventor Darren Simmons et al., entitled "MICRO-FOAMING AQUEOUS OZONE DISINFECTION", filed Jul. 24, 2024, now U.S. Pat. No. now U.S. Pat. No. 12,274,805;

U.S. non-provisional application Ser. No. 18/966,217, inventor Gavin Hsu et al., entitled "DEODORIZING AIR USING AQUEOUS OZONE AS A CATALYST", filed Dec. 3, 2024;

U.S. non-provisional application Ser. No. 18/919,605, inventor Darren Simmons et al., entitled "IMMERSION CONTAINER FOR TREATING PRODUCE WITH AN OZONATED CONCENTRATE LIQUID", filed Oct. 18, 2024; and U.S. non-provisional application Ser. No. 18/646,394, inventor Darren Simmons et al., entitled "AQUEOUS OZONE FLOOR DISINFECTION SYSTEM", filed Apr. 25, 2024.

TECHNICAL FIELD OF THE INVENTION

This invention relates to the field of disinfection and sanitization systems, and more specifically, to a hygienization generator system and associated methods for generating and combining aqueous ozone and alkaline water to produce tailored disinfection solutions. The invention further pertains to systems and methods for dynamically controlling ozone concentration and pH levels, integrating advanced monitoring and feedback capabilities, and enabling versatile applications across industries, including food and beverage processing, healthcare, dental water line disinfection, and industrial cleaning. Additionally, the invention encompasses portable systems and methods for producing and applying disinfection solutions with enhanced functionality, such as real-time data communication, modular output assemblies, and optional microfoaming technology.

BACKGROUND OF THE INVENTION

Before our invention, cleaning and disinfecting tubing and piping systems in industries such as food and beverage production and dental care was primarily achieved through the use of caustic chemicals and liquid cleaners. These traditional methods suffer from several critical shortcomings that compromise their effectiveness, safety, and efficiency.

In fluid-handling systems, biofilm buildup on interior surfaces is a persistent issue. Biofilms not only reduce flow rates and degrade the taste and quality of food and beverages but also create a breeding ground for harmful pathogens. This is particularly problematic in industries that demand high hygiene standards, such as beer lines, dairy processing equipment, and soda and syrup distribution systems, where contamination can lead to product spoilage and health risks for consumers.

In dental water lines, the situation is even more critical. Contaminated rinse water carrying biofilm and pathogens can increase the risk of infection in patients, especially during procedures when gums and oral tissues are most vulnerable. Existing cleaning methods often fail to eliminate biofilms in these systems, leading to recurring contamination and potentially severe health consequences.

A significant limitation of conventional methods is their inability to physically disrupt biofilms in tubing and piping systems. Mechanical scraping or agitation, which could effectively remove biofilms, is impractical due to the inaccessibility of long and complex piping systems. Without effective mechanical disruption, chemical cleaning alone often fails to achieve thorough disinfection, leaving residual contaminants that can continue to harbor pathogens.

The use of caustic chemicals presents additional challenges, including health and safety risks to workers, environmental hazards, and potential damage to equipment. Frequent cleaning cycles with these chemicals increase costs and downtime, further reducing the efficiency of these systems. Moreover, the disposal of caustic chemicals introduces environmental compliance challenges, adding another layer of complexity and expense to operations.

Another shortcoming of prior approaches is the lack of dynamic control and monitoring during the cleaning process. Traditional systems often operate without real-time feedback mechanisms to adjust cleaning parameters, such as pH levels or disinfectant concentration, resulting in inconsistent performance and incomplete disinfection.

The present invention addresses these and other shortcomings by providing a hygienization generator system that combines aqueous ozone and alkaline water production, with optional microfoaming capabilities, to deliver superior disinfection performance and other advantages. For these reasons and shortcomings, as well as other reasons and shortcomings, there is a long-felt need that gives rise to the present invention.

SUMMARY OF THE INVENTION

The shortcomings of the prior art are overcome and additional advantages are provided through the provision of a hygienization generator. This system offers an integrated approach to producing customizable disinfection solutions by combining aqueous ozone generation and alkaline water production with advanced control and monitoring capabilities.

The hygienization generator includes an aqueous ozone generator, which utilizes an ion exchange material and an electrolysis unit to produce highly oxidative ozonated water, and an alkaline water generator, which creates water with adjustable pH levels to enhance reactivity and stability. A mixer is configured to combine the outputs of these generators, forming a synergistic disinfection solution tailored to diverse cleaning and sanitization applications.

The system further incorporates a control unit, operationally connected to both the aqueous ozone and alkaline water generators, enabling dynamic adjustments to ozone concentration and PH levels based on user inputs. This ensures that the solution's chemical properties can be precisely tailored to meet specific disinfection needs.

Additionally, at least one sensor is included to monitor critical output characteristics, such as pH and ozone concentration, providing real-time feedback to the control unit. This feedback loop ensures consistent performance, enables proactive maintenance, and enhances the overall reliability of the system.

This hygienization generator addresses limitations in traditional disinfection systems by providing a flexible, efficient, and user-friendly solution, suitable for applications in healthcare, food processing, industrial cleaning, and beyond. The integration of dynamic controls and real-time monitoring sets a new standard for precision and adaptability in disinfection technology.

Additional shortcomings of the prior art are overcome and additional advantages are provided through the provision of a hygienization generator system. This system integrates advanced electrochemical generators, control mechanisms, and safety features into a compact and efficient configuration, offering a versatile solution for producing tailored disinfection solutions.

The system includes a first electrochemical generator, designed to produce aqueous ozone, and a second electrochemical generator, configured to produce alkaline water with an adjustable pH level. Both generators are housed in a side-by-side configuration, enabling a compact and streamlined design that minimizes the system's footprint while maintaining high performance.

A control system is operationally connected to both generators, allowing independent control of ozone concentration and pH level. This dynamic control capability ensures precise customization of the disinfection solution's chemical properties to meet specific requirements for various applications. The system also features a user interface, enabling operators to easily adjust output characteristics, select preset configurations, and monitor real-time performance.

Additional shortcomings of the prior art are overcome and additional advantages are provided through the provision of a portable hygienization generator. This system integrates advanced disinfection capabilities into a compact, self-contained unit designed for mobility and versatility across diverse applications.

The generator includes a compact housing that encloses both an aqueous ozone generation unit and an alkaline water generation unit, enabling the production of highly effective disinfection solutions. The system is powered by a battery-powered control system, allowing for operation in remote or off-grid locations without reliance on external power sources.

A modular output assembly is incorporated, featuring interchangeable nozzles that support specific application methods, such as misting, spraying, or liquid dispensing. This modularity ensures that the disinfection solution can be applied effectively to a wide range of surfaces, environments, and target areas.

The generator includes at least one sensor, configured to monitor critical operational parameters such as pH levels and ozone concentration. These sensors provide real-time feedback to ensure the disinfection solution maintains its intended chemical properties during operation. A mixer is also integrated into the system to combine the outputs from the aqueous ozone and alkaline water generation units, producing a homogeneous solution with enhanced oxidative and alkaline properties for superior cleaning and sanitization performance.

The portable hygienization generator offers a lightweight, adaptable, and efficient solution for producing and applying disinfection solutions, addressing the limitations of traditional systems while providing advanced mobility, precision, and versatility for applications in healthcare, food safety, and industrial sanitation.

Additional shortcomings of the prior art are overcome and additional advantages are provided through the provision of a method of disinfecting using a hygienization generator. This method leverages advanced water treatment technologies to produce a highly effective disinfection solution tailored to diverse applications.

The method includes generating aqueous ozone by passing water through an aqueous ozone generator, which incorporates an ion exchange material and an electrolysis unit to produce an ozone-rich solution with strong oxidative properties. Additionally, the method involves producing alkaline water using an alkaline water generator, which adjusts the water's pH level to enhance its reactivity and compatibility for disinfection purposes.

The outputs from the aqueous ozone and alkaline water generators are then combined in a mixer, ensuring thorough homogenization to form a powerful disinfection solution. This solution benefits from the synergistic effects of ozone's oxidative strength and the alkalinity's enhanced chemical stability.

Finally, the method includes dispensing the disinfection solution to a target area, enabling its application for tasks such as surface cleaning, equipment sanitization, and produce washing. This approach provides a flexible, eco-friendly, and highly effective alternative to traditional chemical-based disinfection methods, addressing the limitations of the prior art while offering improved performance, reliability, and operational efficiency.

Additional shortcomings of the prior art are overcome and additional advantages are provided through the provision of a method of treating water using a hygienization generator. This method delivers a versatile and customizable approach to water treatment by leveraging advanced electrolysis technologies for generating and combining aqueous ozone and alkaline water.

The method begins with generating aqueous ozone by electrolyzing water in an aqueous ozone generator, creating a highly oxidative solution capable of breaking down organic contaminants and inactivating pathogens. Simultaneously, alkaline water is produced by electrolyzing water in an alkaline water generator, which increases the pH level to enhance chemical stability and reactivity.

These outputs are combined to form a treated water solution, leveraging the synergistic effects of ozone and alkalinity for superior water treatment capabilities. The method further includes regulating ozone concentration by controlling the flow rate of water through the aqueous ozone generator and regulating the pH level of the solution by adjusting the flow rate through the alkaline water generator. These controls ensure precise customization of the solution's chemical properties to meet specific treatment needs.

Finally, the treated water solution is dispensed for use in a water treatment process, addressing applications such as industrial water cleaning, beverage supply line sanitation, and biofilm reduction in pipes. This method provides a flexible, efficient, and environmentally friendly alternative to traditional water treatment techniques, addressing the limitations of prior approaches while offering enhanced performance and adaptability.

Additional shortcomings of the prior art are overcome and additional advantages are provided through the provision of a method of disinfecting surfaces using a portable hygienization generator. This method delivers a compact, versatile, and efficient approach to surface disinfection by integrating advanced water treatment and monitoring technologies within a portable system.

The method begins with generating aqueous ozone and alkaline water within a compact housing, enabling the production of disinfection components in a mobile and self-contained system. These components are then combined into a disinfecting solution, leveraging the synergistic effects of ozone's oxidative power and the enhanced reactivity provided by alkalinity to create a highly effective cleaning agent.

The disinfecting solution is then dispensed for application to target surfaces, using a modular output system that supports various delivery methods, such as misting, spraying, or direct liquid application. During application, the method includes monitoring the ozone concentration and pH level of the solution using integrated sensors, ensuring that the solution maintains its intended chemical properties for optimal performance.

Finally, the method involves communicating operational data, including ozone concentration and pH level, to a remote monitoring system. This feature enables real-time oversight, diagnostics, and performance tracking, enhancing the system's reliability and adaptability for diverse disinfection scenarios.

This method provides a portable and advanced solution for surface disinfection, addressing the limitations of prior technologies while offering improved convenience, precision, and operational efficiency for applications in healthcare, food processing, and industrial cleaning.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates examples of applications of a hygienization generator system that integrated aqueous ozone and alkaline water into a disinfection mixture;

FIG. 1B illustrates one example of a hygienization generator system;

FIG. 5 illustrated examples of microfoaming agent and ozonated concentrate liquid flow governors;

FIG. 6A illustrates one example of a hygienization generator system block diagram;

FIG. 6C illustrates one example of an aqueous ozone generator and one example of an alkaline water generator;

Figure 2:
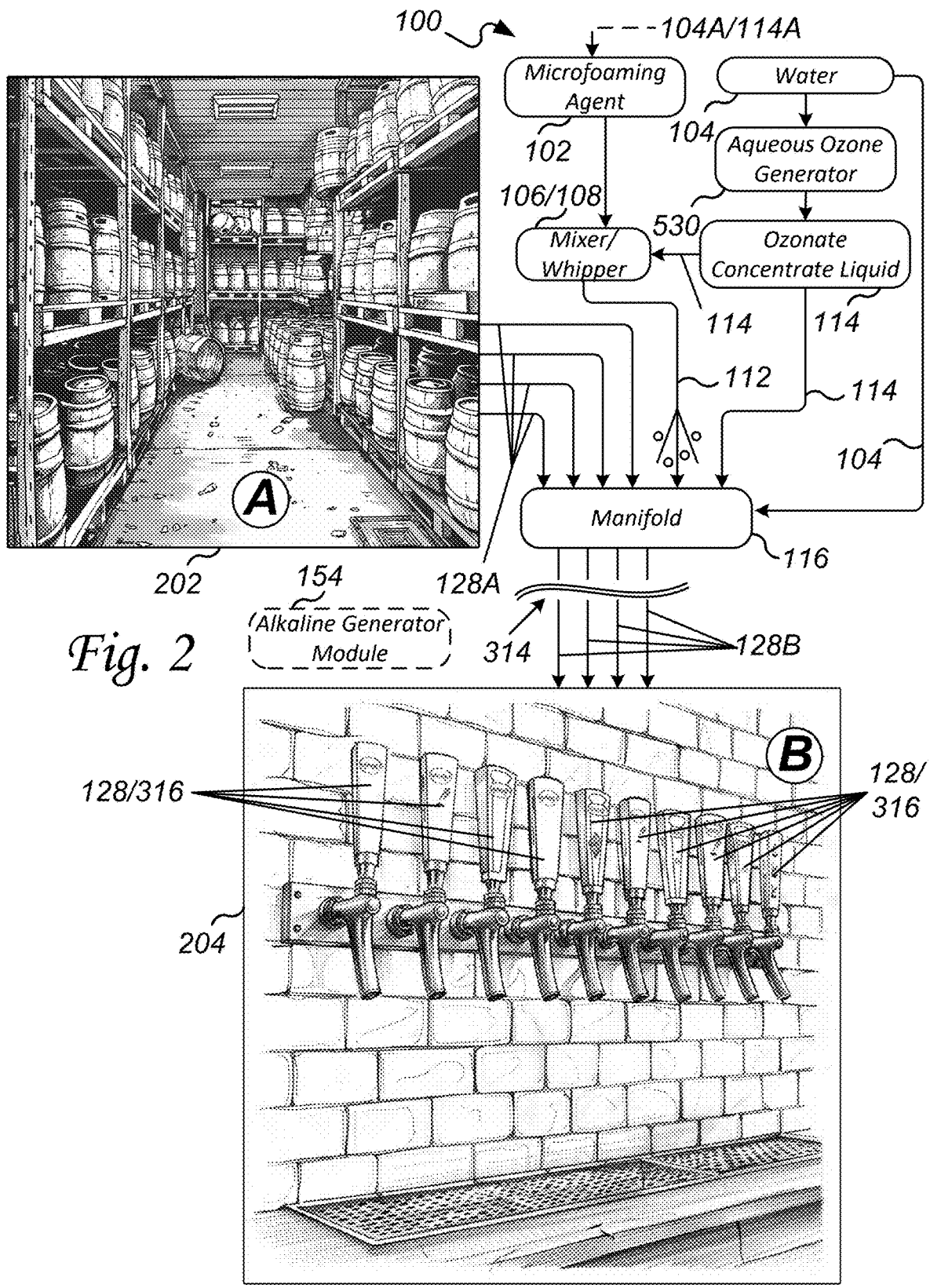
FIGS. 2-3 illustrates one example of using microfoaming aqueous ozone for cleaning and disinfecting fluid transmission lines.

The detailed description explains the preferred embodiments of the invention, together with advantages and features, by way of example with reference to the drawings.

DETAILED DESCRIPTION OF THE INVENTION

This invention relates to a hygienic generator, a novel system that integrates an alkaline water generator and an aqueous ozone generator to produce highly effective and customizable disinfection solutions. The hygienization generator is designed to generate and mix alkaline water with ozonated water, providing precise control over pH levels and ozone concentrations to create solutions tailored for various applications. These applications include surface disinfection and sanitization, produce washing, industrial water treatment, quick-serve restaurant, healthcare disinfection, and numerous other applications making the system versatile and highly adaptable.

In the context of this invention, hygienization refers to a process that integrates the generation of aqueous ozone and alkaline water into a mixture that creates a versatile disinfection solution. This process leverages the unique properties of both components to achieve enhanced microbial inactivation and oxidation performance. Hygienization may optionally incorporate microfoaming technology, which introduces microbubbles into the solution to enhance its penetration and effectiveness, particularly in challenging environments such as biofilm-laden surfaces, intricate tubing, and confined spaces. By enabling precise adjustment of pH levels and ozone concentration, the hygienization process supports a wide range of applications, including industrial sanitation, agricultural produce washing, healthcare disinfection, and food safety. This innovative approach, along with the optional microfoaming feature, forms the foundation of the hygienization generator, offering highly effective, eco-friendly, and adaptable disinfection solutions.

In an exemplary embodiment, the hygienization generator is a unified system comprising:

An Aqueous Ozone Generator: This component utilizes ion exchange material and an electrolysis unit to generate ozonated water. The system is configured to adjust ozone concentration by varying the dwell time of water within the generator.

An Alkaline Water Generator: This component produces water with customizable pH levels through electrochemical processes, such as electrolysis, or by adding minerals like calcium, magnesium, or other compound. The generator can dynamically adjust pH levels using voltage, current, or flow control mechanisms.

A Mixer: Outputs from the aqueous ozone generator and the alkaline water generator are combined in a controlled mixing chamber to form a homogeneous disinfection solution. Optional components, such as static or dynamic mixers, ensure even blending. For disclosure purposes, a mixer can be referred to as a mixing chamber.

Control and Monitoring System: The generator includes a control unit with integrated sensors to monitor pH levels, ozone concentration, and other parameters. The system allows real-time adjustments through a user interface, enabling customization based on specific disinfection needs.

Optional Microfoaming Technology: The system can include a microfoaming module that introduces microbubbles into the disinfection solution, enhancing penetration and efficacy, particularly in confined spaces like pipes and tubing.

The hygienization generator can be modular and scalable, enabling users to adapt it for both small-scale and industrial applications. The system is also eco-friendly, relying solely on water, optional minerals, and electricity to generate disinfection solutions with environmentally benign byproducts, such as oxygen and neutral water.

In the context of this invention, the term 'alkaline water' refers to water with a pH level greater than 7, achieved through electrochemical processes or mineral addition. The alkaline water can be produced using:

Electrolysis: Water is split into alkaline and acidic streams by applying an electrical current across electrodes separated by an ion exchange membrane. The alkaline stream contains hydroxide ions ($OH^-$), which elevate the pH.

Mineral Dispersion: Minerals such as calcium, magnesium, potassium, or other compounds are introduced to the water, either through controlled dosing or natural dissolution, to increase alkalinity.

Ion Exchange: An ion exchange resin can replace hydrogen ions ($H^+$) with cations like sodium, potassium, or other compound, raising the water's pH.

Alkaline water, as defined here, enhances the reactivity and stability of ozone, making it a critical component of the hygienization generator. By combining alkaline water with ozonated water, the system creates a highly effective disinfection solution capable of penetrating biofilms, oxidizing organic matter, and inactivating a wide range of pathogens.

In an exemplary embodiment, the hygienization generator, of the present invention, offers numerous advantages over prior systems. The dual-generator design enables the production of highly reactive disinfection solutions that leverage the synergistic effects of alkaline water and aqueous ozone. Alkaline water enhances the stability of ozone, amplifying its oxidative power to eliminate microbial contaminants and disrupt biofilms effectively. This combined solution can achieve superior disinfection performance compared to standalone aqueous ozone systems or chemical disinfectants. Additionally, the system provides dynamic control over pH levels and ozone concentrations, allowing users to customize solutions for specific applications, from agricultural produce washing to industrial water line cleaning.

The system optionally integrates microfoaming technology, which supercharges the disinfection process by introducing microbubbles into the solution. These bubbles improve penetration into confined spaces, such as pipes or tubing, making the hygienization generator exceptionally effective for biofilm removal. This feature, combined with the alkaline-ozone solution, ensures complete microbial inactivation even in the most challenging environments.

The hygienization generator is designed for efficiency, scalability, and eco-friendliness. Its ability to generate disinfection solutions on demand eliminates the need for chemical storage and handling, reducing operational costs and environmental impact. The system's user-friendly interface and advanced safety features ensure consistent, reliable operation, while its modular design allows for easy adaptation to diverse applications and industries. By integrating alkaline water production, aqueous ozone generation, and optional microfoaming technology, the hygienization generator sets a new standard in sustainable and versatile disinfection systems.

For disclosure purposes, the term hygienization generator system 100/500 refers to the comprehensive system comprising both physical structure components and and integrated control system. The physical structure components, collectively referred to as hygienization generator 100, include hardware elements such as piping, pumps, valves, enclosures, and other suitable mechanical and structural parts that facilitate the generation, mixing, and delivery of the disinfection solution. The control system, referred to as control system 500, encompasses the electronic and computational components responsible for coordinating the operation of the physical system. This includes, for example and not a limitation, sensors, processors, software algorithms, user interfaces 548, electrochemical generators 516, and communication interfaces 508/710 that generate, monitor, and adjust key parameters such as pH level, ozone concentration, flow rates, and dwell times. Together, the hygienization generator system 100/500 provides a fully integrated solution that dynamically combines alkaline water and aqueous ozone, optionally incorporating microfoaming technology, to produce and deliver highly effective and customizable disinfection solutions for a variety of applications.

Turning now to the drawings in greater detail, it will be seen that in FIG. 1A there are illustrated examples of applications of a hygienization generator system 100/500 that integrated aqueous ozone and alkaline water into a disinfection mixture. In an exemplary embodiment of the hygienization generator system 100/500, which combines physical structure components 100 and an integrated control system 500 to generate, mix, and dispense customizable disinfection solutions. The system includes the hygienization generator 100/500, featuring an aqueous ozone generator 530, an alkaline water generator 542, and a mixer/whipper/manifold 106/108/116, along with associated hardware such as piping, pumps, and valves. The system also integrates a control system 500 which is better illustrated in at least FIG. 6B, that monitors and adjusts operational parameters, including ozone concentration and pH level, to optimize the disinfection solution for specific applications. Optional components, such as a microfoaming module 156, enhance solution delivery and performance in select use cases.

The hygienization generator system 100/500 provides superior performance compared to prior approaches by leveraging the synergistic effects of controlled pH levels and ozone concentrations. The system's dynamic controls enable the precise adjustment of these parameters, tailoring the solution to the microbial load, organic contamination, and environmental conditions of the application. Additionally, the optional microfoaming module 156 enhances the penetration and distribution of the solution, particularly in environments with high biofilm presence. The following exemplary applications, denoted as References A through E, highlight the system's versatility and scientific advancements:

In an exemplary embodiment, in reference 'A', the hygienization generator system 100/500 is well-suited for dental applications, including cleaning dental water lines 118, disinfection of equipment and medical devices, and providing patient oral rinses for patient 306. The ability to adjust the ozone concentration ensures effective microbial inactivation while maintaining compatibility with sensitive surfaces and equipment. The pH level can also be fine-tuned to optimize biofilm disruption, particularly in dental water lines where biofilm buildup is a persistent challenge. Compared to chemical-based solutions, the system reduces residue formation and eliminates the need for frequent flushing cycles, providing a more efficient and eco-friendly approach.

In an exemplary embodiment, in reference 'B', in laundry systems and other cleaning applications, the hygienization generator system 100/500 offers an enhanced cleaning solution by combining alkaline water 148 and ozonated concentrate liquid 114. The adjustable pH level effectively lifts organic residues, while the ozone concentration provides strong oxidative power for pathogen elimination. When paired with the optional microfoaming module 156, the solution is transformed into a foam that clings to fabrics and surfaces, increasing contact time and improving the efficacy of both cleaning and disinfection. This feature is particularly valuable in industrial, hospitality, and healthcare laundry operations, where thorough microbial control is critical. The system also reduces reliance on chemical detergents, providing a safer and more sustainable alternative.

In an exemplary embodiment, in reference 'C', the system's dynamic control over ozone and PH levels makes it highly effective for cleaning beer and soft drink lines, including taps, fountain equipment, and fountain guns. The disinfection solution can be customized to remove biofilms and prevent contamination without corroding equipment or affecting beverage flavor. Additionally, the hygienization generator system 100/500 supports clean-in-place (CIP) operations, minimizing downtime while ensuring thorough cleaning of pipes, valves, and other components. Compared to traditional chemical cleaners, the system delivers superior sanitation with reduced chemical residues and environmental impact.

In an exemplary embodiment, in reference 'D', for surface cleaning, including food preparation areas and other cleaning tasks, the hygienization generator system 100/500 provides a disinfection solution tailored to eliminate pathogens and biofilms on hard surfaces. The ozonated concentrate liquid 114 and alkaline water 148 combinations can be sprayed through fluid transmission lines 118 and applied via a spray nozzle 136, which can be a valve, spray nozzle (fixed or detached), portable spray bottle, or other suitable devices onto the surface 312 or other suitable locations. The ability to adjust ozone levels allows for high pathogen inactivation rates without damaging sensitive materials. The pH level can be optimized to improve the solution's oxidative power, ensuring thorough cleaning in challenging environments such as commercial kitchens, food processing plants, quick-serve restaurants, and healthcare facilities. The system's eco-friendly byproducts-oxygen and neutral water-make it safe for use in environments where chemical residues are a concern.

In an exemplary embodiment, in reference 'E', the system's versatility extends to a range of applications, including misting, spraying, immersion, rinsing, washing, and clean-in-place (CIP) processes. By dynamically adjusting ozone and pH levels, the system produces solutions that can be customized for specific needs, such as agricultural produce washing, vehicle sanitation, or heating ventilation air conditioning (HVAC) system cleaning. The optional microfoaming module 140 can be incorporated into these applications to enhance solution distribution and penetration, particularly in intricate or confined spaces. The system's modular design ensures adaptability across industries, providing a flexible and high-performance disinfection solution.

In operation, the hygienization generator system 100/500, of the present invention, achieves superior performance over prior approaches through its ability to dynamically control critical parameters, such as ozone concentration and PH level. This control ensures that the disinfection solution is optimized for both efficacy and compatibility with the target application. The combination of alkaline water and aqueous ozone enhances the solution's oxidative potential, making it highly effective at breaking down organic matter and inactivating a wide range of pathogens, including those embedded in biofilms. Additionally, the optional microfoaming technology amplifies this effect by improving solution contact and retention on surfaces. Compared to traditional chemical disinfectants and standalone systems, the hygienization generator system 100/500 offers greater efficiency, reduced environmental impact, and broader applicability, setting a new standard for modern disinfection systems Referring to FIG. 1B, there is one example of a hygienization generator system 100/500. An advantage, in the present invention, is that a microfoaming agent 102 can be combined with an ozonated contrate liquid 114 which is generated from an aqueous ozone generator 530 to form a microfoaming ozonated liquid 112. The microfoaming ozonated liquid 112 can be dispensed through fluid transmission lines 128 as well as dispensed on surfaces 312, providing superior cleaning and disinfection.

In operation, microfoamed aqueous ozonated solutions can offer several advantages over plain aqueous ozonated water when it comes to disinfection. Such advantages and benefits can include for example and not a limitation:

Increased contact time: Microfoaming the ozonated solution creates a larger surface area, allowing for better contact with fluid transmission line surfaces, surfaces in general, as well as in the oral cavity surfaces 318 of patients, including teeth, gums, and tongue. This increased contact time can enhance the effectiveness of ozone as a disinfectant;

Improved penetration: The microfoam can reach into crevices and hard-to-reach areas in fluid transmission lines, on surfaces, as well as in the mouth, ensuring more thorough disinfection compared to plain water, which may not have as much penetrating power;

Enhanced retention: Microfoam tends to adhere to surfaces better than liquid, which means the ozonated solution stays in contact with fluid transmission line surfaces, surfaces in general, as well as oral cavity tissues of patients for a longer period. This prolonged exposure can improve the disinfection process;

Mechanical action: The act of microfoaming can provide a mechanical action that aids in dislodging scale, contaminants, biofilms, and other substances. With regards to oral cavity 318 applications, such mechanical action can aid in dislodging food particles, plaque, and debris, further contributing to a cleaner and healthier mouth;

Improved taste and mouthfeel: Depending on the microfoaming agent used, in oral applications, the microfoam can have a pleasant taste and mouthfeel, making the disinfection process more comfortable and enjoyable for the person;

Reduced splatter: The use of microfoaming ozonated solutions can reduce splattering during the application, leading to a neater and more controlled disinfection procedure;

And other advantages and benefits.

In an exemplary embodiment, to create microfoam in aqueous ozonated water while maintaining safety and a pleasant mouthfeel (for oral cavity applications), food-grade foaming agents can be used that are safe for human consumption. Such foaming agents can include for example and not a limitation:

Organic foaming agents: Ingredients like organic soy lecithin or organic egg white powder can be used to create foam in water. These ingredients are generally safe for consumption and can provide a smooth and creamy mouthfeel;

Plant-based proteins: Ingredients like pea protein or oat protein can also be used to create foam in water. These proteins can add a creamy texture and are often used in dairy alternatives for their foaming properties;

Natural gums: Gums like xanthan gum or guar gum can be used as foaming agents in water. These gums are derived from natural sources and can create stable foam with a pleasant mouthfeel;

Coconut milk or cream: Adding a small amount of coconut milk or cream to aqueous ozonated water can create a frothy texture and add a hint of coconut flavor. Coconut-based ingredients are generally safe and can enhance the overall drinking experience;

Whipping siphon: Using a whipping siphon charged with nitrous oxide ($N_2O$) cartridges provides an effective method for creating foam in ozonated water. This technique, widely recognized in culinary applications for producing airy and stable foams, introduces nitrous oxide into the liquid under pressure, resulting in the creation of fine, uniform bubbles. When applied to ozonated water, this method can enhance the surface area and contact efficiency of the foam, making it particularly useful for disinfection and sanitization purposes where extended contact with a surface or material is beneficial. The use of nitrous oxide as the foaming agent is advantageous due to its non-reactive and food-safe properties, ensuring compatibility with sensitive applications such as food preparation areas, produce washing, and medical instrument cleaning. Moreover, the portability and simplicity of a whipping siphon make this method accessible for small-scale or experimental applications, offering a versatile approach to leveraging foam-enhanced ozonated water;

And other types and/or kinds of, microfoaming agents, as may be required and/or desired in a particular embodiment.

It's important to use these ingredients in moderation and follow recommended guidelines for their usage to ensure safety and a pleasant taste. Additionally, consider the specific application and preferences of consumers when choosing a foaming agent for aqueous ozonated water.

An advantage, in the present invention, is that the use of microfoaming ozonated liquid in fluid transmission lines disinfection is human-safe should a portion of the fluid be ingested, whereas caustic chemical cleaning of tubes and pipes isn't human-safe and if ingested can make a person very sick. In addition, the mechanical action of the microfoam better dislodges biofilm contaminant and biofilm buildup resulting in a superior disinfection down to the surface of the fluid transmission line or surface, whereas non-foamed caustic solutions and other non-foamed solutions can pass over the biofilm without disloging or penetrating to the actual surface of the tube or pipe thus not achieving a total clean or disinfection.

With reference to FIG. 1B, water 104 can be routed to an aqueous ozone generator 530 through suitable tubing, piping, or other methods. Such water 104 can be from a plumbed water source under pressure and governed to a desired flow rate as needed, pumped or gravity-fed from a tank or reservoir, or provided in other suitable ways. Additionally and selectively, a portion of the water 104 can be route 104A to mix with a portion of the microfoaming agent 102 if that is what is desired and/or required for proper microfoam creation.

In an exemplary embodiment, the aqueous ozone generator 530 generates from the water 104 an ozonated concentrate liquid 114. Additionally and selectively, a portion of the ozonated concentrate liquid 114 can be route 114A to mix with a portion of the microfoaming agent 102 if that is what is desired and/or required for proper microfoam creation.

The microfoaming agent can be routed by tubing, pipe, or other suitable methods to a mixer 106 that also receives the ozonated concentrate liquid 114. The mixer combines that microfoamig agent 102 ratiometrically with the ozonated concentrate liquid 114 creating a microfoaming ozonated liquid 112. Additionally, the mixer 106 functionality can also include a whipper 108 that can be configured to agitate the microfoaming ozonated liquid 112 to enhance foaming, and for other benefits.

In an exemplary embodiment, in operation, whipper 108 can receive and agitate some of the water 102 and the microfoaming agent 102, creating a microfoam that is blended with the ozonated concentrate liquid 114 to form the microfoaming ozonated liquid 112. Alternatively, the whipper 108 can receive and agitate some of the ozonated concentrate liquid 114 and the microfoaming agent 102, creating the microfoam that is blended with the ozonated concentrate liquid 114 to form the microfoaming ozonated liquid 112.

In an exemplary embodiment, a portion of water 104A or ozonated concentrate liquid 114A illustrated as dashed lines can selectively be routed as and if needed to the microfoaming agent 102 dosing location. In this regard, viscous microfoaming agents, powered microfoaming agents, or certain other types of microfoaming agents may need to be diluted or otherwise wetted to create a suitable flow through the system and/or for accurate dosing.

In an exemplary embodiment and as better illustrated in at least FIG. 2, the mixer 106 functionality can also include a manifold 116 that can be configured to selectively control the flow and mixing of several flow streams from a plurality of fluid transmission lines 128A. As an example and not a limitation, one input flow stream of the microfoaming ozonated liquid 112 can be split, by the manifold 116, and individually controlled on/off manually or by way of control system 500 into many individual streams of microfoaming ozonated liquid 114 through the plurality of fluid transmission lines 128B to be distributed to different endpoints and/or use applications. In another example, streams of water 104, ozonated concentrate liquid 114, microfoaming ozonated liquid 112, beverages, beverage syrups, foods like yogurt and others, beer, or other suitable fluids can be input into the manifold 116, and the output from the manifold 116 individually selected manually or by way of control system 500 for on/off flow through the manifold 116 to a destination point of use. the can be either of those liquids or a combination thereof. In this regard, one or more of the fluid transmission lines 128 can receive water 104, ozonated concentrate liquid 114, microfoaming ozonated liquid 112, food or beverage fluids such as beer, soda, yogurt, and other, other suitable fluids, or a combination thereof, as may be required and/or desired in a particular embodiment.

In applications of fluid transmission line cleaning and disinfection, the manifold 116 can switch temporarily from the food or beverage or other suitable fluid in the transmission line 128B to the microfoaming ozonated liquid 112, purging the transmission line 128B which can be a long-length 314 by opening the valve 316 to allow the microfoaming ozonated liquid 112 to traverse the fluid transmission line 128B and egress the valve 316. In this regard, the microfoaming ozonated liquid 112 contacts the entire interior surface of the length 314 of the fluid transmission line 128B as well as the valve 316 cleaning and disinfecting.

In an exemplary embodiment and with reference to FIG. 1B, the microfoaming ozonated liquid 112 can be dispensed through fluid communication lines 128 and/or onto surfaces for surface disinfection applications 320 a few of which, for example, and not a limitation, can include in reference 'A' dental line cleaning and disinfection including in reference 'B' oral cavity 318 disinfection of patients 306 using dental sprayers 134 or other suitable fluid transmission lines 128 and devices, in reference 'C' food or beverage lines cleaning and disinfection such as beer taps 310 and valves 138, or other similar taps and/or valves, and reference 'D' surface 312 cleanings and disinfection by a user 308 using a spray nozzle 136, which can be a valve, spray nozzle (fixed or detached), portable spray bottle, or other suitable devices.

For disclosure purposes, fluid transmission line 128 can include tubes, pipes, sprayers, spray bottles, faucets, valves, pumps, and other devices and lines. Such fluid transmission lines 128 can include food or beverage lines that carry beer, syrup concentrates, and other food or beverage fluids. Such fluid transmission lines 128 can include dental water lines commonly found in dental offices. Such dental water lines can include device and tool cleaning stations, hand washing sinks, and dental chair fluid supply lines typically for use with patients including tools, sprayers, spray bottles, sinks, faucets, valves, pumps, and other dental water line applications. Other fluid transmission lines 128 can include those associated with dispensing the microfoaming ozonated liquid 112 onto surfaces such as tables, counters, or other suitable surfaces, as may be required and/or desired in a particular embodiment.

In an exemplary embodiment, a microfoaming aqueous ozone disinfection system 100 can comprise an aqueous ozone generator 530 that receives water 104, a microfoaming agent 102, and an electrochemical generator 516 that comprises an ion exchange material 534. The electrochemical generator 516 can be integrated into the aqueous ozone generator 530. The electrochemical generator 530 is configured to receive water 104 and generate from the water 104 an ozonated concentrate liquid 114.

The microfoaming aqueous ozone disinfection system 100 can further comprise a mixer 106 that blends the microfoaming agent 104 with the ozonated concentrate liquid 114, creating a microfoaming ozonated liquid 112 that can dispensed for use in disinfecting one or more surfaces 130/312/318 including fluid transmission line 128 that comprises a surface 130 on the interior which is better illustrated in at least FIG. 6A.

In an exemplary embodiment, the microfoam 102 portion of the microfoaming ozonated liquid 112 operates to increase ozonated concentrate liquid 114 contact time and mechanical action on the surface 130/312/318 agitating scale, contaminates, pathogens, or biofilm buildup on the surface, improving the ability of the ozonated concentrate liquid portion of the microfoaming ozonated liquid 112 to dislodge, penetrate, and disinfect the surface 130/312/318.

Referring to FIG. 2, illustrated one example of a hygienization generator system 100/500. In an exemplary embodiment, in many bars, restaurants, and other establishments a plurality of food or beverage containers 202 can be stored in a backroom or other suitable location, and dispensing nozzles or valves 318 are located in customer areas 204. In operation, lengthy 314 fluid transmission lines 128 can be used to interconnect food or beverage containers 202 in the backroom with valves 316 in customer area 202. Such long lengthy 134 fluid transmission lines 128 require frequent cleaning and disinfection. An advantage, in the present invention, is that the microfoaming ozonated liquid can periodically be flushed down the fluid transmission lines 128 to clean and disinfect the interior surface 130. The microfoam portion of the microfoaming ozonated liquid operates to increase ozonated concentrate liquid contact time on the surface and agitate scale, contaminates, pathogens, or biofilm buildup on the surface, improving the ability of the ozonated concentrate liquid portion of the microfoaming ozonated liquid to disinfect the surface.

Figure 3:
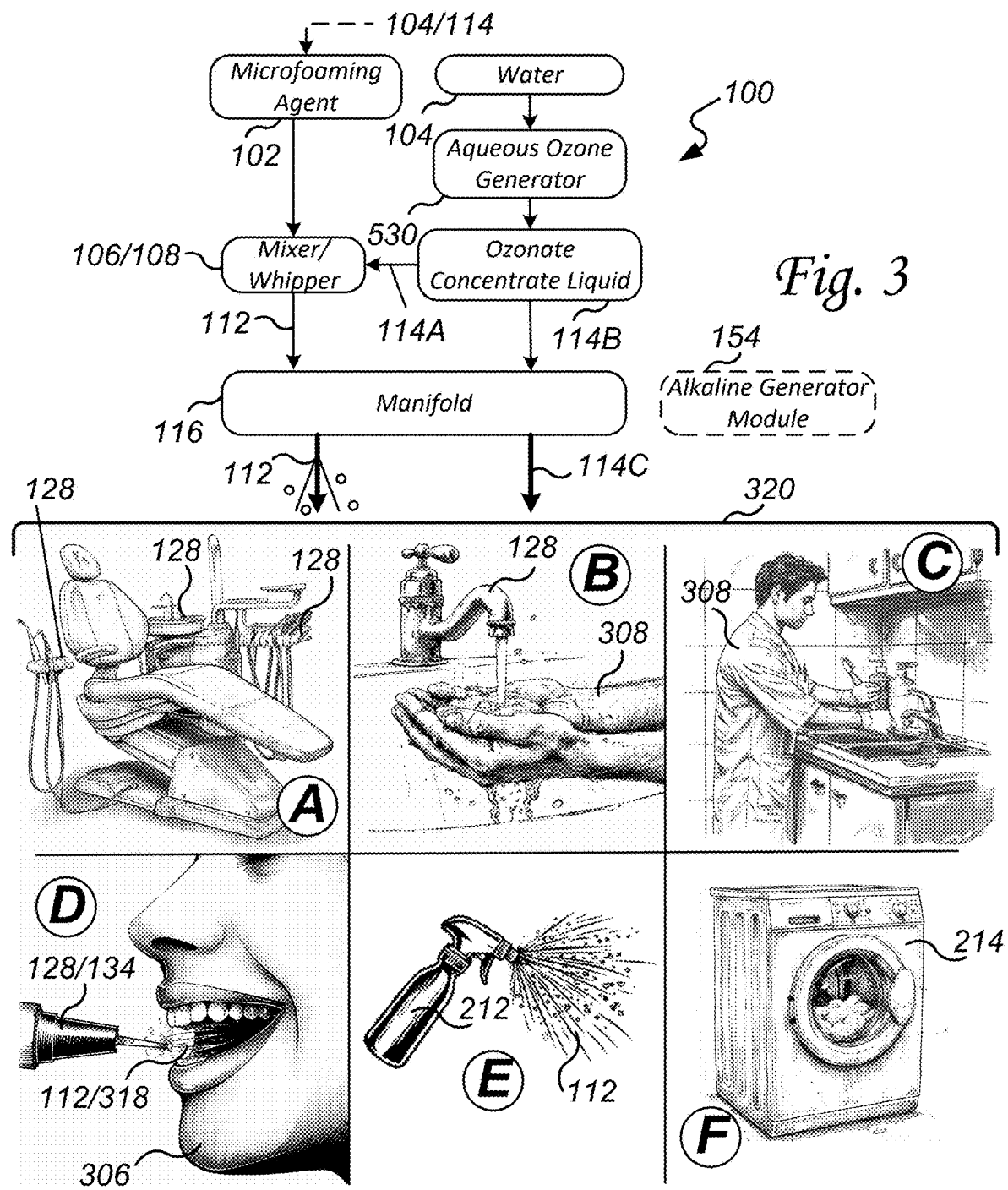

The alkaline water generation system can be seamlessly integrated into a microfoaming system through an alkaline generator module 154, as illustrated in at least FIGS. 2, 3, and 6A. This module incorporates all the necessary components of the present invention to generate, monitor, and control the addition of alkaline water into systems where ozonated liquid concentrate is combined with a microfoaming agent.

The alkaline generator module 154 is designed to produce alkaline water with adjustable pH levels, leveraging components such as an ion membrane 544, a mineral dispenser 546, and an electrolysis unit 516B. These components work in tandem to ensure precise control over the alkalinity of the generated water. Integrated sensors, including a pH sensor 540, continuously monitor the output, while the system's control unit 500 allows for dynamic adjustments based on operational requirements.

When combined with a microfoaming system, the alkaline water enhances the foam's chemical stability and reactivity, optimizing its performance for disinfection and cleaning tasks. The module facilitates the delivery of alkaline water into the system's mixing mechanism 106, where it interacts with the ozonated liquid concentrate and a microfoaming agent, such as nitrous oxide ($N_2O$), or other suitable microfoaming agents. The resulting foam benefits from the synergistic effects of alkalinity and microbubbles, providing superior coverage, penetration, and contact time on treated surfaces.

This modular approach allows for flexibility and scalability, enabling the alkaline generator module 154 to be retrofitted into existing systems or integrated into new setups designed for advanced sanitization applications. By combining alkaline water production with microfoaming technology, the invention addresses critical disinfection challenges while enhancing system versatility and efficiency.

Referring to FIG. 3, there is illustrated one example of a hygienization generator system 100/500. In an exemplary embodiment, fluid transmission line 128 can be dental water lines that run to points of use throughout a dentist's office. Such points of use can be, for example and not a limitation, in reference 'A' dental chairs, in reference 'B' sinks for hand washing and other purposes, in reference 'C' medical instrument washing and disinfection, in reference 'D' oral cavity dental 318 rinse for patients 306, in reference 'E' mobile spray bottles that are filled with microfoaming ozonated water 114 for disinfecting surfaces, in reference 'F' washing, and numerous other uses, as may be required and/or desired in a particular embodiment.

In an exemplary embodiment, the fluid transmission line 128 can be a food or beverage fluid transmission line, a dental water line, a wound treatment water line, a surgical water line, a washing machine water line, or other suitable type of lines, as may be required and/or desired in a particular embodiment.

In an exemplary embodiment, the microfoaming ozonated liquid 112 can be dispensed through the dental rinse nozzle 134 into the oral cavity 318 of a patient 306, wherein the oral cavity 318 of the patient is the surface.

In an exemplary embodiment, the dental rinse nozzle 134 can switch between dispensing, water 104, ozonated concentrate liquid 114, or microfoaming ozonated liquid 112, for maximum flexibility and patient treatment, as may be required and/or desired in a particular embodiment.

Figure 4:
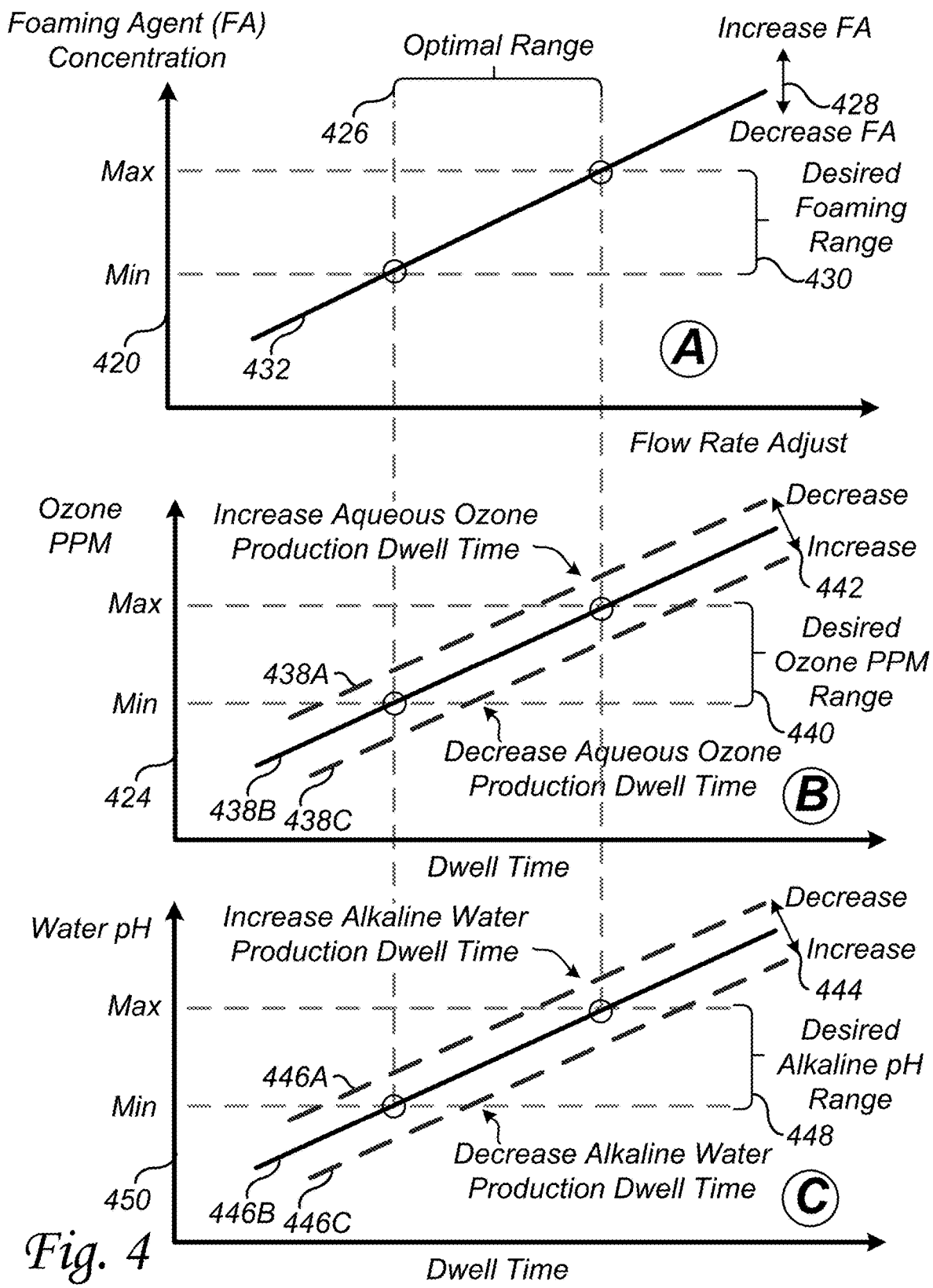
FIG. 4 illustrates one example of the relationship between foaming agent concentration and ozone concentration of the concentrated ozone liquid.

Referring to FIG. 4, there is illustrated one example of the relationship between the foaming agent concentration 420, the ozone concentration of the concentrated ozone liquid 424, and the alkalinity pH level 450 of the alkaline water 148. In an exemplary embodiment, there is an optimal range 426 between foaming agent concentration 420, ozone concentration 424, and alkalinity pH level 450.

In reference 'A', the foaming agent concentration 420 can be adjusted to a desired foaming range 430 which is also within the optimal range 426 of the microfoaming ozonated water 112. In this regard, the microfoaming agent 102 dosing amount 432 can be increased or decreased 428 to obtain the desired foaming range 430 and stay within the optimal range 426. Such microfoaming agent 102 dosing and flow rate adjustment can be accomplished by way of flow governors 122/142/146.

In reference 'B', the desired ozone ppm range 440 of the ozonated concentrate liquid 114 can be selected to achieve the desired disinfection level and/or desired log reduction. As an example and not a limitation, ozonated concentrate liquid 114 with a concentration level between a minimum 0.5 ppm and a maximum 1.5 ppm is often desired for surfaces 130/312/318 disinfection, though other concentrations can be selected, as may be required and or desired in a particular embodiment. To adjust the ozonated concentration 438A-C the water 104 flow rate can be adjusted 442. In this regard, decreasing 442 the flow rate allows the electrochemical generator 516 to operate on each portion of the water 104 longer increasing 438A the aqueous ozone concentration. Conversely, increasing 442 the flow rate of the water reduces the amount of time the electrochemical generator 516 has to operate on each portion of the water 104, decreasing 438C the aqueous ozone concentration.

The variability of ozone concentration can be controlled by adjusting the flow rate of the mixture 102/114/148 which adjusts the dwell time of the mixture passing through the aqueous ozone generator 530 including the electrochemical generator 516, in a continuous flow manner. Such can be controlled by modulating an orifice size either fixed, manual, or controlled by the control system 500 and associated pumps/valves/orifices.

In reference 'C', the desired alkaline water 148, pH range 448, can be selected to achieve the desired alkalinity level. In this regard, the hygienization generator system 100/500 is configured to produce alkaline water 148 with a dynamically adjustable pH range, which can be tailored to meet the specific needs of various applications or other suitable ranges as may be required or desired in a particular embodiment. For dental applications, such as cleaning dental water lines or providing patient oral rinses, a pH range of approximately 8.0 to 9.5 or other suitable values ensures effective biofilm disruption while maintaining safety for oral tissues and compatibility with delicate equipment. In laundry and cleaning systems, a pH range of 9.0 to 11.5, or as required for specific cleaning conditions, enhances the removal of organic residues and optimizes the oxidative potential of aqueous ozone. Food and beverage applications, including cleaning beer and soft drink lines, taps, and fountain equipment, typically benefit from a pH range of 7.5 to 9.5 or other appropriate levels to achieve sanitation without compromising taste or causing corrosion. Surface cleaning applications, such as disinfecting food preparation areas, often require a pH range of 8.0 to 10.0, but this may vary based on the surface material or microbial load. For miscellaneous applications, including agricultural produce washing, clean-in-place (CIP) processes, and vehicle sanitation, the pH can be adjusted between 7.0 and 11.5 or as otherwise desired to suit the specific requirements. The system's control system 500 allows for precise modulation of the pH level, ensuring the disinfection solution is optimized for performance, safety, and efficiency in diverse use cases.

To adjust the alkalinity of the water and achieve a desired pH level 446A-C, the flow rate 444 of the water 104 through the alkaline water generator 542 can be precisely controlled. By decreasing the flow rate 444, each portion of the water remains in the alkaline water generator 542 for a longer period, allowing the generator more time to perform the electrochemical or ion exchange processes necessary to increase the alkalinity concentration 446A. This extended dwell time enhances the generation of hydroxide ions or the dissolution of alkaline minerals, resulting in water with a higher pH.

Conversely, increasing the flow rate 444 reduces the time that each portion of the water spends in the alkaline water generator 542, thereby decreasing the extent to which the generator can elevate the alkalinity, resulting in a lower alkalinity concentration 446C. This dynamic flow rate adjustment provides a simple and efficient mechanism for tailoring the pH level of the alkaline water 148 to meet specific application requirements.

Flow rate control can be achieved through various mechanisms, such as modulating the orifice size in the flow path. The orifice can be designed to be: Fixed: A predetermined size optimized for a particular application.

Manually Adjustable: Allowing an operator to manually increase or decrease the orifice size to achieve the desired flow rate.

Dynamically Controlled: Using the control system 500, which interfaces with pumps, valves, and adjustable orifices to regulate the flow rate in real time. This configuration enables automated and precise control based on sensor feedback, user inputs, or pre-set application profiles.

This flow rate modulation ensures the system can deliver alkaline water 148 with a pH level tailored to various disinfection and cleaning applications. For instance, higher alkalinity may be beneficial for removing stubborn organic residues in laundry applications, while moderate alkalinity might be more suitable for food and beverage systems to prevent equipment corrosion. The control system 500 can store multiple preset profiles or allow for real-time adjustments, providing versatility and ease of use for a wide range of operational needs.

This method of alkalinity adjustment not only enhances the performance and adaptability of the hygienization generator system 100/500 but also reduces reliance on chemical additives, making the system more eco-friendly and cost-effective.

Referring to FIG. 5, there are illustrated examples of microfoaming agent 102 and ozonated concentrate liquid 114 flow governors 122/142/146. In an exemplary embodiment, flow governors 122/142/146 can be used throughout the hygienization generator system 100/500 as needed to regulate the dosing and/or flow rate of the microfoaming agent 102, water 104, microfoaming ozonated liquid 112, ozonated concentrate liquid 114, or other fluids. In operation, the flow governors 122/142/146 control the amount of microfoaming agent 102 in the microfoaming ozonated liquid 112, the concentration of the ozonated concentrate liquid 114 by adjusting the dwell time of the water 104 in the aqueous ozone generator 530, or regulating other parameters of the system, as may be required and/or desired in a particular embodiment. Additionally, other types or kinds of suitable governors can be used, as may be required and/or desired in a particular embodiment.

In an exemplary embodiment, flow governors 122/142/146 can be used to regulate 432 the amount of microfoaming agent 102 dosed into the microfoaming ozonated liquid 112. In this regard, flow governors 122/142/146 can increase 428 the dosing amount of microfoaming agent 102 in the microfoaming ozonated liquid 112 and can decrease 428 the dosing amount to reduce the amount of microfoaming agent 102 in the microfoaming ozonated liquid 112, and may be required and/or desired in a particular embodiment.

In an exemplary embodiment, one or more microfoaming agent governors 122/142/146 regulate the amount of the microfoaming agent 102 in water 104, controlling a microfoaming level 432 of the microfoaming ozonated liquid 112 within a desired microfoaming range 430.

In an exemplary embodiment, governer 122 can be an electronic pump/valve/orifice control, that can automatically adjust the flow rate of the desired fluid 102/104/112/114 by way of control system 500. Flow governor 142 can be a fixed adjust washer style with a variable size orifice that adjusts the flow rate of the desired fluid 102/104/112/114. Flow governor 146 can be manually adjustable style allowing a technician 302 or other authorized persons to manually adjust the flow rate of the desired fluid 102/104/112/114. Additionally, the manually adjusted flow governor 146 can have a range indicator 220 and an adjust indicator 206 which is movable with respect to the range indicator 220 to indicate the position or flow rate setting of the governor 146.

In an exemplary embodiment and with reference to at least FIGS. 4 and 5, flow governors 122/142/146 can be used to modulate the water 104 flow rate into the aqueous ozone generator 530 to regulate 438A-C the dwell time to change the ozone parts per million (PPM) concentration amount of the ozonated concentrate liquid 112. In this regard, the water 104 flow rate can be decreased, increasing the aqueous ozone production dwell time 442 through the electrochemical generator 516 which increases the ozone concentration level of the ozonated concentrate liquid 112 to be within the desired ozone concentration range 440. Conversely, the water 104 flow rate can be increased to lower the ozonated concentration level by reducing the dwell time 442 of the water 104 within the aqueous ozone generator 530.

In an exemplary embodiment, one or more flow governors 122/142/146 regulate an aqueous ozone production dwell time of the ozonated concentrate liquid through the electrochemical generator 516, controlling an ozone concentration level 438B of the ozonated concentrate liquid 114 within a desired ozone concentration range 440.

In an exemplary embodiment, at least one fluid transmission line 128 can have an interior 130 that comprises the surface. The microfoaming ozonated liquid 114 is dispensed into and through the fluid transmission line 128 disinfecting the surface 130.

Referring to FIG. 6A, there is illustrated one example of a control system 500 for the hygienization generator system 100/500. In an exemplary embodiment, control system 500 can be integrated into and control a hygienization generator system 100/500. In addition, control system 500 can be a web-enabled control system.

The term "web-enabled" or "web-enabled control system" or "web-enabled control system 500" in the present invention is intended to mean an Internet-of-things device. In this regard, a device that is capable of connecting a physical device such as a hygienization generator system 100/500 to the digital world. Stated differently, web-enabling is equipping a device with the necessary electronics to be monitored, and controlled, and data communicate locally and remotely with other data-communicating devices. Such other data-communicating devices can be smartphones, tablets, laptops, mobile communication devices, other web-enabled devices, remote data processing resources, servers, and similar devices.

Figure 7:
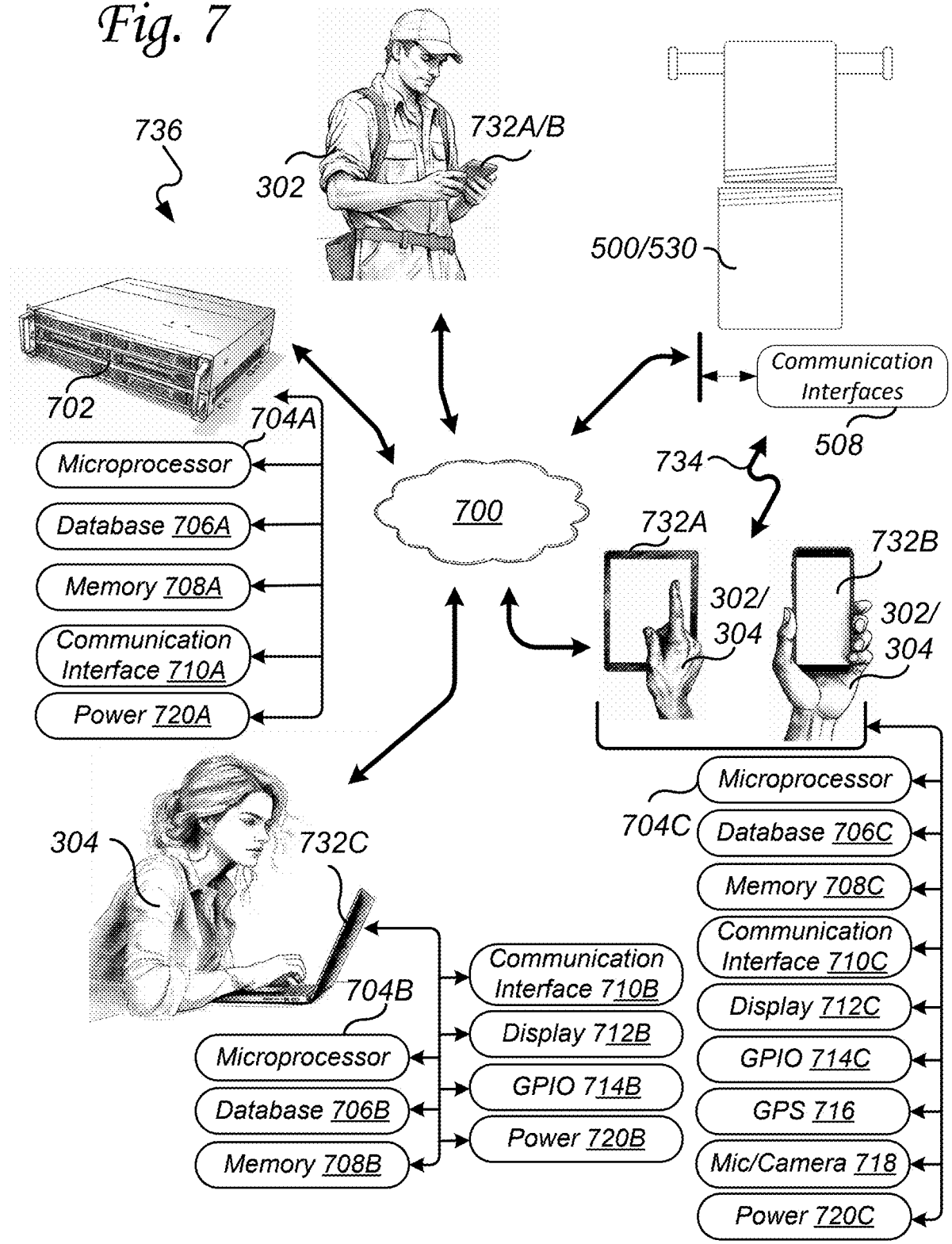
FIG. 7 illustrates one example of a system and network diagram.

In addition, and with reference to at least FIG. 7, such data communicating devices 732 can data communicate with remote data processing resources 702 and store and retrieve data from databases 706A-C, and other data processing resources, as may be required and/or desired in a particular embodiment. Laptops, smartphones, smartwatches, tablets, desktop computers, servers, mobile communication devices, and other types and kinds of data communication devices can all be data communicating devices 732 also referred to as computing devices 732.

In operation, a technician 302, an administrator 304, or other authorized people can use computing device 732 to interact with the aqueous ozone generator 530 or hygienization generator system. The aqueous ozone generator 530 can comprise the electrochemical generator 516 and ion exchange material 534.

In this regard, a technician 302 can be a person who operates, maintains, cleans, configures, repairs, or performs other functions on or with the aqueous ozone generator 530 or hygienization generator system 100/500. An administrator 304 can be a person who administers, provides remote service or technical support, or be other types or kinds of authorized user, as may be required and/or desired in a particular embodiment.

In operation the control system 500, by way of the communication interface 508 can data communicate with remote data processing resources 702. Such remote data processing resources 702 can be servers or other types or kinds of data processing resources. Furthermore, data communicating devices 732, remote data processing resources 702, data storage resources 706A-C, and other types and kinds of data communicating devices can data communicate over a global network 700. The Internet is a global network 700.

In an exemplary embodiment and with reference to at least FIG. 6A, the hygienization generator system 100/500 can be equipped with a web-enabled control system 500. Such a web-enabled control system 500 can comprise a microcontroller 502 which is operationally related to a memory 504, a display 506, a plurality of communication interfaces 508, general purpose input and outputs (GPIO) 510, a plurality of sensors 512, a global position system (GPS) 514, an electrochemical generator 516 with an ion exchange material 534, a humidity sensor 518, a current sensor 520, a plurality of ozone sensors 522, an accelerometer 524, a power supply 526, a flow controller 528, an aqueous ozone generator 530, a TDS sensor 532, a water ($H_2O$) conductivity sensor 536, and a microfoam agent level detector 538.

The microcontroller 502 can be INTEL, ZILOG, MICROCHIP, AMD, ARM, and/or other types or kinds of microcontrollers.

The memory 504 can be a combination of random access memory (RAM), read only memory (ROM), flash, hard drives, solid-state drives, USB flash drives, and/or other types and kinds of memory.

The display 506 can be a liquid crystal display (LCD), organic light emitting diode (OLED), or light emitting diode (LED), as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, second-generation (2G), third-generation (3G), fourth-generation (4G), or fifth-generation (5G) compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system 500, by way of the communication interface 508, data communicates with the remote data processing resource 702, data communication devices 732, and other data processing resources in a local area network environment or a wide area network environment across a global network 700 in a wired or wireless manner as may be required and/or desired in a particular embodiment. The Internet is a global network 700.

The GPIO 510 can be transistor-to-transistor (TTL), complementary metal-oxide-semiconductor (CMOS), transistors, buffers, relays, pushbuttons, switches, and/or other types and kinds of GPIO circuits.

The sensors 512 and/motion sensor 518 can be passive infrared (PIR) motion sensors, infrared, thermal, Doppler radar, ultrasonic, capacitance, touch-type, optical, Hall effect, switch, fingerprint, and other types of biometric sensors, and/or other types and kinds of sensors. Additionally, sensor 512 can be ambient condition sensors such as temperature, moisture, humidity, sunlight, and/or other types and kinds of sensors.

In an exemplary embodiment, analog-type sensor determinations can be converted to digital values so that the microcontroller 502 can process the data. Alternatively, the microcontroller 502 can perform analog-to-digital conversions if equipped to perform such functions.

The global positioning system (GPS) 514 can be used to track the location of the hygienization generator system 100/500, and data communicates by way of the communication interface 508 to remote data processing resources 702. In operation, reports, maps, and other information can then be used to inform the motion of and or location of the hygienization generator system 100/500.

The electrochemical generator 516 can be an electrolysis-based device that utilizes ion exchange material 534 and other devices and processes to produce chemical compounds from water such as ozone $O_3$.

The humidity sensor 518 can be utilized to determine the surrounding environment 202 humidity level.

The current sensor 520 can be configured to measure the supply electrical current to the electrochemical generator 516, the aqueous ozone generator 530, a combination 516/530 thereof, and/or other devices and systems, as may be required and/or desired in a particular embodiment.

The ozone sensor 522 can be configured to monitor the ozone concentration supplied to the system or other sources of ozonated liquid, as may be required and/or desired in a particular embodiment.

The accelerometer 524 can be configured to monitor the motion systems and devices, as required and/or desired in a particular embodiment.

The power supply 526 can be AC, DC, battery, solar, and/or other types and kinds of power supplies.

The flow controller 528 can be used to control a plurality of pumps/valves/orifice controls 120. Such flow controller 528 and the plurality of pumps/valves/orifice controls 120 can be actuated and/or controlled by way of relays, metal-oxide-semiconductor field-effect transistors (MOSFET), or other types and kinds of controlling devices.

The aqueous ozone generator 530 receives water as an input and uses the electrochemical generator 516 which is integrated into the aqueous ozone generator 530 to produce high concentrations of aqueous ozone molecules. Such concentrations of aqueous ozone can range from 1 ppm to 10 ppm or other desired range, as may be required and/or desired in a particular embodiment.

The total dissolved solids (TDS) sensor 532 can be a conductivity-based sensor or other types or kinds of TDS sensor, as may be required and/or desired in a particular embodiment.

The water conductivity sensor 536 can be a contacting, inductive, or other types or kinds of sensors, as may be required and/or desired in a particular embodiment.

The microfoam agent level detector 538 can be configured to monitor and determine the amount of the microfoam agent 102 remaining for use. The microfoam agent 102 is a consumable in the system 100 that periodically needs replenishment. In this regard, in an exemplary embodiment, when the microfoam agent level detector indicates replenishment of the microfoam agent 102 is desirable the cartridge 140 that comprises the microfoam agent 102 can be replaced by a technician 302.

The microfoam agent level detector 538 can be contacting or switch style, optical, weight, inductive, capacitive, or other types or kinds of sensors, as may be required and/or desired in a particular embodiment.

Figure 6B:
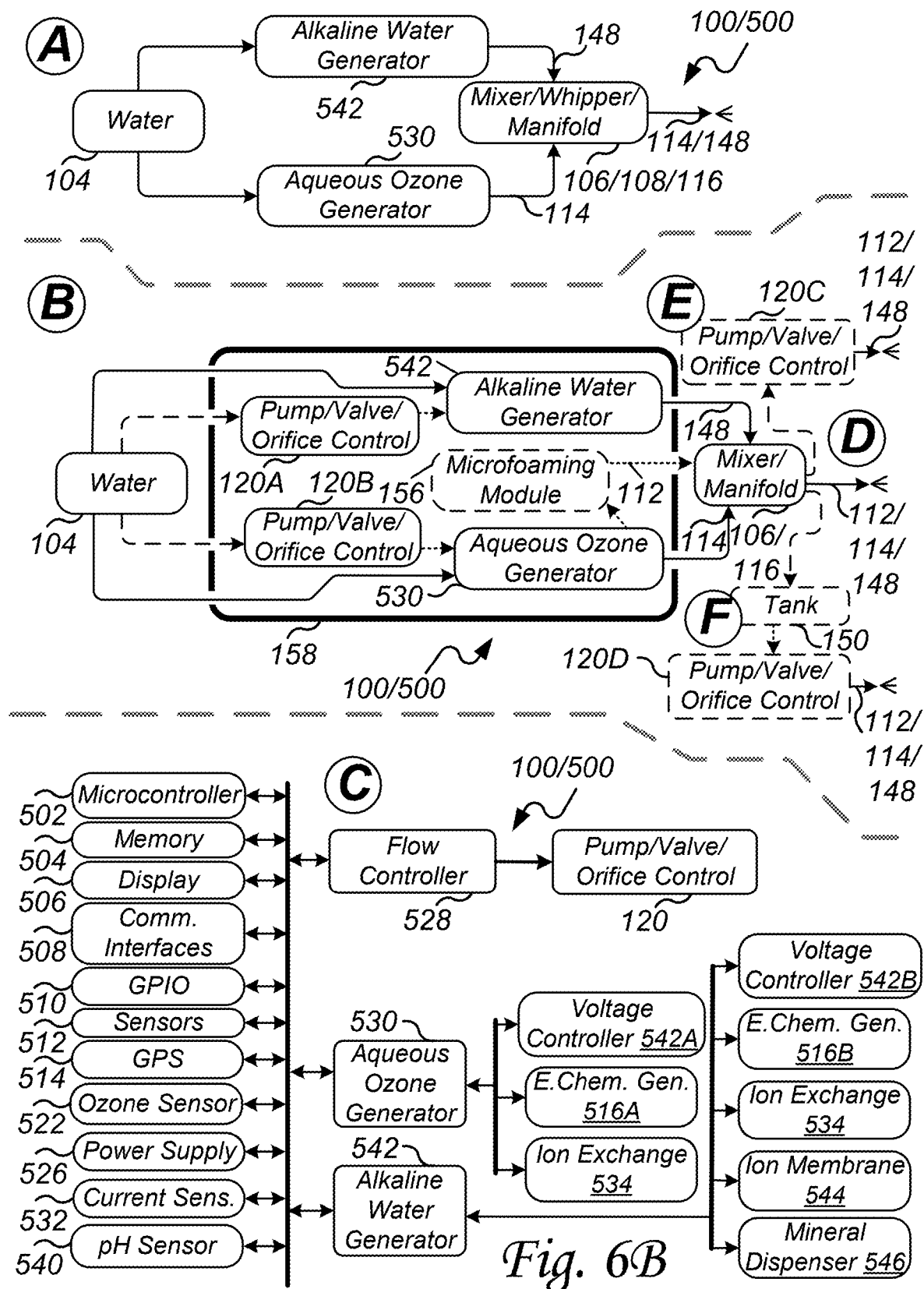
FIG. 6B illustrates one example of a hygienization generator system for integrated aqueous ozone and alkaline water production system block diagram.
Figure 6D:
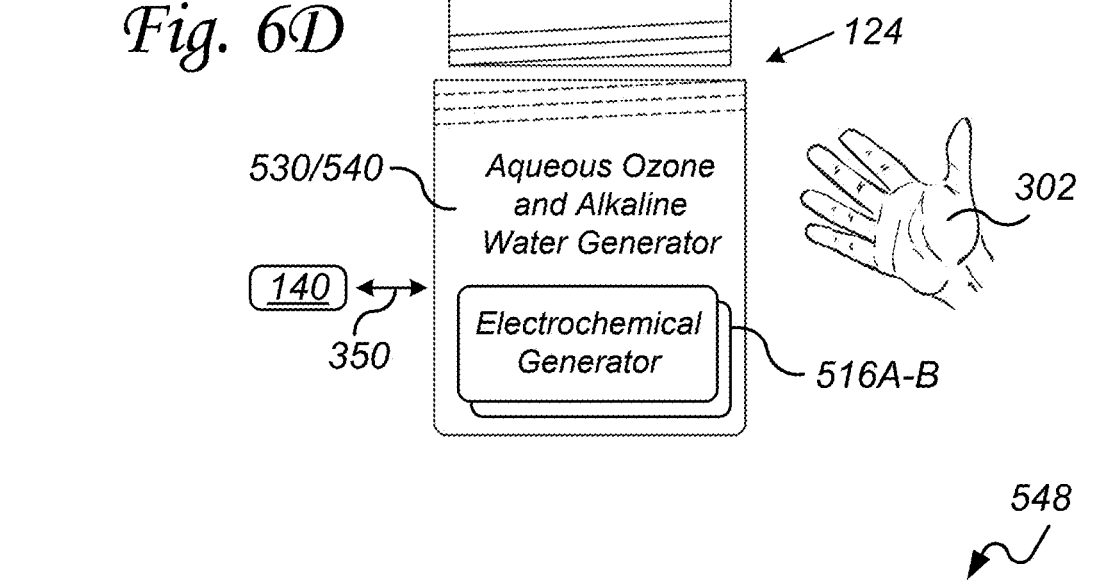
FIG. 6D illustrates one example of a combined aqueous ozone and alkaline water generator.
Figure 6E:
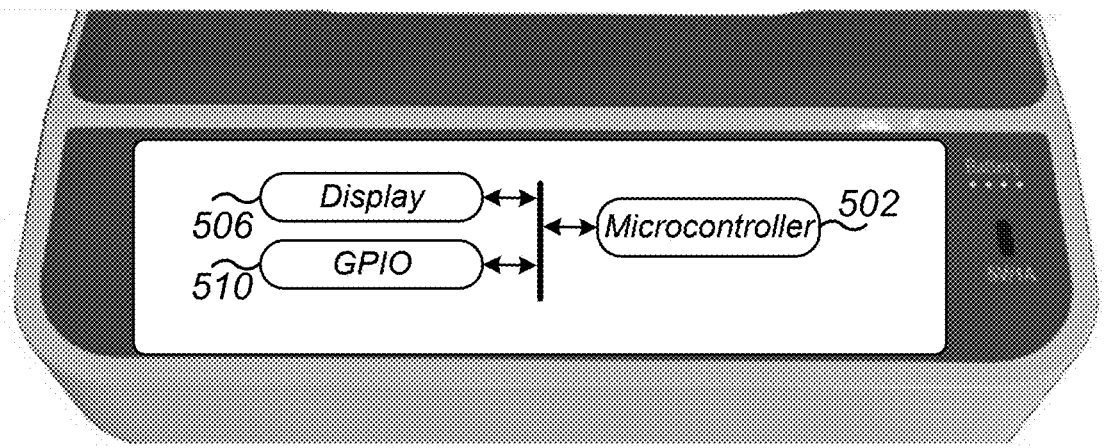
FIG. 6E illustrates one example of a user interface.

In an exemplary embodiment, and with reference to FIG. 6E, the user interface 548 for the hygienization generator system 100/500 provides a versatile and user-friendly platform for monitoring, configuring, and controlling the system. The user interface can comprise multiple input and output capabilities to accommodate a wide range of operational needs and user preferences. Key components of the user interface can comprise:

Display 506: The interface may include a display for visually presenting real-time data such as ozone concentration, pH levels, flow rates, and system status.

Touchscreen Display 506: A touchscreen display can further enhance functionality by allowing users to interact directly with on-screen controls, such as sliders, buttons, or drop-down menus, to adjust parameters or access preset configurations.

General Purpose Input/Output (GPIO) 510: The GPIO provides hardware support for physical input mechanisms, such as buttons or switches, and output mechanisms, such as light-emitting diodes (LEDs), to indicate system status or alerts.

Optionally Communication Interface 508: The interface may include a communication module configured to exchange data with a remote data processing resource 702, such as a server 702 or a computing device 732. This enables remote monitoring, diagnostics, and configuration of the system. Communication can occur via wireless protocols, such as Wi-Fi, Bluetooth, or cellular networks, depending on the system's configuration.

Other Components and features, as may be required and/or desired in a particular embodiment.

The user interface 548 further supports enhanced functionality by incorporating multiple input methods and operational features, such as:

Button Input Capabilities: Through the GPIO 510, the user interface can include a variety of physical buttons for intuitive control. These buttons may be used for tasks such as starting and stopping the system, selecting presets, or adjusting flow rates and other parameters. The tactile feedback of physical buttons can provide a reliable alternative to touchscreen controls, especially in environments where gloves or other factors may limit the effectiveness of touch inputs.

Customizable Indicators: LEDs integrated into the GPIO can visually indicate the system's operational status, such as readiness, processing, or error states. These indicators provide quick, at-a-glance updates for users in fast-paced or high-demand settings.

The user interface 548 is operationally related to the microcontroller 502, which serves as the central processing unit for the hygienization generator system 100/500. The microcontroller manages the interaction between the user interface and the system's operational components, ensuring that user inputs are translated into precise adjustments to the system's performance. For example:

User adjustments to ozone concentration through the touchscreen display are relayed to the aqueous ozone generator 530, where the flow controller 528 and electrolysis unit 516A adjust parameters accordingly.

pH level modifications input through physical buttons are processed by the microcontroller 502, which regulates the operation of the alkaline water generator 542, including its mineral dispenser 546 and ion membrane 544.

The inclusion of a communication interface 508 further extends the capabilities of the user interface 548 by enabling remote interaction. Through data exchange with a remote data processing resource 702, such as a server or smartphone application on a computing device 732, users can monitor system performance, adjust settings, or troubleshoot issues from any location. This remote functionality enhances the system's scalability, making it ideal for organizations managing multiple units across different sites.

In addition to operational functionality, the user interface 548 is designed with user convenience in mind. The combination of touchscreen controls, physical buttons, and remote communication options ensures accessibility for users with varying technical skills and environmental constraints. For example:

Operators in industrial settings can rely on physical buttons for adjustments when the touchscreen may be less practical.

Technicians can use remote monitoring tools to troubleshoot or optimize system performance without being physically present at the unit.

This flexible and robust user interface design underscores the hygienization generator system 100/500's adaptability and efficiency, providing an intuitive and comprehensive tool for managing complex disinfection and sanitization processes.

Referring to FIG. 6B, there is illustrated an exemplary hygienization generator system 100/500 can be configured as an integrated block diagram for the production of alkaline water 148 and ozonated concentrate liquid 114. This system represents a dynamic and modular design capable of producing and combining these solutions with precision to meet diverse disinfection and sanitization needs.

In an exemplary embodiment, as shown in reference 'A', water 104 is supplied to both an alkaline water generator 542 and an aqueous ozone generator 530. The alkaline water generator 542 processes the water to produce alkaline water 148, dynamically adjustable in pH level based on application requirements. Simultaneously, the aqueous ozone generator 530 generates ozonated concentrate liquid 114 by subjecting the water to an electrochemical process using an ion exchange material and an electrolysis unit to achieve the desired ozone concentration.

The alkaline water 148 and ozonated concentrate liquid 114 are then directed to one or more downstream mixing components, which may include:

Mixer 106: A static or dynamic mixer designed to homogenize the combined outputs effectively.

Whipper 108: An optional agitation device that enhances mixing by introducing turbulence, which can further improve the uniform distribution of the two liquids.

Manifold 116: A distribution mechanism that allows controlled flow paths for the combined solution, ensuring consistent output characteristics.

The combination of alkaline water 148 and ozonated concentrate liquid 114 results in a tailored disinfection and sanitization solution with the desired ozone concentration and alkalinity levels. This mixed solution is output from the mixer 106, whipper 108, or manifold 116, depending on the system configuration and specific application requirements.

The system design provides flexibility and scalability, allowing users to adjust both the pH level of the alkaline water and the ozone concentration of the solution to address a wide range of disinfection needs. For instance:

High alkalinity and high ozone concentration can be used for aggressive disinfection tasks, such as removing biofilms from industrial piping systems.

Moderate alkalinity with moderate ozone concentration may be appropriate for applications in food and beverage systems to ensure effective cleaning without risking material degradation or taste alteration.

Low alkalinity and ozone concentration may be suitable for gentle applications, such as washing produce or disinfecting sensitive surfaces.

By incorporating the optional whipper 108, the system can also introduce turbulence or microbubbles into the solution, further enhancing its ability to penetrate confined spaces and adhere to complex surfaces. This feature is particularly useful for applications where biofilm removal or enhanced contact time is critical, such as in clean-in-place (CIP) processes for food and beverage systems or industrial sanitation.

The hygienization generator system 100/500 is managed by the control system 500, which monitors and adjusts operational parameters in real time. Sensor feedback from components within the system ensures precise control over flow rates, mixing ratios, ozone levels, and pH levels, providing users with a fully integrated and customizable disinfection solution.

This block diagram highlights the innovative integration of components within the hygienization generator system 100/500, demonstrating its ability to deliver highly effective, eco-friendly, and adaptable solutions for a variety of disinfection and sanitization applications.

In another exemplary embodiment, as illustrated in reference 'B', the hygienization generator system 100/500 can be configured in various arrangements that can be interchangeably combined in part or in whole to meet specific disinfection and sanitization needs. These configurations provide flexibility for adapting the system to diverse applications and operational requirements. The incorporation of additional components such as valves, check valves, filters, and other suitable devices ensures the system can be tailored to specific embodiments, as required or desired.

When the water source 104 is under pressure-such as from a municipal water supply, another pumping system, or other pressurized systems—the water can be routed directly to the alkaline generator 542 and the aqueous ozone generator 530. In these embodiments, the system takes advantage of the existing water pressure to eliminate the need for supplementary pumps, simplifying the setup and conserving energy.

Alternatively, if the water source 104 lacks sufficient pressure, components such as pumps/valves/orifice controls 120A-B can be employed to deliver water to the alkaline generator 542 and aqueous ozone generator 530. These control components enable precise regulation of flow rates and pressures, ensuring optimal operation of the generators and maintaining consistent production of alkaline water 148 and ozonated concentrate liquid 114.

Additionally, the system can include an optional microfoaming module 156 to produce microfoaming ozonated liquid 112. This module incorporates components such as a microfoaming agent and supporting devices to introduce microbubbles into the solution, enhancing its penetration and adherence to surfaces. The microfoaming feature is particularly effective for biofilm removal and in applications requiring extended contact time, such as pipe and tubing disinfection or complex equipment cleaning.

The produced alkaline water 148, ozonated concentrate liquid 114, and optionally microfoaming ozonated liquid 112 are received at a manifold 116 for distribution. Depending on the application, several output configurations are possible, as illustrated in the following references:

Reference 'D': If the fluid in the system is under sufficient pressure, the mixture of alkaline water 148, ozonated concentrate liquid 114, and optionally microfoaming ozonated liquid 112 can be directly dispensed for immediate use in disinfection and sanitization applications. This pressurized delivery is efficient for tasks such as surface spraying, immersion cleaning, or misting.

Reference 'E': In cases where additional regulation of the outflow or pressure is required, a pump/valve/orifice control 120C can be employed to manage the distribution of the mixture. This ensures precise delivery at the desired pressure and flow rate, enabling effective application in environments with specific operational constraints, such as agricultural irrigation systems or delicate food processing equipment.

Reference 'F': For applications requiring temporary storage, the outflow of alkaline water 148, ozonated concentrate liquid 114, and optionally microfoaming ozonated liquid 112 can be collected in tank 150. The stored mixture can then be distributed as needed using a pump/valve/orifice control 120C, allowing the system to accommodate intermittent or batch operations. This approach is advantageous for facilities with variable demand, such as industrial sanitation or large-scale produce washing.

This embodiment demonstrates the hygienization generator system 100/500's ability to adapt to a wide range of operational conditions and disinfection requirements. By incorporating modular components and dynamic flow control mechanisms, the system offers unparalleled versatility, ensuring that the output solution is optimally configured for performance, efficiency, and safety across diverse use cases.

Referring to reference 'C', the hygienization generator system 100/500 includes a variety of components that work in coordination with the control system 500 to ensure precise production and monitoring of the disinfection solution. The control system, operationally managed by the microcontroller 502, interacts with multiple sensors and controllers to regulate the system's performance.

The system includes a pH sensor 540, which measures the pH level of the alkaline water 148 in real time. This sensor provides critical feedback to the microcontroller, enabling the system to dynamically adjust production parameters to meet specific application requirements. The control system further incorporates a flow controller 528, which can enable or disable pumps, valves, and orifice controls 120. The flow controller also provides fine-tuned regulation of fluid dynamics, ensuring consistent flow rates and mixing ratios throughout the system.

The aqueous ozone generator 530 is equipped with key components to optimize the production of ozonated concentrate liquid 114. This includes:

Ion exchange material 534: Enhances the efficiency of ozone generation by selectively exchanging ions to maintain an optimal chemical balance.

Electrochemical generator 516A: Converts water into ozonated liquid using an electrolysis process, creating a highly reactive disinfection solution.

Voltage controller 542: Regulates the power supplied to the electrochemical generator, allowing precise control over the ozone concentration in the output solution.

The alkaline water generator 542 is similarly designed with advanced features to ensure reliable production of alkaline water 148:

Mineral dispenser 546: Adds minerals such as calcium, magnesium, or potassium to enhance the alkalinity of the water. This dispenser can be configured to adjust the mineral concentration based on the desired pH range for specific applications.

Ion membrane 544 and/or ion exchange material 544: Facilitate the separation of ions during the water treatment process, contributing to the consistent production of alkaline water.

Electrochemical generator 516B: Operates in conjunction with the ion exchange material and ion membrane to increase the hydroxide ion concentration in the water, raising its pH level.

Voltage controller 542: Similar to the aqueous ozone generator, this component regulates the power supplied to the electrochemical generator, enabling precise adjustment of the alkalinity concentration.

The integration of these components allows the hygienization generator system 100/500 to produce tailored solutions for a wide range of disinfection and sanitization applications. The microcontroller 502 continuously monitors input from sensors like the pH sensor 540, as well as operational parameters from the flow controller 528, to dynamically adjust the system's performance. This ensures that both the ozonated concentrate liquid 114 and alkaline water 148 are produced at optimal levels for the specific requirements of the intended use.

By combining these advanced features with modular design and real-time control, the system provides a flexible and efficient approach to disinfection, capable of adapting to varied operational needs and delivering superior performance over conventional methods.

In one exemplary embodiment, the hygienization generator system 100/500 includes an aqueous ozone generator 530, which utilizes an ion exchange material 534 and an electrolysis unit 516A to produce ozonated concentrate liquid 114. The ion exchange material 534, such as a cation-exchange resin, enhances ozone production efficiency by maintaining optimal ion balance within the generator. The system further includes an alkaline water generator 542, which produces alkaline water 148 with an adjustable pH level. The outputs from both generators 530/542 are directed to a mixer, which can be manifold 116 or other suitable mixers, where the solution is homogenized to ensure consistent quality and even distribution of ozone and alkalinity solution 112/114.

The system is equipped with a control unit 500, which is operationally connected to the aqueous ozone generator 530 and the alkaline water generator 542. The control unit dynamically adjusts the ozone concentration and pH level based on user inputs. This feedback-driven control is facilitated by sensors, including a pH sensor 540 and an ozone concentration sensor 522, which continuously monitor output characteristics and provide data to the control unit for real-time adjustments. These capabilities allow the system to produce disinfection solutions tailored to specific applications, such as surface cleaning, produce washing, or industrial sanitization.

In another embodiment, the system includes a first flow controller 528 configured to regulate the dwell time of water within the alkaline water generator 542. By decreasing the flow rate, the system increases the contact time, resulting in higher pH levels and alkalinity (e.g., pH level 446A). Conversely, increasing the flow rate reduces the contact time and lowers the PH level (e.g., pH level 446C). Similarly, a second flow controller 528 adjusts the dwell time within the aqueous ozone generator 530, enabling precise control over the concentration of ozonated concentrate liquid 114.

For enhanced usability, the system incorporates a user interface 548 that allows operators to select desired operational parameters, including target pH levels and ozone concentrations. The user interface 548 also provides access to pre-set operational modes stored within a memory module 520 of the control unit 500. These presets simplify system reconfiguration for common applications, such as biofilm removal, healthcare disinfection, and food preparation area sanitization.

The system may also include additional safety and maintenance features. For example, an integrated alarm system, which comprises lights, noise, and data communication components of the system 500, alerts users to deviations in pH levels or ozone concentrations, ensuring the system operates within optimal parameters.

The operation of the hygienization generator system 100/500 follows a structured method. The operator selects desired output characteristics via the user interface 548, after which the aqueous ozone generator 530 and alkaline water generator 542 produce solutions based on the specified parameters. These outputs are combined to homogenize the solution in a mixer, which can be manifold 116 or other suitable mixers. The resulting disinfection solution is then dispensed for immediate use in various disinfection and sanitization applications.

These embodiments showcase the versatility and advanced functionality of the hygienization generator system 100/500, which integrates components such as the pH sensor 540, and flow controllers 528 to deliver high-performance, eco-friendly, and customizable solutions for a wide range of applications. The modular and scalable design ensures adaptability to diverse operational requirements, making the system a reliable and innovative tool for modern hygiene challenges.

In another exemplary embodiment, the hygienization generator system 100/500 can include a first electrochemical generator 516A configured to produce ozonated concentrate liquid 114 using an ion exchange material 534A and electrolysis. This generator is complemented by a second electrochemical generator 516B, which produces alkaline water 148 with an adjustable pH level. Both generators can be housed in a compact housing, which positions the components in a side-by-side configuration, optimizing space and ensuring efficient system integration.

The system incorporates a control system 500, which is operationally connected to both the first and second electrochemical generators 516A-B. The control system 500 independently regulates the ozone concentration and pH level based on user inputs or pre-set operational parameters. This precise control ensures the solution produced by the system is tailored to specific disinfection or cleaning requirements. A user interface 548 allows operators to customize output characteristics, such as the target pH and ozone levels, offering flexibility for diverse applications, including surface sanitization, industrial cleaning, and food preparation area disinfection.

For enhanced safety, the system can equipped with a safety mechanism, which can comprise various lights, sound, sensors, and data communication components of the system 500, which continuously monitors operational parameters and deactivates the system in response to anomalies, such as deviations in pressure, flow rate, or temperature. This feature ensures safe and reliable operation in various environments.

In another embodiment, the hygienization generator system 100/500 includes a data logging module 520, configured to record key operational parameters such as pH level and ozone concentration. This module enables tracking of system performance over time, providing valuable data for quality assurance, compliance reporting, and system diagnostics.

The system can further include a first flow controller 528 that adjusts the dwell time of water within the alkaline water generator 542, allowing precise modulation of the pH level. By increasing or decreasing the flow rate, the system ensures that the alkalinity of the water is tailored to meet application-specific needs. Similarly, a second flow controller 528 regulates the dwell time of water within the aqueous ozone generator 530, ensuring consistent and optimal ozone concentration in the output solution. These flow controllers work in conjunction with the control system 500 to dynamically adapt to changing requirements.

To ensure thorough mixing of the outputs from both electrochemical generators, the system is equipped with a mixing mechanism which can be manifold 116 or other suitable mixers. This mixing mechanism homogenizes the ozonated concentrate liquid 114 and alkaline water 148, producing a consistent and effective disinfection solution. The homogenized solution can be dispensed directly or directed to additional components, such as spray nozzles or immersion tanks, for application in specific disinfection tasks.

These embodiments of the hygienization generator system 100/500 demonstrate its advanced functionality, incorporating key components such as the housing 158, control system 500, user interface 548, and flow controllers 528, along with features like the data logging and mixing mechanisms. Together, these elements provide a robust, versatile, and customizable solution for modern disinfection and sanitization challenges across a wide range of industries.

In another exemplary embodiment, the portable hygienization generator system 100/500 is housed within a compact housing 158, designed to enclose both an aqueous ozone generator 530 and an alkaline water generator 542. The portable system can include a battery-powered power supply 526, operationally connected to both generation units, enabling autonomous operation in locations without access to external power sources. This portability makes the system particularly suitable for remote or on-the-go disinfection tasks, such as outdoor equipment cleaning, healthcare sanitation, quick-serve restaurants, or agricultural applications.

The system features a modular output assembly 552 equipped with a valve, spray nozzle (fixed or detached), or other suitable devices that can be tailored for specific applications, including misting, spraying, or liquid dispensing. These modular nozzles 136 allow the system to adapt to a wide variety of disinfection tasks, such as surface sanitization, produce washing, or HVAC duct cleaning. The mixing mechanism 106 combines the outputs from the aqueous ozone generation unit 530 and alkaline water generation unit 542, producing a homogeneous solution that is consistently mixed for effective application.

The system incorporates at least one sensor 512/522/532/540, configured to monitor operational parameters such as pH levels and ozone concentration. The sensor provides real-time feedback to the control system, ensuring precise regulation of the solution's composition. This allows the portable hygienization generator to produce solutions tailored to specific applications, such as high-ozone solutions for biofilm removal or moderate pH solutions for surface disinfection.

In another embodiment, the system includes a first flow controller 528 to adjust the dwell time of water within the alkaline water generator 542. By modulating the flow rate, the alkaline water generator 542 can vary the pH level of the alkaline water 148, enabling the production of customized solutions for different disinfection needs. For example, longer dwell times result in higher pH levels, suitable for breaking down organic residues, while shorter dwell times produce lower pH levels for general-purpose cleaning.

The alkaline water generation unit 542 can also include a mineral dispensing system 546, which can be used to introduce minerals such as calcium, magnesium, or other compound to enhance the water's alkalinity. This feature provides additional flexibility, allowing the generator to create solutions with specific chemical properties for targeted applications, such as equipment cleaning or industrial sanitization.

The operation of the portable hygienization generator system 100/500 follows a straightforward method. The user configures operational parameters, such as desired pH levels and ozone concentration, through a user interface 548. The aqueous ozone generation unit 530 and alkaline water generation unit 542 are then activated to produce their respective outputs. These outputs are combined in one or more mixing mechanisms 106/108/116 to form a homogeneous disinfection solution, which is subsequently applied to a surface or target area using the modular output assembly 552. This method ensures consistent and effective application across a wide range of disinfection tasks.

In a further embodiment, the system includes a data logging, configured to record and transmit operational data such as ozone concentration and PH levels to a remote monitoring system 736. This feature provides valuable insights into system performance, enabling real-time monitoring, diagnostics, and compliance tracking for regulated industries such as healthcare or food processing.

These embodiments highlight the versatility and advanced functionality of the portable hygienization generator system 100/500, showcasing its ability to deliver high-performance disinfection solutions in a compact, adaptable, and user-friendly design.

Referring to FIG. 6C, there is illustrated an example of an aqueous ozone generator 530 in reference A and an alkaline water generator 542 in reference B. These components are housed within a plumbed housing 160, which is designed for easy integration into a fluid system, such as a pipe network in a kitchen, factory, or other suitable locations. The plumbed housing 160 provides a streamlined installation process that reduces system downtime and maintenance complexity.

An advantage of the present invention is that once the plumbed housing 160 is installed and the liquid lines are connected, there is no need to disconnect or remove the liquid lines to service or replace the aqueous ozone generator 530 or the alkaline water generator 542. This design significantly reduces the time and cost associated with maintenance while also minimizing the risk of leaks caused by repeated disconnecting and reconnecting of liquid-carrying hoses. This feature is particularly beneficial in high-use environments where downtime needs to be minimized and reliability is critical.

In an exemplary embodiment, both aqueous ozone production and alkaline water production rely on electrolysis performed by an electrochemical generator 516, in combination with consumable components such as ion exchange materials 534, ion membranes 544, minerals, or other suitable consumable items. Over time, these consumable components are depleted during operation, requiring periodic replacement to maintain system performance. To address this, the invention employs a plumbed housing 160 that is permanently installed or fastened in place, allowing for quick and easy replacement of the aqueous ozone generator 530 and alkaline water generator 542.

In this configuration, the respective generator 530/542 can be detached from the plumbed housing 160 by unscrewing fasteners 124 or using other suitable attachment mechanisms. This modular design allows the generators to be exchanged or serviced by a technician 302 without the need to disturb the surrounding fluid system. The ease of removal and replacement reduces system downtime and facilitates efficient maintenance, making the system highly practical for commercial and industrial applications.

In another exemplary embodiment, the invention includes a cartridge 140 containing consumable components, such as ion exchange materials 534, ion membranes 544, or minerals. This cartridge is designed to slide 350 in and out of the generator 530/542, allowing the technician to replace the depleted consumable materials without removing the entire generator. This further enhances the maintenance process by isolating the consumable components, enabling quicker and more cost-effective servicing.

In the configuration illustrated in reference A, water 102 enters the aqueous ozone generator 530, where it undergoes electrolysis and exits as ozonated concentrate liquid 114, ready for use in disinfection or cleaning applications. In the configuration shown in reference B, water 102 enters the alkaline water generator 542, where it is treated to increase its alkalinity and exits as alkaline water 148, with a pH level tailored for specific disinfection or cleaning needs.

These embodiments demonstrate the innovative modularity and serviceability of the hygienization generator system 100/500, providing an efficient, user-friendly solution for maintaining system performance. The combination of permanently plumbed housing, removable generators, and sliding cartridges ensures the system is adaptable to high-demand environments, offering flexibility, reliability, and ease of maintenance.

Referring to FIG. 6D, there is illustrated an exemplary embodiment of a combined aqueous ozone generator 530 and alkaline water generator 542. This configuration integrates the production of ozonated concentrate liquid 114 and alkaline water 148 into a unified system, providing a compact and efficient solution for disinfection and sanitization applications.

In this embodiment, the system includes two distinct electrochemical generators 516. The first electrochemical generator 516A is configured for the production of aqueous ozone, utilizing an ion exchange material 534 and an electrolysis unit to generate a highly reactive ozonated concentrate. The second electrochemical generator 516B is configured for alkaline water production, employing components such as ion membranes 544, ion exchange materials, or a mineral dispenser 546 to produce water with adjustable pH levels.

The combined system can be housed in a single compact housing 158, or the aqueous ozone generator 530 and alkaline water generator 542 can be packaged separately, depending on the specific requirements of the application. Housing 158 is designed to accommodate the necessary plumbing, sensors, and control components, enabling easy integration into existing fluid systems, such as industrial pipelines, commercial kitchens, or healthcare facilities.

In operation, water 102 enters the combined system, where it is processed by both the aqueous ozone generator 530 and the alkaline water generator 542. The system can be configured to output the treated water as either:

Separate Streams: The ozonated concentrate liquid 114 and alkaline water 148 are dispensed independently, allowing users to apply each solution separately as needed.

Combined Stream: The outputs from the generators are mixed within the system, producing a single, homogeneous disinfection solution with both ozonated and alkaline properties. The combination process can occur in a mixer, such as a static mixer 106 or manifold 116, ensuring uniform distribution of ozone and alkalinity.

This combined system offers several advantages over standalone generators. By integrating both aqueous ozone generation and alkaline water production into a single system, the solution minimizes the footprint required for installation and simplifies maintenance. The shared housing 158 also reduces material costs and enhances system reliability by centralizing key components and reducing the complexity of interconnections.

Additionally, the system's modular design allows for flexible operation. Users can select whether to operate one or both generators simultaneously, depending on the specific disinfection or cleaning requirements. For example:

When addressing heavy biofilm contamination, the combined stream of ozonated concentrate liquid 114 and alkaline water 148 provides enhanced oxidative and alkaline properties for maximum microbial inactivation.

For routine cleaning tasks, the system can output only alkaline water 148 or ozonated concentrate liquid 114, depending on the application.

This embodiment demonstrates the versatility and efficiency of the hygienization generator system 100/500, offering a compact, integrated solution for producing advanced disinfection solutions. The ability to output separate or combined streams further enhances its adaptability, making it suitable for a wide range of industries and use cases, from surface cleaning to industrial sanitation.

Referring to FIG. 7, there is illustrated one example of a system and network diagram. In an exemplary embodiment, users of the platform and network can include technicians 302, administrators 304, or other authorized persons.

Each of the users uses computing devices 732A-C to data communicate over a global communication network 700 with one or more data processing resources 702. The computing devices 732A-C can be laptop computers, desktop computers, smartphones, tablets, or other types and kinds of computing devices, as may be required and/or desired in a particular embodiment. For disclosure purposes, computing devices 732A-C can be referred to as computing devices 732. Additionally, laptop and desktop types of computing devices 732 can be referred to as computing devices 712C, computing devices 732 such as smartphones can be referred to as computing devices 732B, and computing devices 732 such as tablets can be referred to as computing devices 732A. In operation, any of the users can use any of the types of computing devices 732A-C, without limitation to the type or kind of computing device 732, as may be required and/or desired in a particular embodiment. The global communication network 700 can be the Internet.

The computing devices 732 can comprise a microprocessor 704B/704C, a database 706B/706C, memory 708B/708C, a communication interface 710B/710C, a display 712B/712C, and a plurality of general-purpose inputs and outputs (GPIO) 714B/714C.

Additionally, mobile type of computing device 732A/732B (tablets, smartphones, and others) can comprise a global positioning system (GPS) 716, and a microphone and/or camera 718.

In general, computing devices 232 can be configured with other functions and features, as may be required and/or desired in a particular embodiment.

In an exemplary embodiment, the microprocessor 704B is operationally related to database 706B, memory 708B, communication interface 710B, display 712B, and GPIO 714B.

In an exemplary embodiment, the microprocessor 704C is operationally related to database 706C, memory 708C, communication interface 710C, display 712C, GPIO 714C, and if equipped, with GPS 716, and microphone and/or camera 718. The computing devices 732 each rely on a suitable power source 720B/720C which can include a rechargeable battery, external power supply, or other types and/or kinds of power sources.

Microprocessor 704B/704C can be INTEL, ZILOG, MICROCHIP, AMD, ARM, and/or other types or kinds of microprocessors.

Database 706B/706C can be SQL, MYSQL, MARIADB, ORACLE, MS ACCESS, network-accessible storage, flat files, a combination thereof, or other types and kinds of databases.

Memory 708B/708C can be a combination of RAM, ROM, flash, hard drives, solid-state drives, USB flash drives, micro-SD cards, or other types of removable memory, and/or other types and kinds of memory.

The communication interfaces 710B/710C can be local area network (LAN), wide area network (WAN), universal serial bus (USB), Ethernet, RS232, RS485, serial, Wi-Fi, 802.11abgn and similar, 2G 3G 4G 5G compatible, Bluetooth, transmission control protocol (TCP), user datagram protocol (UDP), Mesh Network, Zigbee, Pico Network, long-range navigation (LORAN), and/or other types and kinds of communication interfaces and protocols.

Display 712B/712C can be a liquid crystal display (LCD), light emitting diode (LED), organic light emitting diode (OLED), or other types and kinds of displays.

The general-purpose inputs and outputs (GPIO) 714B/714C can be TTL, CMOS, MOSFET, transistors, buffers, relays, pushbuttons, switches, and/or other types and kinds of GPIO circuits. In an exemplary embodiment, some of the GPIO 214 lines can be used to drive a touch screen input, biometric input devices, keyboards, and/or types and kinds of computing device input devices.

Global positioning system (GPS) device 716 can be used to determine the geographic location of technician 302 and others who are carrying a computing device 732 equipped with a GPS 716. In this regard, such computing devices 732 are typically mobile computing devices such as tablets 732A, smartphones 732B, and other similar types and/or kinds of mobile computing devices 732.

Microphone and/or camera 718 can be used to record audio, and video, and take pictures. In this regard, users 304/306 can use their computing devices equipped with a microphone and/or camera 718 to make digital media records that can be selectively shared as appropriate including on social media and other digital media outlet locations.

With reference to at least FIG. 7, the data processing resource 702 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 702 can also be referred to as server 702 and the network system can be referred to as a remote monitoring system 736.

In operation, in an exemplary embodiment, as an example and not a limitation, operational data, including ozone concentration and pH level, can be communicated to the remote monitoring system 736. This data is generated by integrated sensors within the system, such as the ozone concentration sensor 538, aqueous ozone generator status, pH sensor 540, and the alkaline generator status which continuously monitors and generates the chemical properties of the disinfection solution. The communication process ensures that critical information is made available for remote analysis, enabling enhanced control and operational efficiency.

The data communication process may involve the following components and pathways:

Control System 500: Serves as the central hub within the hygienization generator, aggregating data from various sensors and operational modules.

Communication Interfaces 508/710A-C: Facilitates the transmission of data between the hygienization generator and the remote monitoring system 736. Communication protocols such as Wi-Fi, cellular networks, or Bluetooth may be employed, depending on the system's configuration.

Remote Data Processing Resource 702: Processes incoming data to extract meaningful insights, such as identifying trends in ozone concentration or detecting deviations in pH levels.

Database 706/800: Stores historical and real-time data for subsequent retrieval, analysis, or reporting. This ensures that long-term performance can be tracked and compliance with regulatory standards can be documented.

The remote monitoring system 736 enables a wide range of functionalities, including:

Real-Time Alerts: If the ozone concentration or pH level deviates from pre-set parameters, the system can generate alerts and notify operators or technicians through connected devices, such as smartphones, tablets, or computers.

Performance Analytics: The system analyzes historical data to identify patterns, optimize operations, and predict maintenance needs.

Remote Configuration: Authorized users can adjust operational settings, such as modifying flow rates or changing presets for specific disinfection applications, from a remote location.

Compliance Reporting: For industries with stringent regulatory requirements, the system can generate detailed reports that document the operational history, ensuring compliance with health, safety, or environmental standards.

And Other Features And Advantages.

For example, in a healthcare facility using the hygienization generator for surface disinfection, the remote monitoring system 736 can track ozone concentration and PH levels to verify that the solution meets disinfection standards. If the data indicates suboptimal conditions, such as a decline in ozone concentration, the system can alert a technician to inspect the aqueous ozone generator 530 or adjust the operating parameters.

The remote monitoring system 736 also supports scalability, allowing multiple hygienization generators to be managed from a centralized location. For organizations with operations across multiple sites, this capability simplifies oversight, reduces response times, and ensures consistency in disinfection processes.

By incorporating the remote monitoring system 736, the hygienization generator system 100/500 delivers advanced connectivity and data-driven insights, enhancing its reliability and operational efficiency. This capability supports a wide range of applications, from food processing and healthcare to industrial water treatment, providing users with a robust and adaptable solution for modern hygiene challenges The data processing resource 702 can comprise a microprocessor 704A, a database 706A, memory 708A, and a communication interface 710A. The microprocessor 704A is operationally related to database 706A, memory 708A, and communication interface 710A.

The microprocessor 704A can be INTEL, ZILOG, MICROCHIP, AMD, ARM, and/or other types or kinds of microprocessors.

The database 706A can be SQL, MYSQL, MARIADB, ORACLE, MS ACCESS, network accessible storage, flat files, a combination thereof, or other types and kinds of databases.

The memory 708A can be a combination of RAM, ROM, flash, hard drives, solid-state drives, USB flash drives, micro-SD cards, or other types of removable memory, and/or other types and kinds of memory.

The communication interfaces 710A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Figure 8:
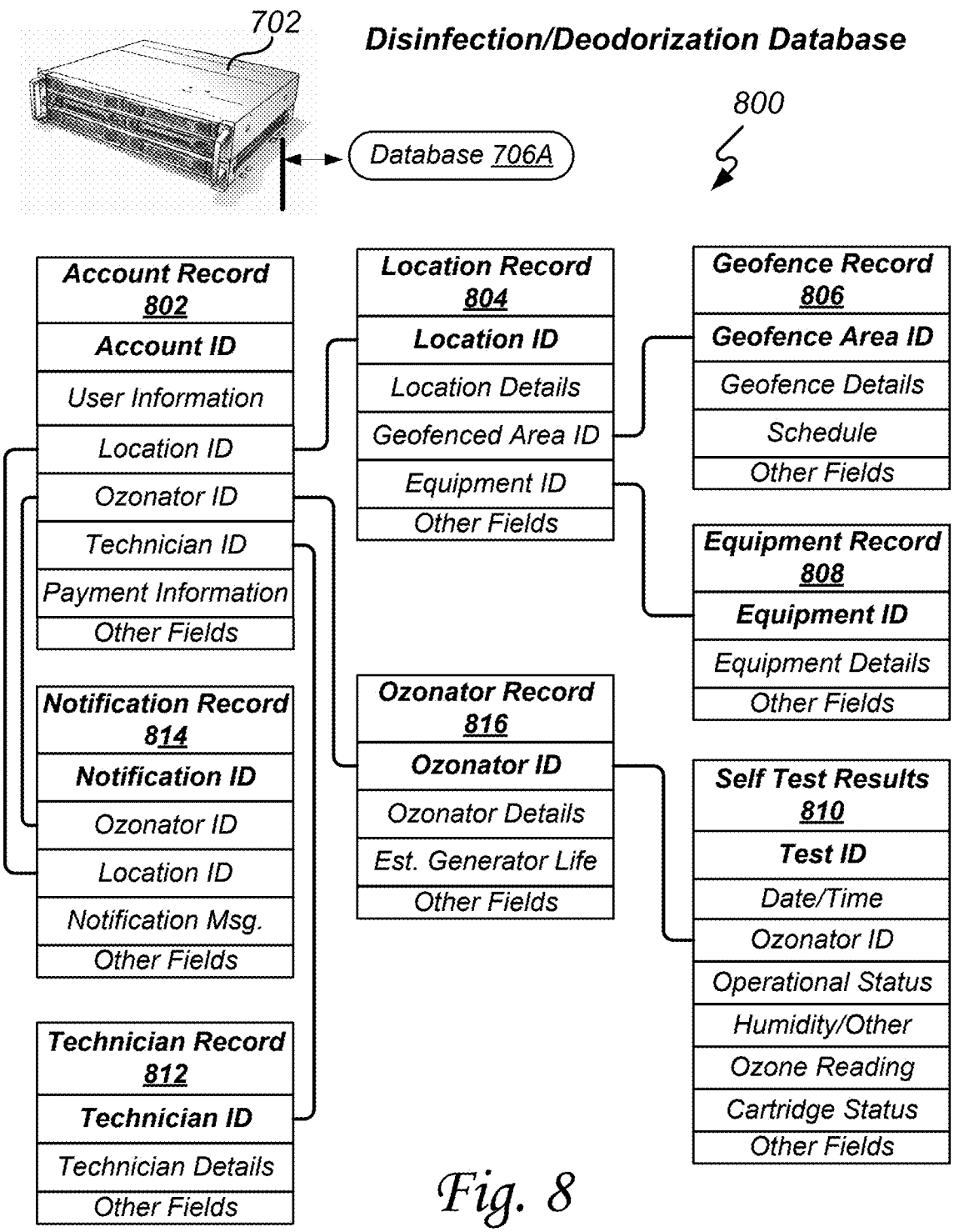
FIG. 8 illustrates one example of an ozone disinfection database structure.

Referring to FIG. 8, there is illustrated one example of an ozone disinfection/deodorization database structure 800. In an exemplary embodiment, at least one database 706A/706B/706C can be implemented on at least one of the data processing resources 702 also referred to as server 702, or computing devices 732. In operation, one or more databases 706A/706B/706C can be accessed/created/managed/maintained as appropriate by more than one stakeholder. In this regard, in addition to system administrators and other authorized persons, other stakeholders can access/create/manage/maintain as appropriate.

In an exemplary embodiment, such databases 706A/706B/706C can be SQL, MYSQL, MARIADB, ORACLE, MS ACCESS, network-accessible storage, flat files, a combination thereof, or other types and kinds of databases.

In an exemplary embodiment, the ozone disinfection/deodorization database 900 can reside on a remote data processing resource 702 in database 706A. In this regard, the ozone disinfection/deodorization database 900 can comprise a series of tables, records, fields, and accounts that include account record 802, location record 804, geofence record 806, equipment record 808, self-test results 810, technician record 812, notification record 814, ozonator record 816, and/or other types or kinds of records as may be required and/or desired in a particular embodiment. The database structure illustrated in FIG. 8 also illustrates certain of the relationships between the various tables.

In an exemplary embodiment, the data structure is illustrative and can be expanded and modified without particular limitation as needed and as appropriate to support the functionality and methods of the present invention and to support future functionality and methods of the present invention as it grows and evolves over time without any particular limitations.

Figure 9:
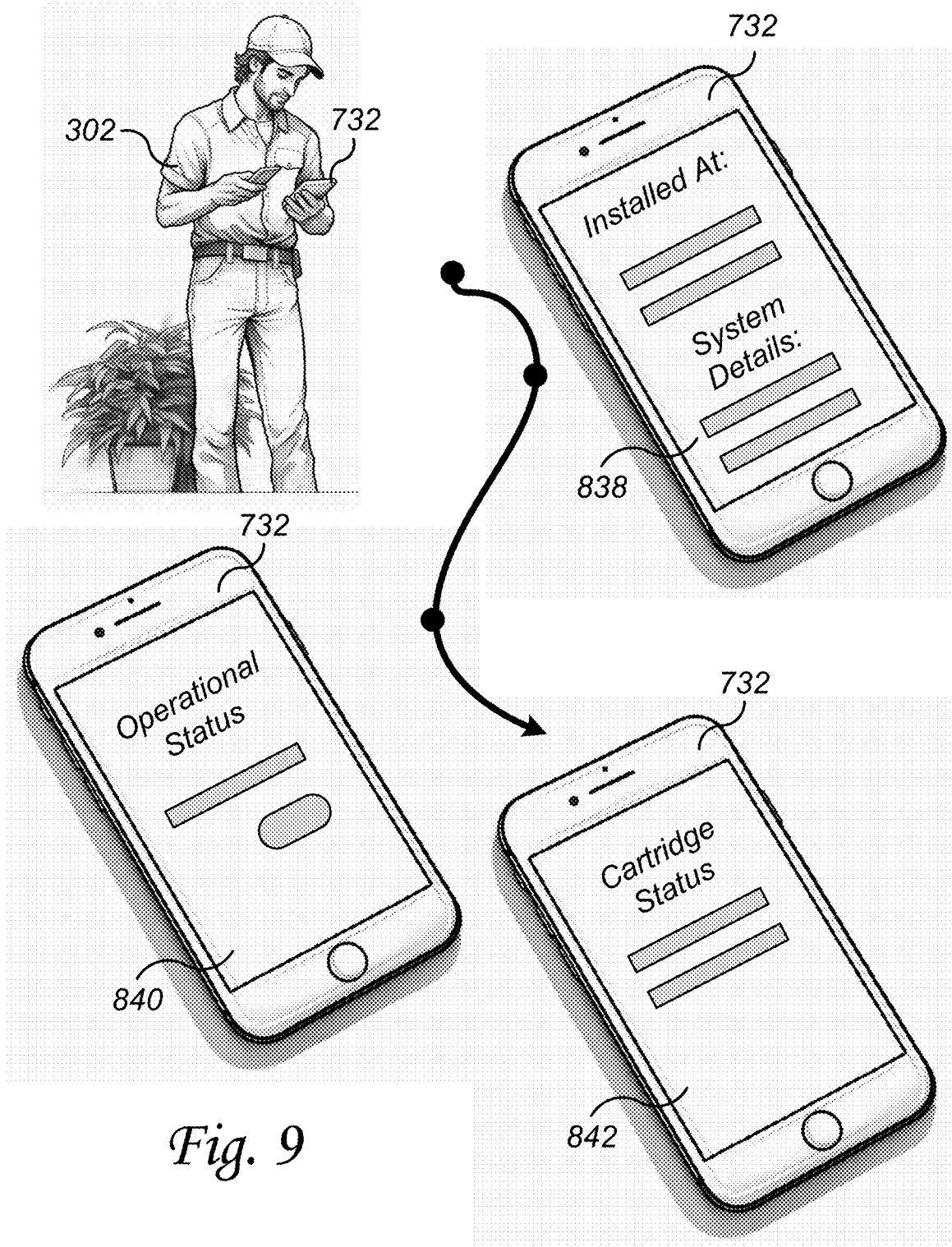
FIG. 9 illustrates one example of a technician's use of a software application.

Referring to FIG. 9, a technician's use of a software application. In an exemplary embodiment, a software application or website can be used in combination with the computing device 732A/B to identify the hygienization generator system 100/500, view operational statuses, record the test results and other results, and see other useful data by way of data communicating with a remote data processing resource 702. In some embodiments, certain hygienization generator system 100/500 may have the ability to data communicate 734 directly with a remote data processing resource 702, eliminating the need for computing device 732A/B to act as an intermediary device to record test results on the remote data processing resource 702.

In an exemplary embodiment, a computing device 732, operated by technician 302, data communicates with a remote data processing resource 702, and receives from the remote data processing resource 702, by way of the computing device 732 a plurality of hygienization generator system 100/500 location 838 and service life data 840 that corresponds to the remaining service life the electrochemical generator 516, the microfoaming agent 102 cartridge 842, and other service life information, as may be required and/or desired in a particular embodiment.

Figure 10:
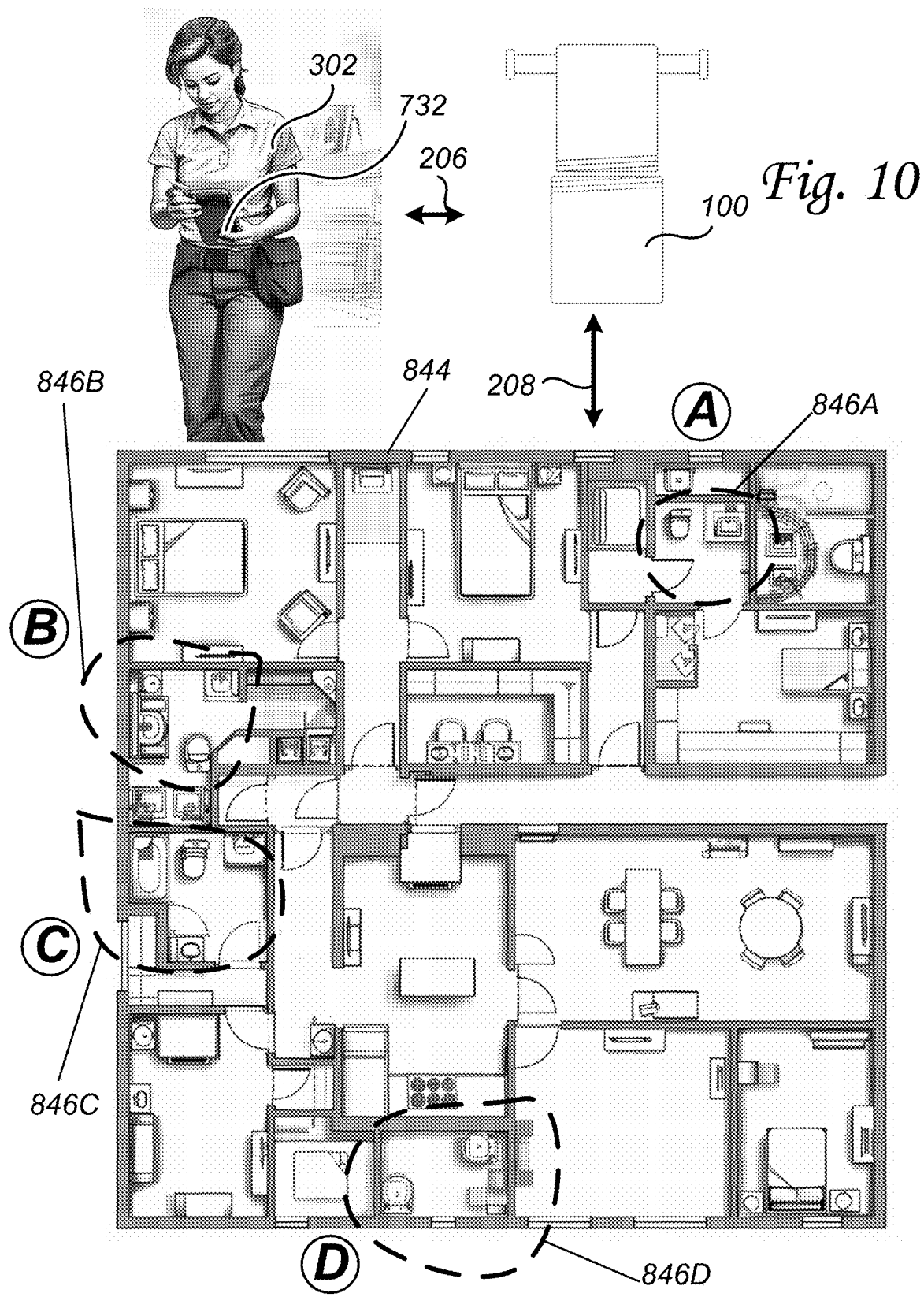
FIGS. 10-12 illustrate examples of a method of disinfecting a fluid transmission line.

Referring to FIG. 10, there is illustrated one example of a floor plan 844 to monitor geofenced or geolocate room spaces 'A' 846A, 'B' 846B, 'C' 846C, and 'D' 846D that have installed 208 a hygienization generator system 100/500. In an exemplary embodiment, technician 302, by way of computing platform 732, can data communicate with server 732 or data communicate 206 with individual microfoaming aqueous ozone sys 100 to ascertain operational status and location within a floor plan area 844.

Figure 11:
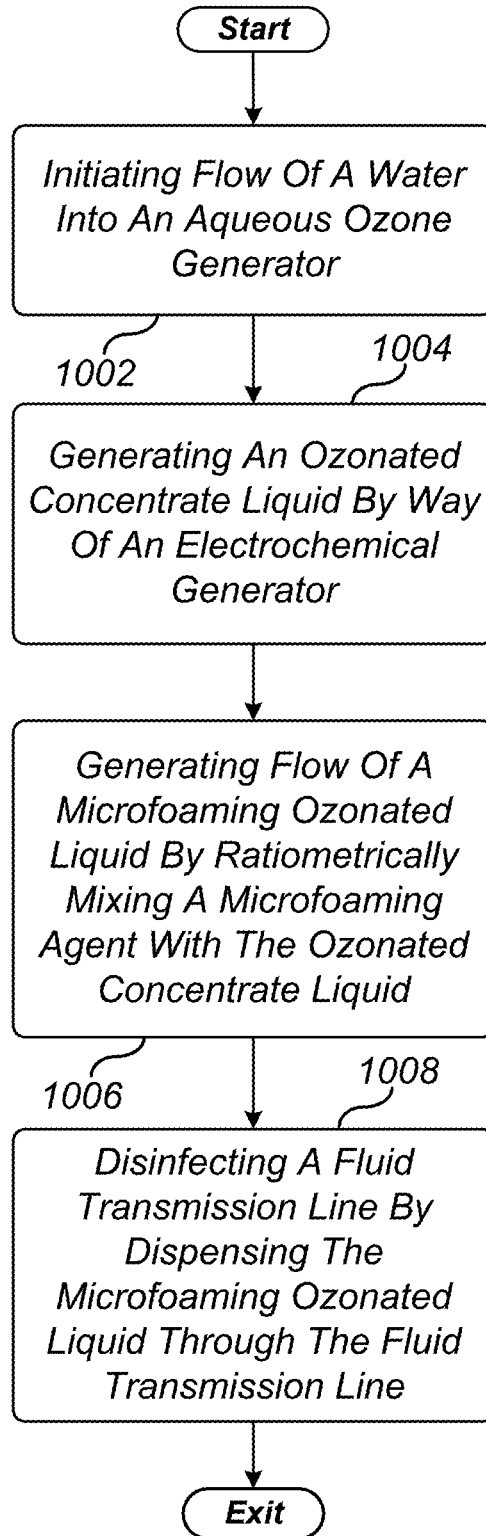

Referring to FIG. 11, there is illustrated one example of a method of disinfecting a fluid transmission line 128. In an exemplary embodiment, the method begins in step 1002 by initiating the flow of water 104 into an aqueous ozone generator 530, and in step 1004 by generating an ozonated concentrate liquid 114 by way of an electrochemical generator 516 which comprises an ion exchange material 534. The electrochemical generator 516 can be integrated into the aqueous ozone generator 530. The electrochemical generator 516 receives the water 104 and generates from the water 104 the ozonated concentrate liquid 114.

The method continues in step 1006 by generating the flow of a microfoaming ozonated liquid 112 by ratiometrically mixing a microfoaming agent 102 with the ozonated concentrate liquid 114, and in step 1008 by disinfecting a fluid transmission line 128 by dispensing the microfoaming ozonated liquid 112 through the fluid transmission line 128. The method is then exited.

Figure 12:
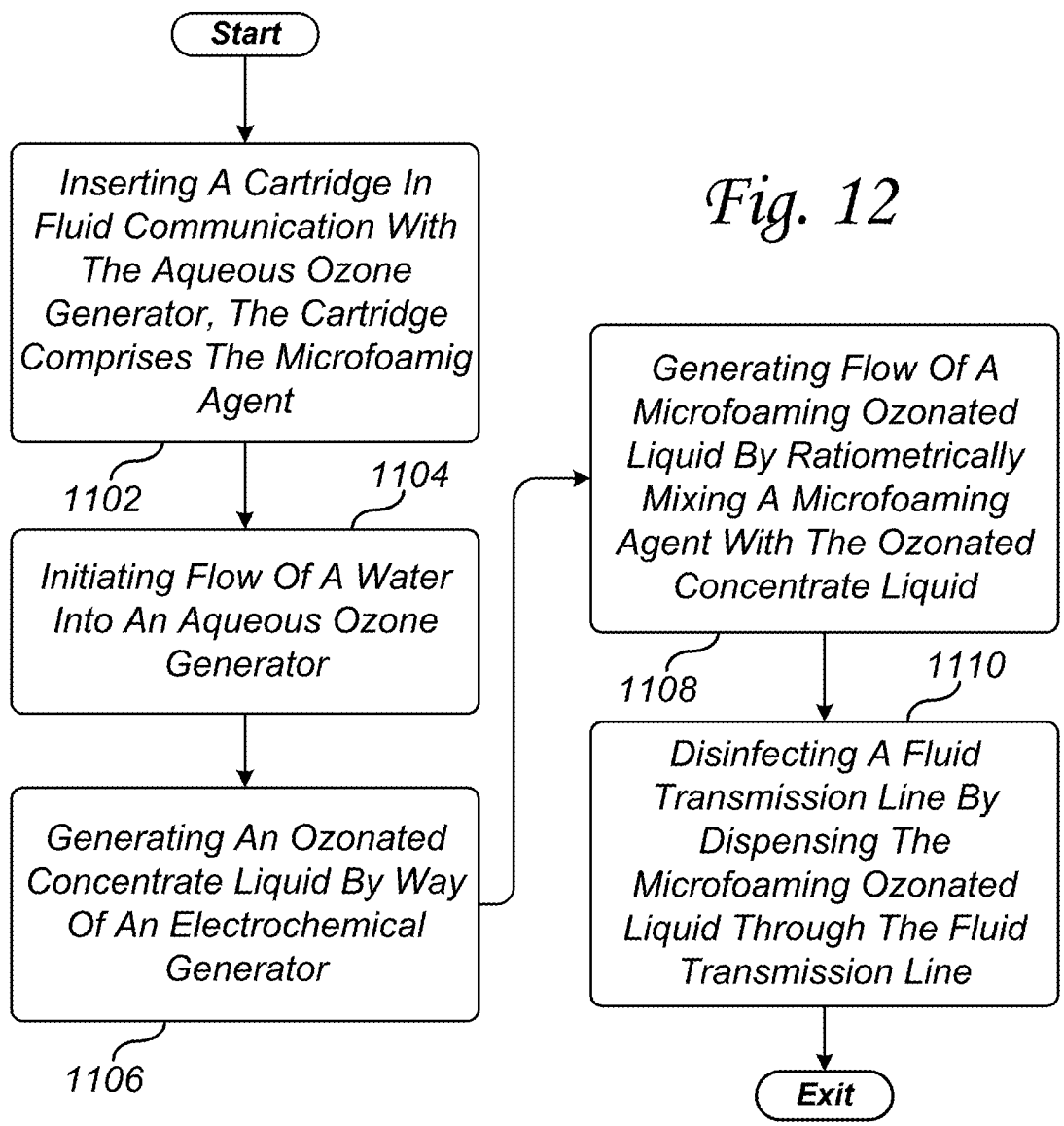

Referring to FIG. 12, there is illustrated one example of a method of disinfecting a fluid transmission line 128. In an exemplary embodiment, the method begins in step 1102 by inserting 350, in a removable manner, a cartridge 140 into fluid communication with an aqueous ozone generator 530. The cartridge 140 comprises a microfoaming agent 102, and in step 1004 by initiating the flow of water 104 into the aqueous ozone generator 530.

The method continues in step 1106 by generating an ozonated concentrate liquid 114 by way of an electrochemical generator 516 which comprises an ion exchange material 534. The electrochemical generator 516 can be integrated into the aqueous ozone generator 530. The electrochemical generator 516 receives water 104 and generates from the water 104 the ozonated concentrate liquid 114.

The method continues in step 1108 by generating the flow of a microfoaming ozonated liquid 112 by ratiometrically mixing the microfoaming agent 102 with the ozonated concentrate liquid 114, and in step 1110 by disinfecting a fluid transmission line 128 by dispensing the microfoaming ozonated liquid 112 through the fluid transmission line 128. The method is then exited.

Figure 13:
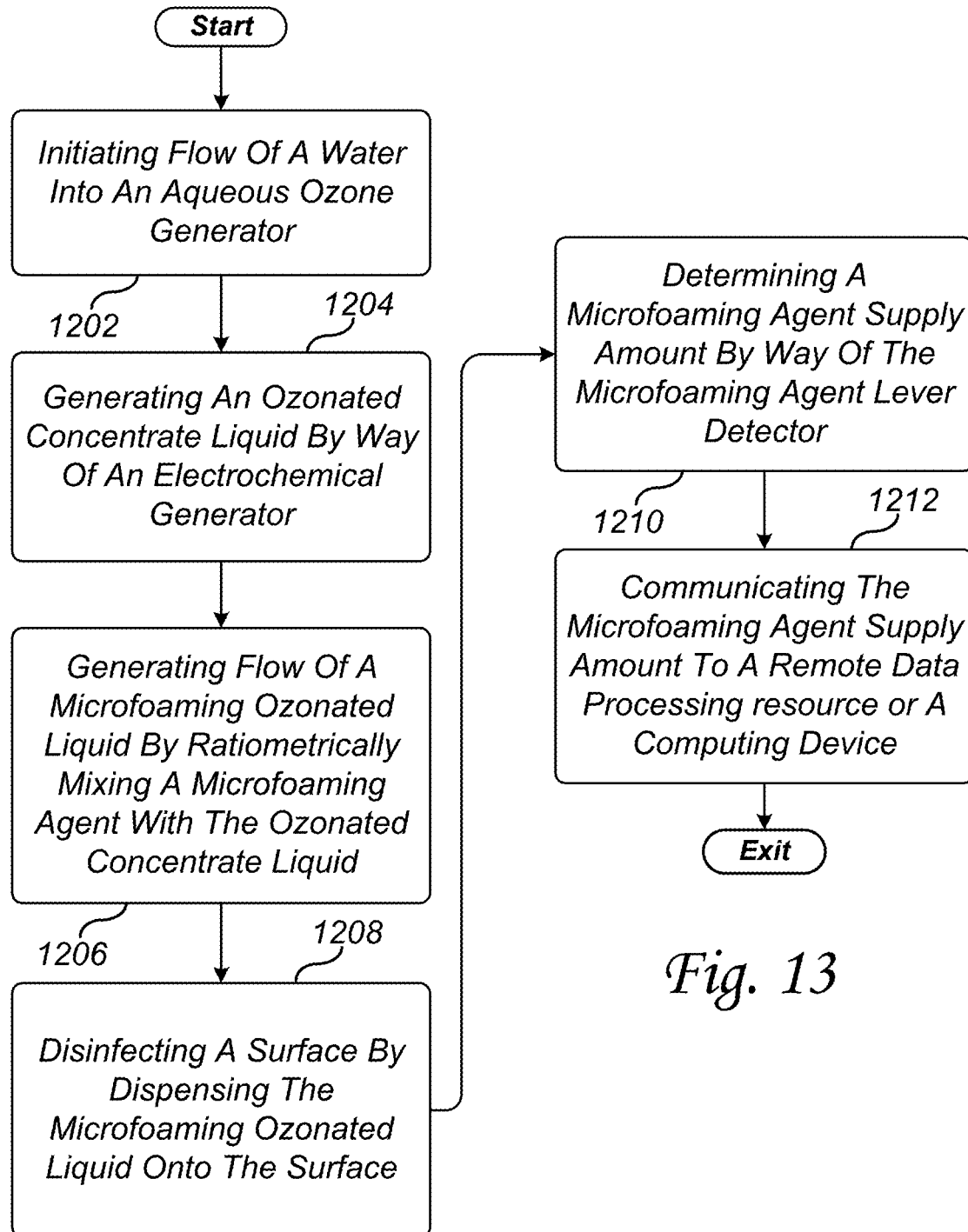
FIGS. 13-15 illustrate exemplary embodiments that can be used interchangeably with the methods of the present invention.

Referring to FIG. 13, there is illustrated one example of a method of disinfecting a fluid transmission line 128. In an exemplary embodiment, the method begins in step 1202 by initiating the flow of water 104 into an aqueous ozone generator 530, and in step 1204 by generating an ozonated concentrate liquid 114 by way of an electrochemical generator 516 which comprises an ion exchange material 534. The electrochemical generator 516 can be integrated into the aqueous ozone generator 530. The electrochemical generator 516 receives the water 104 and generates from the water the ozonated concentrate liquid 114.

The method continues in step 1206 by generating the flow of a microfoaming ozonated liquid 112 by ratiometrically mixing a microfoaming agent 102 with the ozonated concentrate liquid 114, and in step 1208 by disinfecting surface 130/312/318 by dispensing the microfoaming ozonated liquid 112 onto the surface.

The method continues in step 1210 by determining a microfoaming agent supply amount by way of the microfoaming agent level detector 538, and in step 1212 by communicating data, by way of a control system 500, the microfoaming agent supply amount to a remote data processing resource 702 or a computing device 732 by way of a communication interface 508. The control system 500 comprises the microfoaming agent level detector 538 and the communication interface 508. The method is then exited.

Figure 14:
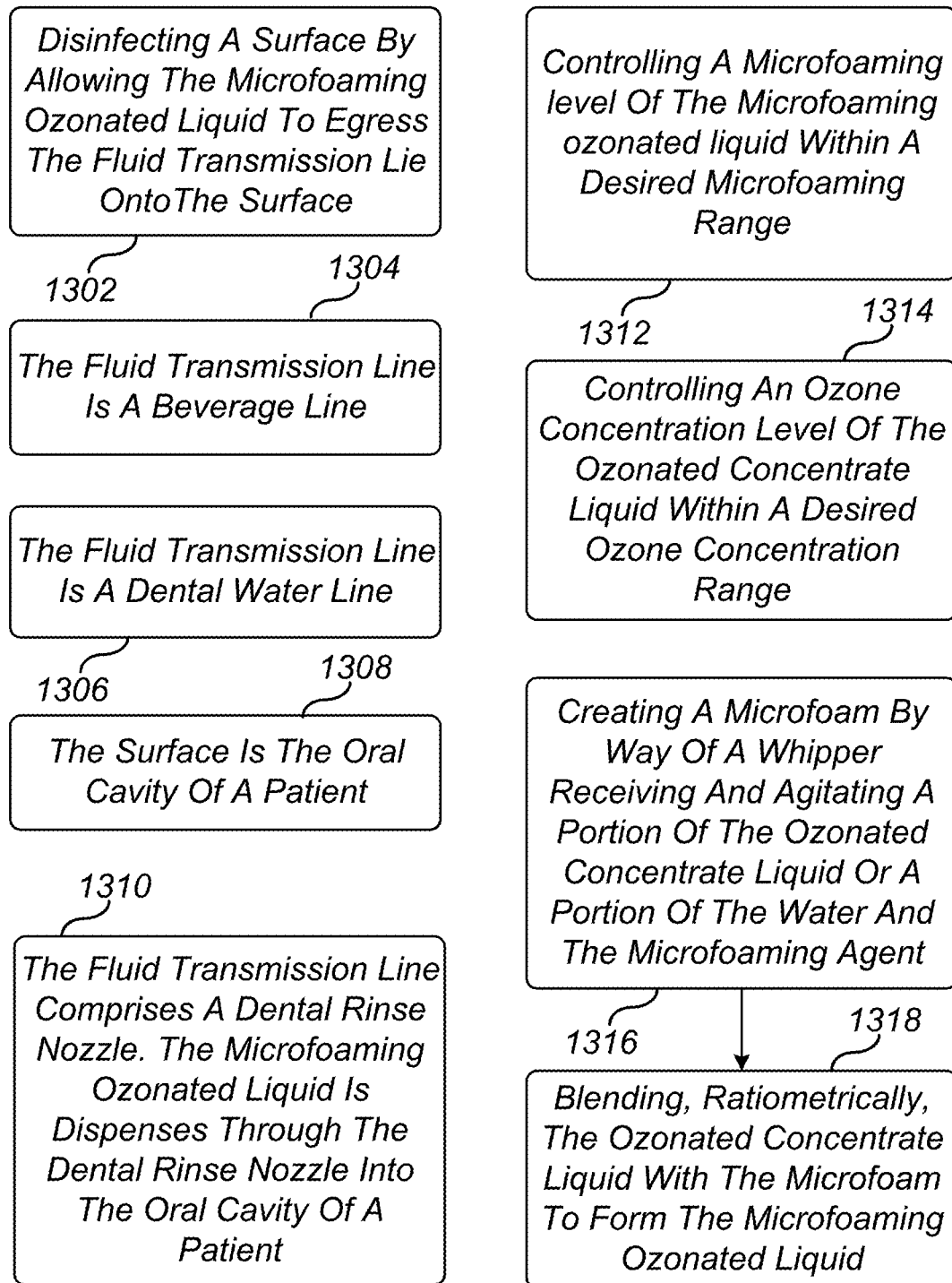

Referring to FIG. 14, there are illustrated exemplary embodiments that can be used interchangeably with the methods of the present invention.

In step 1302, disinfecting surface 312 by allowing the microfoaming ozonated liquid 112 to egress the fluid transmission line 128 onto surface 312.

In step 1304, the fluid transmission line 128 can be a food or beverage line. In an exemplary embodiment, such a food or beverage line can transfer beer, soda/syrup, yogurt, or other fluids from a backroom in a bar, restaurant, or other places to a point of dispense or other destinations, as may be required and/or desired in a particular embodiment.

In step 1306, the fluid transmission line 128 can be a dental water line. In an exemplary embodiment, dental water lines are typically used in dentist offices for hand washing/sinks, at the dental chair on patients for rinses and other purposes, for dental tool cleaning, and other applications and locations. In general, the water lines that run carry water for use in the dentist's office can be cleaned and disinfected with the present invention. In addition, the benefits of oral cavity 318 clean and rinse of patient 306 can be effectuated by allowing the microfoaming ozonated liquid 112 to egress a fluid transmission line 128/dental water line by way of a spray nozzle 134 into the patient's oral cavity 318.

In step 1308, the surface 318 is the oral cavity of patient 306. In an exemplary embodiment, the microfoaming ozonated liquid 112 can be flodded around the oral cavity 318 of patient 306 wherein the foam effectuates and enhances the ability of the ozonated concentrate liquid to disinfect the patient's oral cavity 318.

In step 1310, the fluid transmission line 128 comprises a dental rinse nozzle 134. The microfoaming ozonated liquid 112 can be dispensed through the dental rinse nozzle 134 into the oral cavity 318 of patient 306.

In step 1312, controlling a microfoaming level of the microfoaming ozonated liquid 114 within a desired microfoaming range by way of a microfoaming agent governor 1122/142/144/146/148 that regulates the amount of the microfoaming agent 102 in water 104 or ozonated concentrate liquid 114.

In step 1314, controlling an ozone concentration level of the ozonated concentrate liquid 114 within a desired ozone concentration range by way of a flow governor 120/142/146 that regulates an aqueous ozone production dwell time of the ozonated concentrate liquid through the electrochemical generator 516.

In step 1316, creating a microfoam by way of a whipper 108 receiving and agitating a portion of water 104 and the microfoaming agent 102, and in step 1318, blending, ratiometrically, the ozonated concentrate liquid 114 with the microfoam to form the microfoaming ozonated liquid 112.

Figure 15:
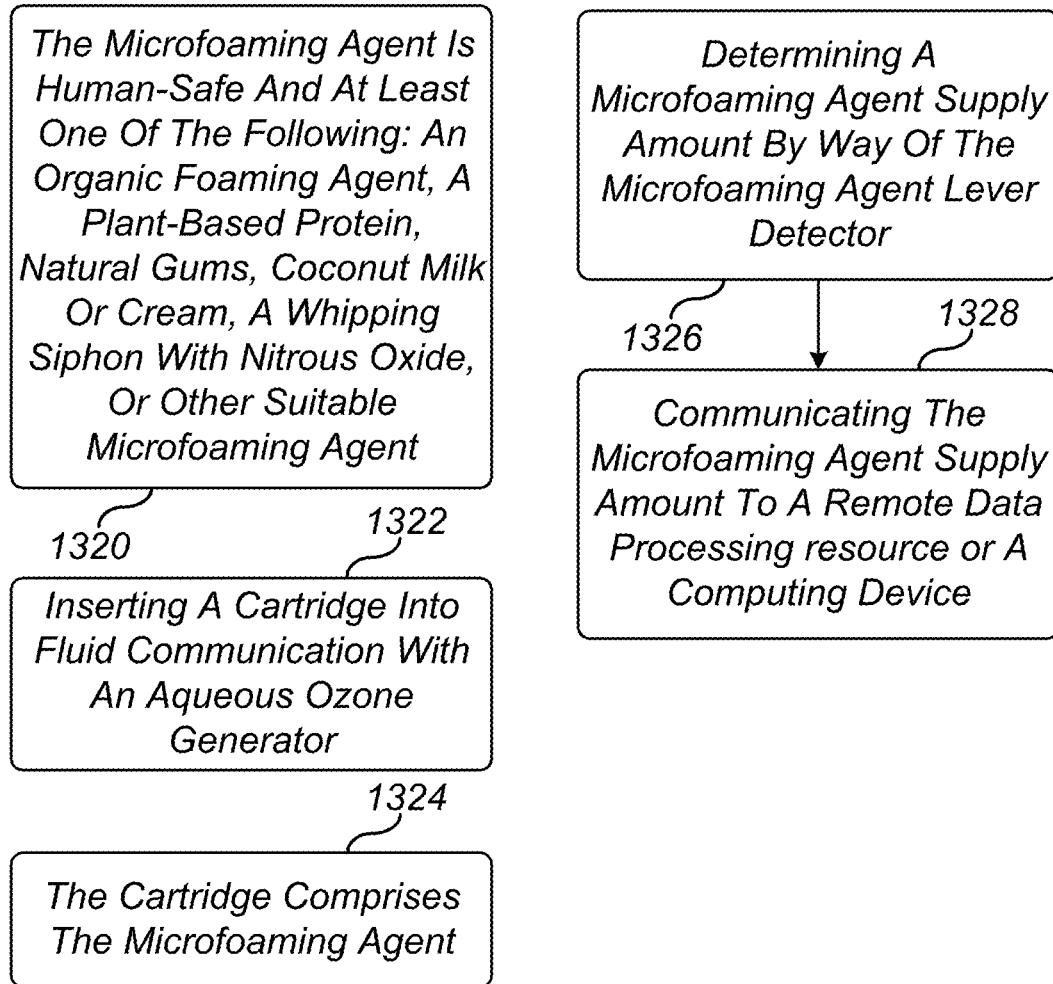

Referring to FIG. 15, there are illustrated exemplary embodiments that can be used interchangeably with the methods of the present invention.

In step 1320, the microfoaming agent 102 is human-safe and at least one of the following: an organic foaming agent, a plant-based protein, natural gums, coconut milk or cream, a whipping siphon with nitrous oxide, or other suitable microfoaming agents 102, a may be required and/or desired in a particular embodiment.

In step 1322, inserting 350, in a removable manner, cartridge 140 into fluid communication with an aqueous ozone generator, and in step 1324, cartridge 140 comprises a microfoaming agent.

In step 1326, determining a microfoaming agent supply amount by way of the microfoaming agent level detector 538, and in step 1328, communicating, by way of the control system 500, the microfoaming agent supply amount to a remote data processing resource 702 or a computing device 732 by way of the communication interface 508. The control system 500 comprises the communication interface 508 and the microfoaming agent level detector 538.

Figure 16:
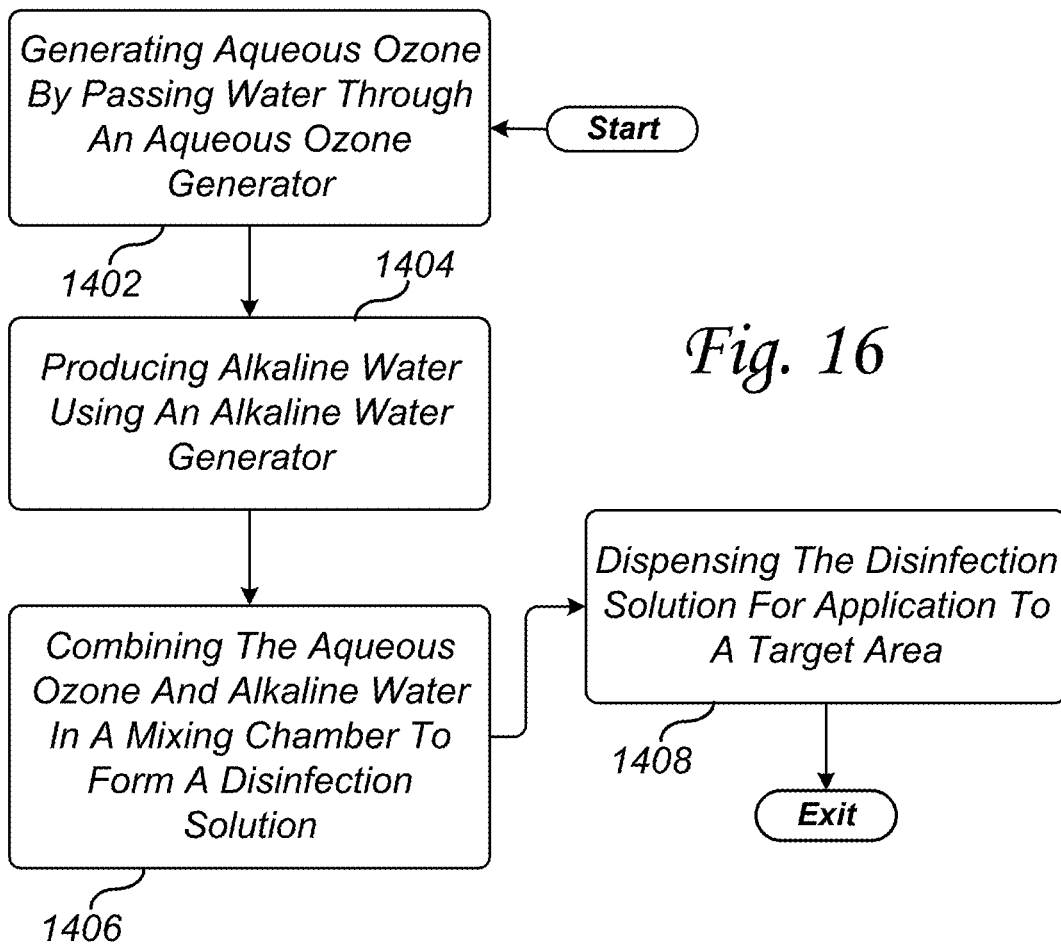
FIGS. 16-20 illustrates examples of methods of disinfecting using a hygienization generator system.

Referring to FIG. 16, there is illustrated one example of a method of disinfecting using a hygienization generator system 100/500. In an exemplary embodiment, the method begins with generating aqueous ozone and producing alkaline water, which is subsequently combined to create a disinfection solution. The solution is then dispensed for application to a target area. Each step is detailed as follows:

In step 1402, aqueous ozone is generated by passing water 104 through an aqueous ozone generator 530. The generator comprises an ion exchange material 534 and an electrolysis unit 516A. The ion exchange material enhances the efficiency of ozone generation by maintaining optimal ion balance, while the electrolysis unit produces ozone by splitting oxygen molecules into reactive ozone species. The resulting ozonated concentrate liquid 114 is a highly effective oxidative solution, capable of breaking down organic matter and inactivating a broad spectrum of pathogens, including bacteria, viruses, and fungi. The flow of water through the aqueous ozone generator can be controlled by a flow controller 528 to adjust the dwell time and, consequently, the ozone concentration of the output.

In step 1404, alkaline water 148 is produced using an alkaline water generator 542. The generator employs electrochemical processes involving an ion membrane 544, ion exchange material, or mineral dispenser 546 to increase the pH of the water. The resulting alkaline water is rich in hydroxide ions, which enhance the reactivity and stability of the ozone when combined. The pH level of the alkaline water can be adjusted by controlling the dwell time of water within the generator or by regulating the mineral concentration introduced by the mineral dispenser. This step provides tailored alkalinity that can be customized for specific disinfection requirements, such as removing biofilms or neutralizing acidic contaminants.

In step 1406, the outputs from the aqueous ozone generator 530 and the alkaline water generator 542 are combined in a mixing chamber 106 to form a unified disinfection solution. The mixing chamber may include static mixers or other suitable mixing mechanisms to ensure the thorough homogenization of the ozonated concentrate liquid and alkaline water. The combined solution leverages the oxidative power of ozone and the enhanced reactivity provided by the alkaline environment, creating a synergistic effect that improves its efficacy in inactivating pathogens and breaking down organic contaminants. The mixing process can be dynamically controlled to achieve the desired balance of ozone concentration and pH level based on the application.

In step 1408, the disinfection solution is dispensed for application to a target area. The solution can be delivered through an output assembly, which includes a valve, spray nozzle (fixed or detached), portable spray bottle, or other suitable devices for various application methods, such as misting, spraying, or liquid dispensing. The dispensing process ensures uniform coverage of the target area, making the solution suitable for diverse use cases, including surface cleaning, agricultural produce washing, industrial equipment sanitization, and healthcare disinfection. The system can also include sensors and flow regulators to monitor the solution's parameters during application, ensuring consistent performance.

This method illustrates the seamless integration of components within the hygienization generator system 100/500, showcasing its ability to produce and apply highly effective disinfection solutions. The precise control over each step enables the system to meet the specific needs of various disinfection tasks, providing a reliable, adaptable, and eco-friendly approach to modern sanitation challenges.

Figure 17:
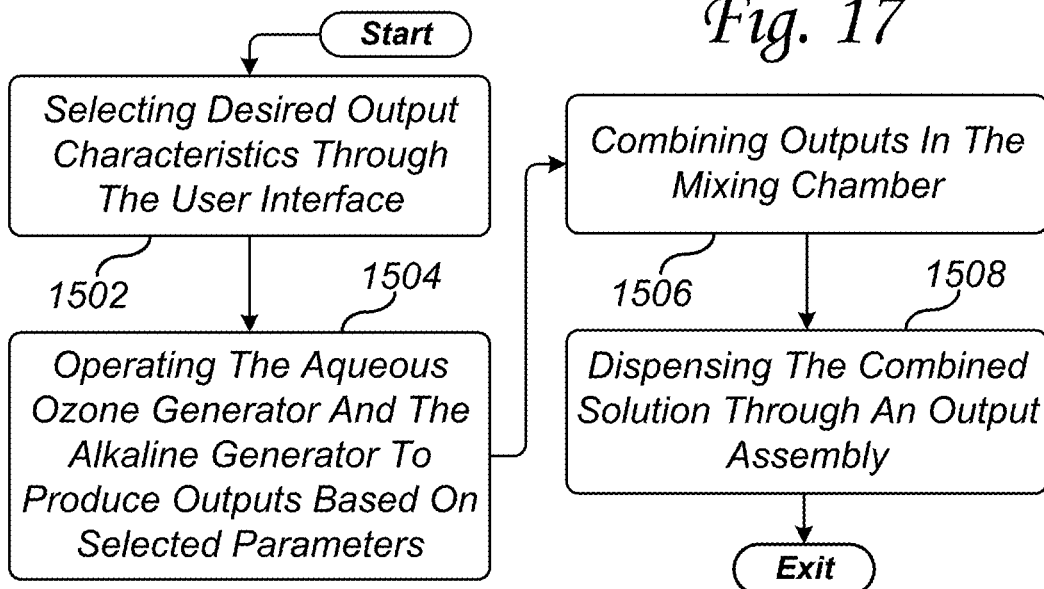

Referring to FIG. 17, there is illustrated one example of a method of using the hygienization generator system 100/500, demonstrating how the system operates to produce and dispense a customized disinfection solution. In an exemplary embodiment, the method begins in step 1502, where the desired output characteristics are selected through the user interface 548. This interface provides operators with the ability to configure key parameters, such as the target pH level of the alkaline water 148 and the ozone concentration of the ozonated concentrate liquid 114. The interface may include touchscreen controls, physical buttons, or dials, and can display real-time feedback from system sensors, such as the pH sensor 540 and the ozone concentration sensor 538. Additionally, the user interface 548 allows the selection of pre-set operational modes stored in the control system 500, simplifying setup for common applications, such as food preparation area disinfection, industrial sanitization, or healthcare cleaning.

In step 1504, the aqueous ozone generator 530 and the alkaline water generator 542 are operated to produce their respective outputs based on the selected parameters. The aqueous ozone generator 530 utilizes an ion exchange material 534 and an electrolysis unit 516A to produce ozone-rich water, while the alkaline water generator 542 employs an ion membrane 544, mineral dispenser 546, or other suitable mechanisms to generate water with the desired pH level. The control system 500 dynamically adjusts operational conditions, such as flow rates and voltage levels, to ensure that each generator produces outputs precisely matching the configured specifications. The system's ability to fine-tune these parameters enhances its versatility across different disinfection and cleaning tasks.

In step 1506, the outputs from the aqueous ozone generator 530 and the alkaline water generator 542 are combined in the mixing chamber 106/108/116 to form a homogeneous disinfection solution. The mixing chamber incorporates active or static mixers, or other suitable mixing technologies to ensure thorough blending of the two streams. This process leverages the synergy between the ozone's oxidative power and the alkalinity of the water to create a solution optimized for maximum pathogen inactivation and organic residue breakdown. The mixing ratio and dwell time can be adjusted by the control system 500 to accommodate specific application requirements, such as biofilm removal or delicate surface cleaning.

In step 1508, the combined disinfection solution is dispensed through an output assembly. Such output assembly can be equipped with for example and not a limitation, attached or nozzles 136, dental sprayer 134, valves 138, or dispensed in other suitable ways, enabling the solution to be applied via misting, spraying, or liquid dispensing, depending on the target area. For example, misting may be used for air disinfection in enclosed spaces, spraying for surface cleaning, and liquid dispensing for immersion applications like produce washing. The dispensing process is monitored and controlled by the control system 500, ensuring consistent delivery of the solution with the specified characteristics. Sensors integrated into the output assembly can provide additional feedback to verify performance and ensure uniform application.

This method highlights the operational efficiency and flexibility of the hygienization generator system 100/500, allowing users to customize, produce, and apply disinfection solutions tailored to their specific needs. The integration of advanced controls, real-time feedback, and modular dispensing options makes the system a reliable and adaptable tool for a wide range of disinfection and sanitization applications.

Figure 18:
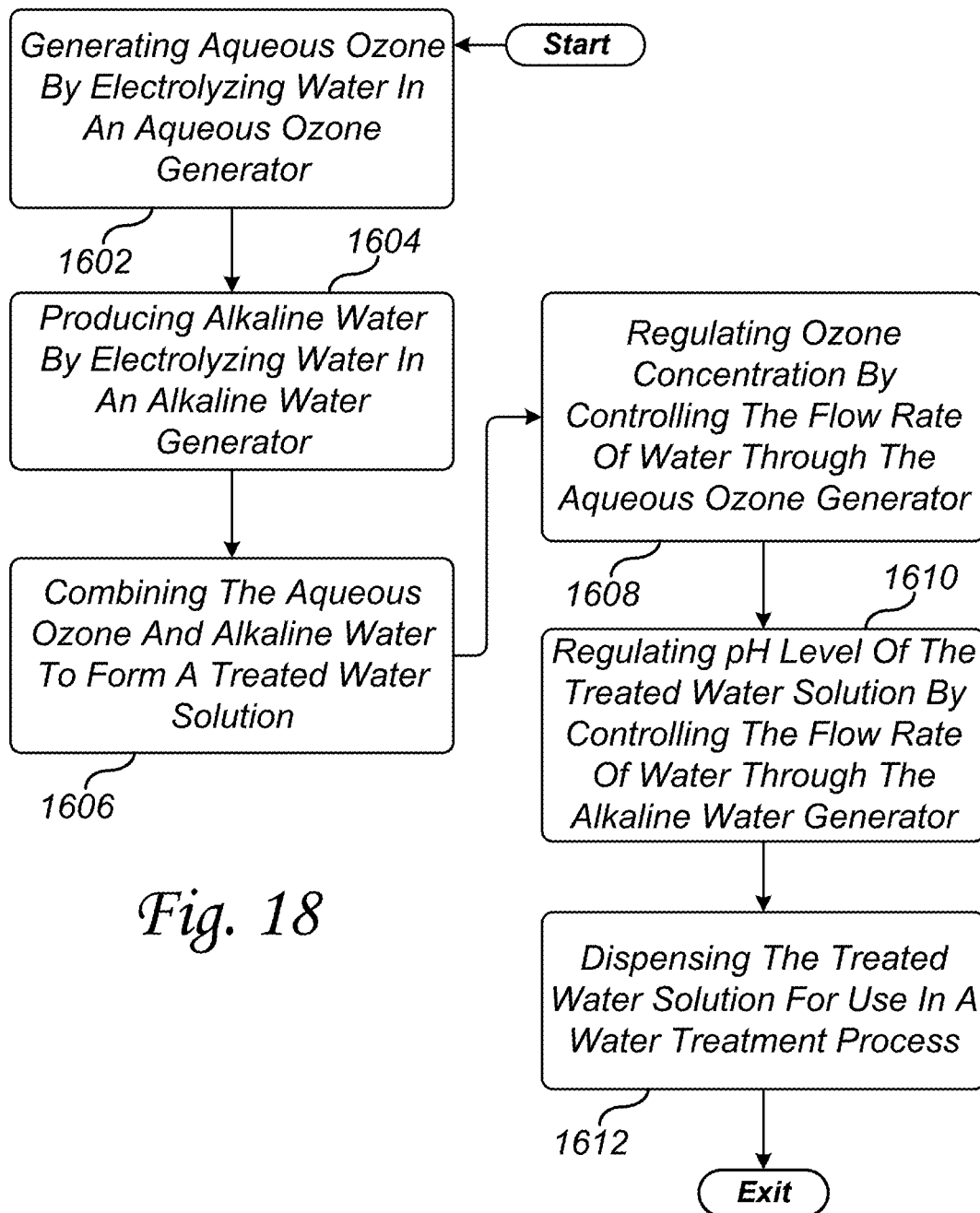

Referring to FIG. 18, there is illustrated an exemplary embodiment of a method of treating water using the hygienization generator system 100/500. This method involves generating aqueous ozone and alkaline water, combining them into a treated water solution, regulating key parameters, and dispensing the solution for specific water treatment applications. Each step is described in detail as follows:

In step 1602, aqueous ozone is generated by electrolyzing water in an aqueous ozone generator 530. This process involves passing water through the generator, which includes components such as an ion exchange material 534 and an electrolysis unit 516A. The ion exchange material optimizes the chemical balance, enhancing the efficiency of ozone production. The electrolysis unit splits oxygen molecules in the water to create reactive ozone species, resulting in ozonated concentrate liquid 114. This highly oxidative solution is effective in breaking down organic contaminants and inactivating a wide range of pathogens, making it a key component of the treated water solution.

In step 1604, alkaline water 148 is produced by electrolyzing water in an alkaline water generator 542. The generator employs technologies such as an ion membrane 544, ion exchange material 534, or a mineral dispenser 546 to increase the pH of the water. This process generates water rich in hydroxide ions, which enhances the chemical stability and reactivity of the treated water solution. The generator's operation can be adjusted to produce water with specific alkalinity levels tailored to the requirements of the water treatment process.

In step 1606, the aqueous ozone 530 and alkaline water 542 outputs are combined to form a treated water solution. The combination occurs in a mixing chamber 106, which incorporates static mixers or other suitable mixing mechanisms to homogenize the solution. The resulting mixture leverages the synergistic effects of ozone's oxidative power and enhanced alkalinity, creating a versatile and highly effective treated water solution.

In step 1608, the ozone concentration of the treated water solution is regulated by controlling the flow rate of water through the aqueous ozone generator 530. A flow controller 528 adjusts the dwell time of water in the generator, allowing fine-tuned control over the amount of ozone produced. Longer dwell times increase ozone concentration, which is useful for applications requiring aggressive disinfection, while shorter dwell times produce lower concentrations for gentler processes.

In step 1610, the pH level of the treated water solution is regulated by controlling the flow rate of water through the alkaline water generator 542. A separate flow controller 528 adjusts the contact time within the generator, enabling precise modulation of the water's alkalinity. This flexibility allows the treated water solution to be customized for specific water treatment tasks, such as neutralizing acidic contaminants or optimizing conditions for oxidation reactions.

In step 1612, the treated water solution is dispensed for use in a water treatment process. Dispensing occurs through a modular output assembly 552, which includes options for misting, spraying, or direct liquid dispensing. The treated water solution can be applied to a variety of processes, for example and not a limitation, including:

Beverage supply line sanitation, ensuring microbial control in food and beverage production.

Dental water line treatment, reducing microbial load and biofilm buildup in healthcare facilities.

Industrial water treatment, such as cooling tower cleaning or wastewater remediation.

And Other Water Treatment Applications

This method illustrates the operational flexibility and precision of the hygienization generator system 100/500, which dynamically adjusts ozone concentration and pH levels to produce a treated water solution optimized for a wide range of applications. The integration of advanced control mechanisms, real-time monitoring, and versatile dispensing options ensures efficient and reliable performance.

Figure 19:
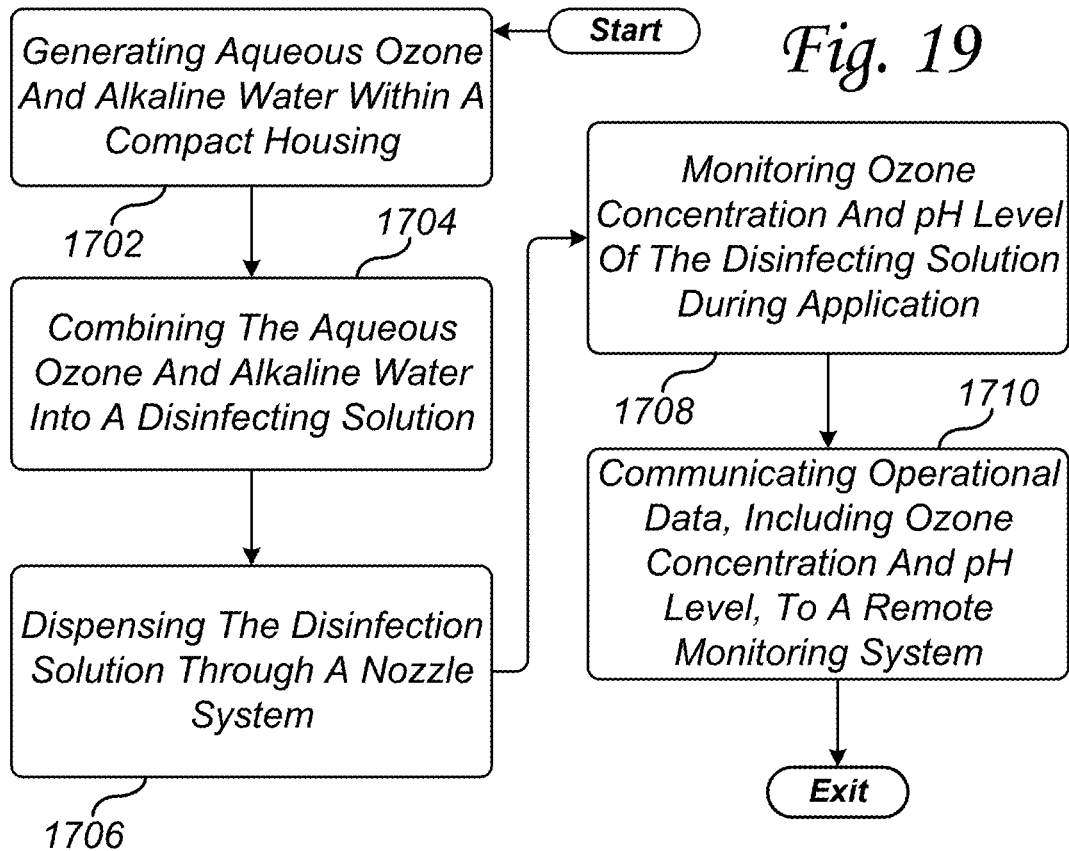

Referring to FIG. 19, there is illustrated an exemplary embodiment of a method of disinfecting surfaces using a portable hygienization generator system 100/500. This method utilizes a compact and portable system to generate, combine, and dispense a disinfecting solution while enabling real-time monitoring and remote communication of operational data. Each step is detailed as follows:

In step 1702, aqueous ozone and alkaline water are generated within a compact housing 544, which encloses both an aqueous ozone generator 530 and an alkaline water generator 542. The aqueous ozone generator 530 utilizes an ion exchange material 534 and an electrolysis unit 516A to produce ozonated concentrate liquid 114, a highly oxidative solution effective at inactivating pathogens. Simultaneously, the alkaline water generator 542 employs an ion membrane 544, ion exchange material, or a mineral dispenser 546 to produce alkaline water 148, which enhances the reactivity of the ozone and provides an optimal environment for disinfection. The compact design of the housing makes the system portable and easy to deploy in various environments, such as healthcare facilities, kitchens, and industrial sites.

In step 1704, the aqueous ozone and alkaline water are combined to form a disinfecting solution. The combination occurs within a mixing mechanism 106/108/116, which may include static mixers or other suitable devices to homogenize the solution. This ensures even distribution of the ozone and alkalinity throughout the disinfecting solution, maximizing its efficacy in eliminating pathogens and breaking down organic contaminants. The mixing process is dynamically controlled by the control system 500, ensuring the desired ozone concentration and PH levels are achieved.

In step 1706, the disinfecting solution is dispensed through a valve, spray nozzle (fixed or detached), portable spray bottle, or other suitable device, which is part of a modular output assembly designed for versatile application methods. The nozzle assembly includes options for misting, spraying, or direct liquid dispensing, allowing the solution to be tailored to specific disinfection needs. For example:

Misting: Suitable for air disinfection in enclosed spaces, such as offices or healthcare rooms.

Spraying: Ideal for surface disinfection in kitchens, industrial settings, or public transportation.

Direct dispensing: Useful for immersion applications, such as cleaning tools or small equipment.

In step 1708, the system continuously monitors the ozone concentration and pH level of the disinfecting solution during application using integrated sensors, such as a pH sensor 540 and an ozone concentration sensor 538. These sensors provide real-time feedback to the control system 500, which ensures the solution maintains its intended characteristics throughout the disinfection process. The monitoring data is displayed on a user interface 548, allowing the operator to verify system performance and make adjustments if needed.

In step 1710, operational data, including ozone concentration and pH level, is communicated to a remote monitoring system 736. This feature enables centralized oversight of multiple portable systems deployed across different locations. The remote monitoring system 736 can receive, log, and analyze data to track performance, identify maintenance needs, and ensure compliance with regulatory standards. This capability is particularly valuable in industries with stringent hygiene requirements, such as food processing, healthcare, and hospitality.

This method highlights the advanced functionality and versatility of the portable hygienization generator system 100/500, enabling efficient and precise surface disinfection in a wide range of environments. The integration of real-time monitoring, modular dispensing options, and remote data communication ensures that the system delivers high-performance disinfection solutions while maintaining operational flexibility and ease of use.

Figure 20:
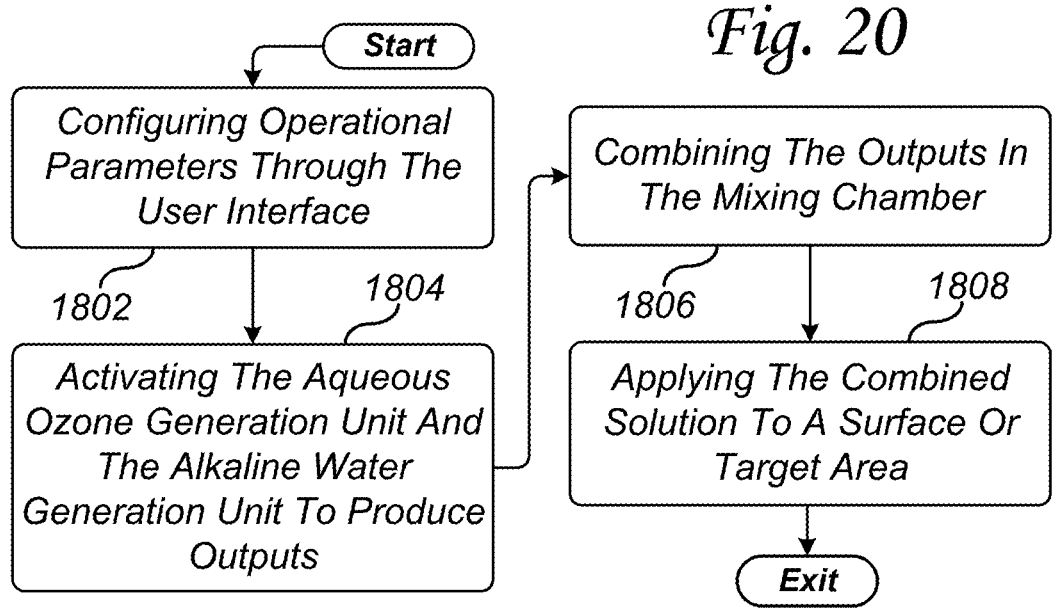

Referring to FIG. 20, there is illustrated an exemplary embodiment of a method of using the portable hygienization generator system 100/500. This method demonstrates how the system is configured, activated, and operated to produce and apply a disinfecting solution tailored to specific disinfection or cleaning tasks. Each step is described as follows:

In step 1802, operational parameters are configured through the user interface 548. The interface provides a user-friendly platform for selecting key parameters, including the target ozone concentration and pH level of the disinfecting solution. The user interface 548 may include a touchscreen display, physical buttons, or dials, and it can present real-time data from sensors such as the pH sensor 540 and the ozone concentration sensor 538. Additionally, the interface allows the selection of pre-set modes stored in the system's control system 500, simplifying the configuration process for common applications like surface cleaning, healthcare sanitation, or produce washing.

In step 1804, the aqueous ozone generation unit 530 and the alkaline water generation unit 542 are activated to produce their respective outputs. The aqueous ozone generation unit 530 utilizes an ion exchange material 534 and an electrolysis unit 516A to create ozonated concentrate liquid 114, while the alkaline water generation unit 542 employs an ion membrane 544, ion exchange material, or a mineral dispenser 546 to produce alkaline water 148. The operation of both units is managed by the control system 500, which adjusts flow rates, dwell times, and other parameters to ensure the outputs align with the configured settings.

In step 1806, the outputs from the aqueous ozone generation unit 530 and the alkaline water generation unit 542 are combined in a mixer 106. The mixing mechanism may include static mixers, dynamic mixers, or other suitable components to ensure the thorough blending of the two solutions. The resulting mixture forms a homogeneous disinfecting solution that leverages the oxidative power of ozone and the alkalinity of the water for enhanced microbial inactivation and residue removal. The mixing process is dynamically controlled to achieve the desired balance of ozone concentration and pH level based on the application's requirements.

In step 1808, the combined disinfecting solution is applied to a surface or target area. The application is performed through a modular output assembly 552, which can include valves, spray nozzles (fixed or detached), portable spray bottles, or other suitable devices for various delivery methods, such as misting, spraying, or direct liquid dispensing. For example:

Misting may be used for air disinfection in enclosed spaces, such as offices or healthcare rooms.

Spraying is ideal for cleaning large surfaces, such as floors, countertops, or industrial equipment.

Direct liquid dispensing can be used for immersion cleaning of small tools or produce.

The application process ensures uniform coverage of the target area, optimizing the disinfecting solution's effectiveness. The system's portability and compact design make it particularly suitable for on-the-go applications in diverse environments, such as commercial kitchens, healthcare facilities, and outdoor settings.

This method demonstrates the operational simplicity and adaptability of the portable hygienization generator system 100/500, enabling users to configure, produce, and apply disinfecting solutions tailored to their specific needs. The integration of advanced controls, dynamic mixing capabilities, and versatile application options ensures the system delivers consistent, high-quality performance across a wide range of disinfection and cleaning tasks.

Figure 21:
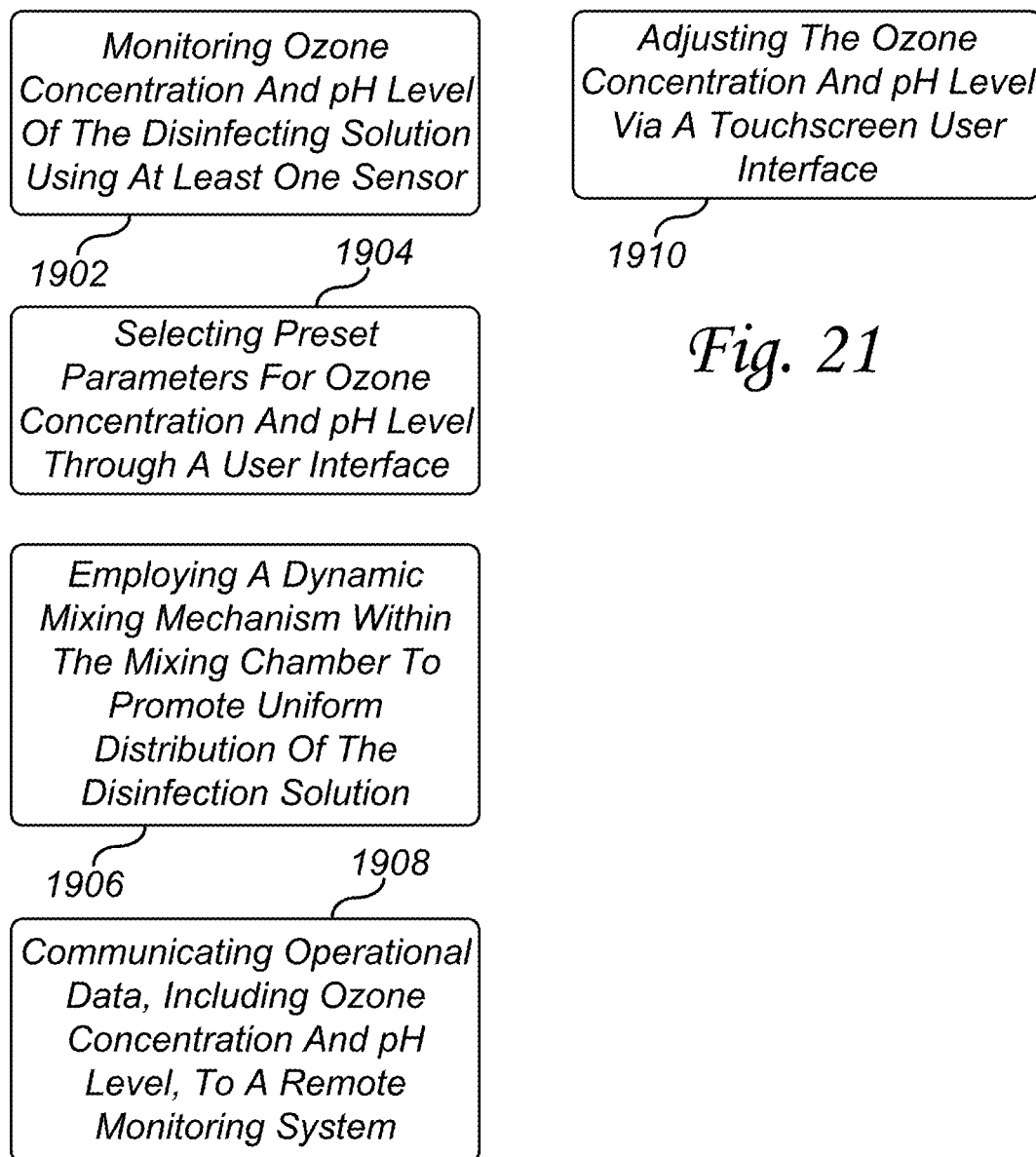
FIG. 21 illustrates exemplary embodiments that can be used interchangeably with the methods of the present invention.

Referring to FIG. 21, there is illustrated exemplary embodiments that can be used interchangeably with the methods of the present invention.

In step 1902, the ozone concentration and PH level of the disinfection solution are monitored in real time using at least one integrated sensor within the hygienization generator system 100/500. This monitoring process ensures that the disinfection solution maintains its intended chemical properties for effective application, enhancing the reliability and precision of the system.

The ozone concentration sensor 538 is strategically positioned to measure the level of dissolved ozone in the solution exiting the aqueous ozone generator 530 or within the mixing mechanism 106 after it combines with the output from the alkaline water generator 542. This sensor detects variations in ozone concentration, allowing the control system 500 to dynamically adjust operational parameters such as the flow rate through the generator or the dwell time of water in the electrolysis chamber. Accurate ozone monitoring ensures that the disinfection solution achieves its desired oxidative potential, which is critical for breaking down organic contaminants and inactivating pathogens.

The pH sensor 540 measures the alkalinity of the solution either as it exits the alkaline water generator 542 or after mixing with the ozonated liquid. By continuously monitoring the pH level, the system ensures that the solution retains its optimal reactivity for specific disinfection tasks. For instance, higher pH levels may enhance the stability of ozone in certain applications, while moderate pH levels may be better suited for cleaning delicate surfaces or produce. The pH sensor's feedback is relayed to the control system 500, which can adjust the dwell time within the alkaline water generator or modulate the mineral content introduced by the mineral dispenser 546 to achieve the desired pH.

The sensors are operationally connected to the user interface 548, providing real-time readouts of ozone concentration and pH level. This allows operators to visually confirm that the solution meets the configured specifications. If deviations are detected, the system can issue alerts through an integrated alarm system 518, prompting the operator to address potential issues or adjust operational settings.

Additionally, the monitoring process contributes to the system's ability to maintain compliance with industry standards and regulatory requirements. For applications in food processing, healthcare, or industrial disinfection, precise control of chemical properties is essential for ensuring efficacy and safety. By integrating sensors and real-time monitoring capabilities, the hygienization generator system 100/500 delivers a robust and reliable disinfection solution tailored to diverse applications.

This step highlights the advanced functionality of the system, combining real-time feedback, dynamic control, and user-friendly interfaces to optimize the performance of the disinfection solution.

In step 1904, the operator selects preset parameters for the ozone concentration and pH level of the disinfection solution using the user interface 548 of the hygienization generator system 100/500. This step ensures that the system is configured to produce a solution tailored to the specific requirements of the disinfection or cleaning application.

The user interface 548 serves as the primary point of interaction between the operator and the system, providing a user-friendly platform for selecting and adjusting operational parameters. The interface may include a touchscreen display, physical buttons, or rotary dials and is designed to provide clear, intuitive controls. It displays real-time feedback from integrated sensors, such as the ozone concentration sensor 538 and pH sensor 540, ensuring that the operator can verify system performance during configuration and operation.

Preset parameters are stored within the control system 500, which includes a memory module 520 capable of holding multiple configurations optimized for various applications. These presets may include:

High ozone concentration and high pH levels for aggressive disinfection tasks, such as removing biofilms in industrial pipelines or healthcare facilities.

Moderate ozone concentration and pH levels for general-purpose cleaning, such as surface sanitization in food preparation areas.

Low ozone concentration and pH levels for gentle applications, such as produce washing or delicate equipment cleaning.

In addition to local configuration, the system allows for remote configuration of preset parameters. A remote data processing resource 702 can communicate with the control system 500 via a network connection, enabling authorized personnel to configure presets from a centralized location. This feature is particularly beneficial for organizations managing multiple hygienization generators across different sites, ensuring consistent operational settings and compliance with regulatory standards.

The presets can also be configured using a computing device 732, such as a smartphone, tablet, or laptop, through a dedicated application. The application provides a seamless interface for selecting, customizing, and saving presets, allowing operators to adjust system settings on the go. For instance:

A technician can remotely increase the ozone concentration for a biofilm removal task before arriving at the site.

A facility manager can monitor system performance and update parameters for compliance with new disinfection protocols.

Once the preset is selected-either locally via the user interface 548 or remotely through the remote data processing resource 702 or computing device 732—the control system 500 automatically configures the operational parameters of the aqueous ozone generator 530 and the alkaline water generator 542. This includes:

Adjusting the flow rate and dwell time in the generators using flow controllers 528.

Modulating the power supplied to the electrolysis unit 516A or 516B to control ozone production and alkalinity.

Activating additional components, such as the mineral dispenser 546, to fine-tune the solution's pH level.

This enhanced configurability reduces the potential for user error, saves time, and ensures consistency across multiple systems or operators. The ability to remotely configure presets further enhances the flexibility and operational efficiency of the hygienization generator system 100/500, making it an ideal solution for large-scale or distributed operations.

This step underscores the system's versatility, accessibility, and advanced connectivity, providing operators with a reliable, efficient, and customizable tool for producing disinfection solutions tailored to their specific needs.

In step 1906, a dynamic mixing mechanism within mixer 106 is employed to ensure the uniform distribution of the disinfection solution produced by the hygienization generator system 100/500. This step is critical for achieving consistent chemical properties throughout the solution, and optimizing its efficacy for disinfection and cleaning applications.

The mixing chamber 106 serves as the central point where outputs from the aqueous ozone generator 530 and the alkaline water generator 542 are combined. The dynamic mixing mechanism can be incorporated into the mixer/whipper/manifold 106/108/116. In this regard, whipper 108 can be referred to as a dynamic mixing mechanism. The dynamic mixing mechanism enhances the blending process by introducing agitation, turbulence, or other suitable methods to promote thorough mixing of the ozonated concentrate liquid 114 and alkaline water 148. This ensures that the oxidative and alkaline properties of the solution are evenly distributed, preventing localized variations in concentration that could compromise performance.

The dynamic mixing mechanism can incorporate various components and techniques, such as:

Mechanical Agitators: Rotating paddles or impellers introduce controlled turbulence to the solution, ensuring rapid and uniform mixing.

Pulsed Flow Systems: Alternating flow rates or directions create dynamic movement within the chamber, enhancing the mixing process.

Ultrasound Emitters: High-frequency sound waves generate cavitation bubbles that promote even distribution of the solution's components.

Jet Injection: High-velocity streams of the outputs are injected into the chamber, leveraging kinetic energy for effective mixing.

The operation of the dynamic mixing mechanism is managed by the control system 500, which adjusts mixing intensity and duration based on feedback from integrated sensors, such as the pH sensor 540 and ozone concentration sensor 538. For example:

Higher-intensity mixing may be employed for solutions requiring precise homogenization, such as those used in industrial equipment cleaning or biofilm removal.

Gentler mixing may be sufficient for solutions intended for delicate applications, such as produce washing or surface cleaning.

The dynamic mixing mechanism is particularly advantageous in applications where consistent solution quality is critical. For example:

In food processing, uniform distribution of the solution ensures complete disinfection of contact surfaces, reducing the risk of contamination.

In healthcare environments, consistent mixing prevents uneven application of disinfectant, which could leave areas untreated and susceptible to pathogens.

In industrial water treatment, thorough mixing enhances the chemical interactions necessary for effective microbial inactivation and organic residue breakdown.

And in Other Environments and Treatments.

Additionally, the system may include optional features to further optimize the mixing process. For instance, the mixing chamber can incorporate static mixing in combination with the dynamic mechanism to enhance turbulence and improve efficiency. Real-time monitoring of solution properties ensures that the mixing process is continuously optimized, even as operational conditions change.

By employing a dynamic mixing mechanism, the hygienization generator system 100/500 delivers a homogeneous disinfection solution with consistent performance characteristics. This capability enhances the system's reliability and effectiveness across diverse use cases, making it a robust and adaptable tool for modern disinfection and cleaning challenges.

The remote monitoring system 736 is a centralized platform that comprises a combination of data processing devices 730 and databases 720, as described in the specification and illustrated in at least FIGS. 7 and 8. This system is designed to receive, process, store, and analyze operational data generated by the hygienization generator system 100/500. The remote monitoring system 736 may include a network of servers, cloud-based infrastructure, or standalone devices that collectively enable real-time oversight, diagnostics, and performance tracking across one or multiple hygienization generator units deployed in different locations.

In step 1908, operational data, including ozone concentration and PH level, is communicated from the hygienization generator system 100/500 to a remote monitoring system 736. This step ensures real-time oversight of system performance, enabling proactive adjustments and efficient operation.

Data from integrated sensors, such as the ozone concentration sensor 538 and pH sensor 540, as well as the operational status of the aqueous ozone generator 530 and alkaline water generator 542, can be collected and transmitted by the system's control system 500. These parameters provide critical insights into the chemical properties of the disinfection solution, allowing operators or automated systems to verify that the solution meets the configured specifications.

The data transmission process uses a communication interface 508/710 or other suitable methods to send real-time information to the remote monitoring system 736. This enables centralized tracking and analysis of operational metrics across one or multiple generator systems.

By communicating key operational data, the system facilitates remote management and ensures consistent and reliable performance for a variety of applications, such as surface disinfection, produce washing, and industrial water treatment. This functionality enhances the system's adaptability and supports compliance with performance standards.

In step 1910, the ozone concentration and pH level of the disinfection solution are adjusted using a touchscreen user interface 548, which serves as the primary control hub for the hygienization generator system 100/500. This interface provides an intuitive and interactive platform for configuring and optimizing the system's operational parameters in real-time, enhancing usability and precision across various disinfection and cleaning applications.

The touchscreen user interface 548 is a versatile input/output device integrated into the control system 500 of the hygienization generator. It is designed to display real-time feedback from system sensors, including the ozone concentration sensor 538 and the pH sensor 540, ensuring that the operator can monitor the current chemical properties of the disinfection solution while making adjustments.

Key Features of the Touchscreen User Interface 548 can include:

Real-Time Display: The interface provides a live readout of critical operational parameters, such as ozone concentration, pH level, water flow rates, and system status, allowing the operator to make informed decisions.

Interactive Controls: The touchscreen allows for precise adjustments of ozone concentration and pH levels through sliders, buttons, or numerical inputs, providing an easy-to-use interface for operators of varying technical expertise.

Pre-Set Options: The interface includes access to pre-configured operational modes stored in memory 504, simplifying the adjustment process for common applications such as surface sanitization, industrial cleaning, or healthcare disinfection.

Custom Parameter Configuration: Operators can create and save custom settings tailored to specific needs, ensuring flexibility and adaptability for unique disinfection requirements.

The operator can adjust the ozone concentration by modifying parameters that control the operation of the aqueous ozone generator 530. This includes:

Flow Rate Adjustments: Using the touchscreen to control the flow controller 528, the operator can increase or decrease the water flow rate through the aqueous ozone generator 530, affecting the dwell time and the resulting ozone concentration.

Voltage or Current Settings: The operator can also adjust the power supplied to the electrolysis unit 516A, fine-tuning the ozone production process for optimal performance.

Similarly, the touchscreen allows precise control over the pH level of the solution produced by the alkaline water generator 542. Adjustments can include:

Flow Rate Modulation: Using the flow controller 528, the operator can change the dwell time of water within the generator, thereby increasing or decreasing its alkalinity.

Mineral Dispensing Settings: The touchscreen provides options for regulating the amount of minerals (e.g., calcium or magnesium) introduced into the water via the mineral dispenser 546, enabling fine-tuned pH control.

The touchscreen interface immediately displays the effects of any adjustments, showing updated readings from the ozone concentration sensor 538 and pH sensor 540. This feedback loop ensures that the operator can verify the changes and confirm that the solution meets the desired specifications before it is dispensed.

Advantages of the Touchscreen Interface:

Ease of Use: The intuitive design minimizes the learning curve, making the system accessible to operators with varying levels of technical expertise.

Precision: Interactive controls and real-time feedback enable highly accurate adjustments, ensuring the disinfection solution is tailored to the specific requirements of each application.

Efficiency: The ability to quickly modify operational parameters reduces downtime and allows the system to adapt to changing needs or conditions in real-time.

For example, in a healthcare facility, the operator can use the touchscreen to increase the ozone concentration for high-contamination areas or adjust the pH level for compatibility with sensitive surfaces. In industrial applications, the interface allows for rapid reconfiguration to address different cleaning tasks, such as biofilm removal or equipment sanitation.

By incorporating the touchscreen user interface 548, the hygienization generator system 100/500 delivers an advanced, user-friendly control mechanism that enhances its operational flexibility and precision, ensuring consistent and effective performance across diverse applications.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A hygienization generator, comprising:
   an aqueous ozone generator including an ion exchange material and an electrolysis unit configured to produce ozonated water;
   an alkaline water generator configured to produce alkaline water;
   a mixer configured to combine outputs from the aqueous ozone generator and the alkaline water generator;
   a control unit operationally connected to the aqueous ozone generator and the alkaline water generator, the control unit being configured to adjust ozone concentration and pH level based on user inputs; and
   at least one sensor configured to monitor output characteristics, including pH and ozone concentration, and provide feedback to the control unit.

2. The hygienization generator of claim 1, wherein the ion exchange material comprises a cation-exchange resin to enhance ozone production efficiency.

3. The hygienization generator of claim 1, further comprising a flow controller configured to adjust the dwell time of water within the alkaline water generator to vary pH level.

4. The hygienization generator of claim 1, further comprising a flow controller configured to adjust the dwell time of water within the aqueous ozone generator to vary ozone concentration.

5. The hygienization generator of claim 1, further comprising a user interface configured to allow selection of operational parameters, including pH level and ozone concentration.

6. The hygienization generator of claim 1, wherein the mixer blends a microfoaming agent with the ozonated water, creating a microfoaming ozonated liquid.

7. A method of using the hygienization generator of claim 1, comprising the steps of:
selecting desired output characteristics through the user interface;
operating the aqueous ozone generator and the alkaline water generator to produce outputs based on selected parameters;
combining the outputs in the mixer; and
dispensing the combined solution through an output assembly.

8. The hygienization generator of claim 1, further comprising an integrated alarm system configured to alert users to deviations in pH level or ozone concentration.

9. The hygienization generator of claim 1, wherein the control unit includes a memory module configured to store pre-set operational modes for specific applications.

10. The hygienization generator of claim 1, further comprising an integrated UV sterilization module positioned to sterilize the mixer.

11. A hygienization generator system, comprising:
a first electrochemical generator configured to produce ozonated water;
a second electrochemical generator configured to produce alkaline water with an adjustable pH level;
a housing containing both electrochemical generators;
a control system operationally connected to both generators, configured to independently control ozone concentration and pH level;
a user interface configured to allow customization of output characteristics; and
a safety mechanism configured to deactivate the system in response to operational anomalies.

12. The hygienization generator system of claim 11, further comprising a data logging module configured to record operational parameters, including pH and ozone concentration.

13. The hygienization generator of claim 11, further comprising a first flow controller configured to adjust the dwell time of water within the alkaline water generator to vary pH level; and a second flow controller configured to adjust the dwell time of water within the aqueous ozone generator to vary ozone concentration.

14. The hygienization generator system of claim 11, further comprising a mixer configured to blend outputs from the first and second electrochemical generators.

15. A portable hygienization generator, comprising:
a compact housing enclosing:
an aqueous ozone generation unit configured to produce ozonated water, and
an alkaline water generation unit configured to produce alkaline water;
a battery-powered control system operationally connected to both generation units;
a modular output assembly comprising nozzles for specific applications, including misting, spraying, or liquid dispensing;
at least one sensor configured to monitor operational parameters, including pH levels and ozone concentration; and
a mixer configured to combine outputs from the aqueous ozone generation unit and the alkaline water generation unit into a homogeneous solution.

16. The portable hygienization generator of claim 15, further comprising a flow controller configured to adjust the dwell time of water within the alkaline water generator to vary pH level.

17. The portable hygienization generator of claim 15, further comprising a flow controller configured to adjust the dwell time of water within the alkaline water generator to vary pH level.

18. The portable hygienization generator of claim 15, wherein the alkaline water generator includes a mineral dispensing system configured to add calcium or magnesium to the water to enhance alkalinity.

19. A method of using the portable hygienization generator of claim 15, comprising the steps of:
configuring operational parameters through the user interface;
activating the aqueous ozone generation unit and the alkaline water generation unit to produce outputs;
combining the outputs in the mixer; and
applying the combined solution to a surface or target area.

20. The portable hygienization generator of claim 15, wherein the mixer blends a microfoaming agent with the ozonated water, creating a microfoaming ozonated liquid.

* * * * *